US012330265B2

(12) United States Patent
Tanikella et al.

(10) Patent No.: US 12,330,265 B2
(45) Date of Patent: Jun. 17, 2025

(54) PERFORMANCE GRINDING SOLUTIONS

(71) Applicants:SAINT-GOBAIN ABRASIVES, INC., Worcester, MA (US); SAINT-GOBAIN ABRASIFS, Conflans-Sainte-Honorine (FR)

(72) Inventors: Brahmanandam V. Tanikella, Northborough, MA (US); Christopher Arcona, Northborough, MA (US); Thomas H. Osborn, Enfield, CT (US); Joseph P. Sullivan, Peabody, MA (US); Anna Maassel, Blacksburg, VA (US); Arunvel Thangamani, Chennai (IN); Robin Chandras Jayaram, Thiruvananthapuram (IN); Rajappa Tadepalli, Chennai (IN)

(73) Assignees: SAINT-GOBAIN ABRASIVES, INC., Worcester, MA (US); SAINT-GOBAIN ABRASIFS, Conflans-Sainte-Honorine (FR)

(*) Notice: Subject to any disclaimer, the term of this patent is extended or adjusted under 35 U.S.C. 154(b) by 0 days.

(21) Appl. No.: 18/167,544

(22) Filed: Feb. 10, 2023

(65) Prior Publication Data

US 2023/0182263 A1    Jun. 15, 2023

Related U.S. Application Data

(63) Continuation of application No. 16/833,580, filed on Mar. 28, 2020.
(Continued)

(30) Foreign Application Priority Data

May 24, 2019  (IN) .............................. 201941020668

(51) Int. Cl.
B24B 49/00      (2012.01)
G06F 18/214    (2023.01)
(Continued)

(52) U.S. Cl.
CPC ............ B24B 49/006 (2013.01); B24B 49/00 (2013.01); B24B 49/003 (2013.01);
(Continued)

(58) Field of Classification Search
CPC .... B24B 49/00; G06K 9/6253; G06K 9/6256; G06K 9/6257; G06N 20/00; G06N 3/04; G06N 5/04; G06V 2201/06
See application file for complete search history.

(56) References Cited

U.S. PATENT DOCUMENTS 3,167,891 A    2/1965  Coes, Jr. et al.
3,499,318 A    3/1970  Bogdanov et al.
(Continued)

FOREIGN PATENT DOCUMENTS

BE    1018794 A3    9/2011
CA    2461391 A1    9/2005
(Continued)

OTHER PUBLICATIONS

Extended European Search Report for EP19888093.2, completed Jul. 14, 2022, 10 pages.
(Continued)

*Primary Examiner* — Ruiping Li
(74) *Attorney, Agent, or Firm* — Abel Schillinger, LLP; Arpan Ghosh

(57) ABSTRACT

The present application relates to systems and methods for obtaining real-time abrasion data. An example computer-implemented method could include receiving, at a computing device, sensor data from one or more sensors. The one or more sensors are disposed in proximity to an abrasive
(Continued)

product or a workpiece associated with the abrasive product. The one or more sensors are configured to collect abrasion operational data associated with an abrasive operation involving the abrasive product or the workpiece. The computer-implemented method could further include training, based on the sensor data, a machine learning system to determine product specific information of the abrasive product and/or workpiece specific information. The computer-implemented method could also include providing the trained machine learning system using the computing device.

18 Claims, 38 Drawing Sheets

Related U.S. Application Data

(60) Provisional application No. 62/826,971, filed on Mar. 29, 2019.

(51) Int. Cl.
  G06F 18/40 (2023.01)
  G06N 5/04 (2023.01)
  G06N 20/00 (2019.01)

(52) U.S. Cl.
  CPC ......... *G06F 18/2148* (2023.01); *G06F 18/40* (2023.01); *G06N 5/04* (2013.01); *G06N 20/00* (2019.01); *G06V 2201/06* (2022.01)

(56) References Cited

U.S. PATENT DOCUMENTS

| | | |
|---|---|---|
| 3,604,271 A | 9/1971 | Matson |
| 3,691,698 A | 9/1972 | Schaller |
| 3,724,138 A | 4/1973 | Ishikawa |
| 4,295,301 A | 10/1981 | Barth et al. |
| 4,505,074 A | 3/1985 | Kogure |
| 4,535,571 A | 8/1985 | Smith |
| 4,570,389 A | 2/1986 | Leitch et al. |
| 4,590,573 A | 5/1986 | Hahn |
| 4,674,235 A | 6/1987 | Inoue |
| 4,916,679 A | 4/1990 | Agnello |
| 5,044,125 A | 9/1991 | Lambert, Jr. et al. |
| 5,070,655 A | 12/1991 | Aggarwal |
| 5,125,188 A | 6/1992 | Ogawa et al. |
| 5,201,916 A | 4/1993 | Berg et al. |
| 5,202,680 A | 4/1993 | Savage |
| 5,377,455 A | 1/1995 | Lanzer |
| 5,477,268 A | 12/1995 | Shimbara et al. |
| 5,486,129 A | 1/1996 | Sandhu et al. |
| 5,509,848 A | 4/1996 | Shimbara |
| 5,560,753 A | 10/1996 | Schnabel et al. |
| 5,609,718 A | 3/1997 | Meikle |
| 5,620,489 A | 4/1997 | Tselesin |
| 5,637,794 A | 6/1997 | Hanisko |
| 5,674,106 A * | 10/1997 | Cheetham ................ B24B 5/18 451/72 |
| 5,692,950 A | 12/1997 | Rutherford et al. |
| 5,718,617 A | 2/1998 | Priestley et al. |
| 5,725,413 A | 3/1998 | Malshe et al. |
| 5,733,178 A | 3/1998 | Ohishi |
| 5,738,574 A | 4/1998 | Tolles et al. |
| 5,827,111 A | 10/1998 | Ball |
| 5,833,519 A | 11/1998 | Moore |
| 5,871,391 A | 2/1999 | Pryor |
| 5,885,131 A | 3/1999 | Azarian et al. |
| 5,938,503 A | 8/1999 | Cook et al. |
| 5,975,994 A | 11/1999 | Sandhu et al. |
| 6,000,997 A | 12/1999 | Kao et al. |
| 6,123,612 A | 9/2000 | Goers |
| 6,171,174 B1 | 1/2001 | Campbell et al. |
| 6,208,128 B1 | 3/2001 | Braconnier et al. |
| 6,213,634 B1 | 4/2001 | Harrington et al. |
| 6,244,937 B1 | 6/2001 | Jaskowiak et al. |
| 6,264,533 B1 | 7/2001 | Kummeth et al. |
| 6,294,993 B1 | 9/2001 | Calaman |
| 6,319,108 B1 | 11/2001 | Adefris et al. |
| 6,320,654 B1 | 11/2001 | Alders et al. |
| 6,322,422 B1 | 11/2001 | Satou |
| 6,322,427 B1 | 11/2001 | Li et al. |
| 6,325,696 B1 | 12/2001 | Boggs et al. |
| 6,330,971 B1 | 12/2001 | Mabry et al. |
| 6,387,289 B1 | 5/2002 | Wright |
| 6,421,013 B1 | 7/2002 | Chung |
| 6,458,014 B1 | 10/2002 | Ihsikawa et al. |
| 6,490,929 B1 | 12/2002 | Russell et al. |
| 6,520,834 B1 | 2/2003 | Marshall |
| 6,558,229 B2 | 5/2003 | Kimura et al. |
| 6,558,239 B2 | 5/2003 | Kunisawa et al. |
| 6,602,109 B1 * | 8/2003 | Malkin ................ B24D 5/00 451/8 |
| 6,602,724 B2 | 8/2003 | Redeker et al. |
| 6,739,945 B2 | 5/2004 | Halley et al. |
| 6,752,693 B1 | 6/2004 | Kistler |
| D492,607 S | 7/2004 | Curkovic et al. |
| 6,764,381 B2 | 7/2004 | Kimura et al. |
| 6,905,571 B2 | 6/2005 | Sakuma et al. |
| 6,910,947 B2 | 6/2005 | Paik |
| 6,984,164 B2 | 1/2006 | Kimura et al. |
| 6,985,791 B2 | 1/2006 | Malkin et al. |
| 7,036,703 B2 | 5/2006 | Grazioli et al. |
| 7,066,028 B2 | 6/2006 | Dondi |
| 7,078,894 B2 | 7/2006 | Tada et al. |
| 7,104,342 B2 | 9/2006 | Berg |
| 7,115,018 B1 | 10/2006 | Syverson |
| 7,124,753 B2 | 10/2006 | Sung |
| 7,152,011 B2 | 12/2006 | Benjamin et al. |
| 7,153,190 B2 | 12/2006 | Mavro-Michaelis |
| 7,170,076 B2 | 1/2007 | Butler et al. |
| 7,204,320 B2 | 4/2007 | Berg |
| 7,259,678 B2 | 8/2007 | Brown et al. |
| D557,624 S | 12/2007 | Coster et al. |
| D564,367 S | 3/2008 | Molyneux |
| 7,357,031 B2 | 4/2008 | Trionfetti et al. |
| D569,282 S | 5/2008 | Daniel |
| 7,489,856 B2 | 2/2009 | Haller |
| 7,552,781 B2 | 6/2009 | Zhang et al. |
| D596,508 S | 7/2009 | Warren |
| 7,561,052 B2 | 7/2009 | Arai et al. |
| 7,728,734 B2 | 6/2010 | Arai et al. |
| 7,740,425 B2 | 6/2010 | Zeiler et al. |
| 7,800,285 B2 | 9/2010 | Andle et al. |
| 7,817,098 B2 | 10/2010 | Gertz et al. |
| 7,818,141 B2 | 10/2010 | Roth et al. |
| 7,831,327 B2 | 11/2010 | Stocker |
| 7,840,305 B2 | 11/2010 | Behr et al. |
| 7,963,823 B2 | 6/2011 | Fischer |
| 8,049,636 B2 | 11/2011 | Buckingham et al. |
| 8,133,092 B2 | 3/2012 | Arcona et al. |
| 8,337,276 B2 | 12/2012 | Rossignol et al. |
| 8,421,600 B2 | 4/2013 | Erickson et al. |
| 8,496,511 B2 | 7/2013 | Laraia et al. |
| 8,544,559 B2 | 10/2013 | Friberg et al. |
| D692,784 S | 11/2013 | Anderssen et al. |
| D696,712 S | 12/2013 | Armstrong et al. |
| 8,622,787 B2 | 1/2014 | Sung |
| 8,660,684 B2 | 2/2014 | Mundt et al. |
| D709,392 S | 7/2014 | Wang et al. |
| D711,269 S | 8/2014 | Esposito et al. |
| 8,801,497 B2 | 8/2014 | Schwappach et al. |
| 8,808,064 B2 | 8/2014 | Schwappach et al. |
| 8,840,447 B2 | 9/2014 | Schwappach et al. |
| D721,981 S | 2/2015 | Choi et al. |
| D729,647 S | 5/2015 | Phillips et al. |
| D729,655 S | 5/2015 | Bauer et al. |
| D730,225 S | 5/2015 | Behar |
| 9,028,294 B2 | 5/2015 | Moon et al. |
| D730,761 S | 6/2015 | Spaeth et al. |
| D731,906 S | 6/2015 | Troutman et al. |
| D733,888 S | 7/2015 | Tuhkanen |

(56) References Cited

U.S. PATENT DOCUMENTS

| | | |
|---|---|---|
| 9,183,738 B1 | 11/2015 | Allen, Sr. et al. |
| 9,218,244 B1 | 12/2015 | Hayes et al. |
| 9,242,330 B1 | 1/2016 | Layton, Jr. et al. |
| D749,005 S | 2/2016 | Bruce et al. |
| 9,254,545 B2 | 2/2016 | Park |
| 9,256,988 B2 | 2/2016 | Wenger et al. |
| 9,272,386 B2 | 3/2016 | Suen et al. |
| 9,460,170 B2 | 10/2016 | Boensch et al. |
| D773,057 S | 11/2016 | Vandiver |
| 9,530,092 B2 | 12/2016 | Chatterjee et al. |
| 9,594,404 B2 | 3/2017 | Yoon et al. |
| 9,600,759 B2 | 3/2017 | Ronneberger et al. |
| 9,635,888 B2 | 3/2017 | Yoon et al. |
| D787,299 S | 5/2017 | Liu |
| 9,659,832 B2 | 5/2017 | Giorgini et al. |
| 9,669,508 B2 | 6/2017 | Layton, Jr. et al. |
| 9,715,011 B2 | 7/2017 | Krapf et al. |
| D794,013 S | 8/2017 | Heck et al. |
| D796,356 S | 9/2017 | Bayley et al. |
| 9,751,185 B2 | 9/2017 | Wolf et al. |
| D800,313 S | 10/2017 | Chang |
| D812,499 S | 3/2018 | Kuh et al. |
| D818,855 S | 5/2018 | Tooze |
| 9,962,807 B2 | 5/2018 | Klee et al. |
| 9,987,720 B2 | 6/2018 | Suen et al. |
| 10,021,236 B2 | 7/2018 | Esenwein et al. |
| D825,356 S | 8/2018 | Yu |
| 10,046,429 B2 | 8/2018 | Stock et al. |
| 10,104,923 B2 | 10/2018 | Howland et al. |
| D836,472 S | 12/2018 | Zhiyuan |
| 10,168,254 B2 | 1/2019 | Cloake |
| 10,180,667 B2 | 1/2019 | Sawada et al. |
| 10,200,524 B2 | 2/2019 | Stock et al. |
| 10,209,702 B2 | 2/2019 | Cheng et al. |
| 10,295,986 B2 | 5/2019 | Saitou et al. |
| 10,300,574 B2 | 5/2019 | Layton, Jr. et al. |
| D852,649 S | 7/2019 | Burns et al. |
| 10,427,269 B2 | 10/2019 | Kashiwagi et al. |
| 10,434,626 B2 | 10/2019 | Huber et al. |
| 10,442,054 B2 | 10/2019 | Shinozaki |
| 10,449,654 B2 | 10/2019 | Campolo et al. |
| 10,449,655 B2 | 10/2019 | Shibuya et al. |
| D866,367 S | 11/2019 | Yu et al. |
| 10,471,567 B2 | 11/2019 | Doering et al. |
| 10,509,397 B2 | 12/2019 | Tong et al. |
| 10,525,563 B2 | 1/2020 | Yamamoto |
| 10,537,975 B2 | 1/2020 | Shinozaki et al. |
| 10,569,380 B2 | 2/2020 | Nakamura |
| 10,569,381 B2 | 2/2020 | Yoshida |
| D878,982 S | 3/2020 | Gil Vera |
| 10,589,398 B2 | 3/2020 | Eto et al. |
| 10,593,574 B2 | 3/2020 | Fung et al. |
| 10,625,395 B2 | 4/2020 | Shinozaki |
| 10,632,587 B2 | 4/2020 | Nakanishi et al. |
| 10,663,287 B2 | 5/2020 | Kimba et al. |
| 10,688,620 B2 | 6/2020 | Shinozaki et al. |
| 10,688,622 B2 | 6/2020 | Aono et al. |
| D890,346 S | 7/2020 | Lam et al. |
| 10,706,640 B2 | 7/2020 | Wenger et al. |
| 10,744,617 B2 | 8/2020 | Takahashi et al. |
| 10,759,019 B2 | 9/2020 | Takahashi et al. |
| 10,759,020 B2 | 9/2020 | Nakamura |
| 10,792,782 B2 | 10/2020 | Yamaguchi et al. |
| 10,792,784 B2 | 10/2020 | Sakugawa et al. |
| 10,823,749 B2 | 11/2020 | Hayzen et al. |
| 10,828,747 B2 | 11/2020 | Hiroo et al. |
| 10,921,789 B2 | 2/2021 | Kadokura |
| 10,928,243 B2 | 2/2021 | McLaughlin et al. |
| D915,229 S | 4/2021 | King et al. |
| D933,597 S | 10/2021 | Natsume et al. |
| 11,147,512 B2 | 10/2021 | Fujita |
| D935,113 S | 11/2021 | Bocknek et al. |
| 11,229,987 B2 | 1/2022 | Eckel et al. |
| D945,417 S | 3/2022 | Wang |
| 11,289,197 B1 | 3/2022 | Park et al. |
| D960,015 S | 8/2022 | McManigal et al. |
| 11,440,174 B2 | 9/2022 | Trick et al. |
| 11,628,541 B2 | 4/2023 | Eckel et al. |
| D1,003,745 S | 11/2023 | Jose |
| 2002/0142706 A1 | 10/2002 | Glashauser et al. |
| 2002/0192966 A1 | 12/2002 | Shanmugasundram et al. |
| 2003/0022598 A1 | 1/2003 | Muilenburg et al. |
| 2003/0027424 A1 | 2/2003 | Paik |
| 2003/0139836 A1 | 7/2003 | Matthews et al. |
| 2003/0194946 A1 | 10/2003 | Malkin et al. |
| 2004/0000998 A1 | 1/2004 | Karp |
| 2004/0048557 A1 | 3/2004 | Nabeya |
| 2004/0072499 A1 | 4/2004 | Wakabayashi |
| 2004/0110381 A1 | 6/2004 | Yoshida |
| 2004/0162010 A1 | 8/2004 | Ohno et al. |
| 2006/0014475 A1 | 1/2006 | Sekiya |
| 2006/0035565 A1 | 2/2006 | Mavro-Michaelis |
| 2006/0178775 A1 | 8/2006 | Zhang et al. |
| 2007/0163325 A1 | 7/2007 | Radzisewski et al. |
| 2007/0197229 A1 | 8/2007 | Kalliola et al. |
| 2007/0226992 A1 | 10/2007 | Kaneko et al. |
| 2007/0235133 A1 | 10/2007 | Benassi |
| 2008/0004743 A1 | 1/2008 | Goers et al. |
| 2008/0032601 A1 | 2/2008 | Arcona et al. |
| 2008/0216414 A1 | 9/2008 | Braunschweig et al. |
| 2008/0227367 A1 | 9/2008 | Birang et al. |
| 2008/0304929 A1 | 12/2008 | Fischer |
| 2009/0040061 A1 | 2/2009 | Golunski et al. |
| 2009/0175694 A1 | 7/2009 | Craig et al. |
| 2009/0191791 A1 | 7/2009 | Fukushima et al. |
| 2009/0306485 A1 | 12/2009 | Bell |
| 2010/0156723 A1 | 6/2010 | Luch |
| 2010/0279586 A1 | 11/2010 | Schwappach |
| 2011/0035186 A1 | 2/2011 | Liu et al. |
| 2011/0136408 A1 | 6/2011 | Frazee et al. |
| 2011/0161562 A1 | 6/2011 | Chang et al. |
| 2011/0301742 A1 | 12/2011 | Mundt et al. |
| 2012/0007748 A1 | 1/2012 | Forgues et al. |
| 2012/0059978 A1 | 3/2012 | Rosenbrand et al. |
| 2012/0175938 A1 | 7/2012 | Arcona et al. |
| 2013/0059506 A1 | 3/2013 | Qian et al. |
| 2013/0189901 A1 | 7/2013 | Klee et al. |
| 2013/0268106 A1 | 10/2013 | Mitani |
| 2014/0070924 A1 | 3/2014 | Wenger et al. |
| 2014/0120724 A1 | 5/2014 | Sung |
| 2014/0143064 A1 | 5/2014 | Tran |
| 2014/0166323 A1 | 6/2014 | Cooper |
| 2014/0206977 A1 | 7/2014 | Bahney et al. |
| 2014/0208007 A1 | 7/2014 | Cohen et al. |
| 2014/0216735 A1 | 8/2014 | Bell et al. |
| 2014/0308883 A1 | 10/2014 | Sung et al. |
| 2015/0000944 A1 | 1/2015 | Duesselberg et al. |
| 2015/0097241 A1 | 4/2015 | Rideau et al. |
| 2015/0111477 A1 | 4/2015 | Suen et al. |
| 2015/0148937 A1 | 5/2015 | Wolf |
| 2015/0239094 A1 | 8/2015 | Huber et al. |
| 2015/0258654 A1 | 9/2015 | Shinozaki |
| 2015/0263592 A1 | 9/2015 | Kawakami et al. |
| 2015/0291867 A1 | 10/2015 | Breder et al. |
| 2015/0351648 A1 | 12/2015 | Harvey et al. |
| 2016/0091965 A1 | 3/2016 | Wang et al. |
| 2016/0097241 A1 | 4/2016 | Vaughn et al. |
| 2016/0114450 A1 | 4/2016 | Layton, Jr. et al. |
| 2016/0114454 A1 | 4/2016 | Layton, Jr. et al. |
| 2016/0153244 A1 | 6/2016 | Humphrey et al. |
| 2016/0176007 A1 | 6/2016 | Wolf et al. |
| 2016/0192716 A1 | 7/2016 | Lee |
| 2016/0214198 A1 | 7/2016 | Hsu |
| 2016/0271748 A1 | 9/2016 | Gerold et al. |
| 2016/0314623 A1 | 10/2016 | Coleman et al. |
| 2016/0342142 A1 | 11/2016 | Boeck |
| 2016/0375570 A1 | 12/2016 | Boeck et al. |
| 2017/0008159 A1 | 1/2017 | Boeck et al. |
| 2017/0014984 A1 | 1/2017 | Rola et al. |
| 2017/0036315 A1 | 2/2017 | Wimitzer et al. |
| 2017/0057051 A1 | 3/2017 | Nakamura |
| 2017/0076564 A1 | 3/2017 | Cruz-Hernandez et al. |
| 2017/0113321 A1 | 4/2017 | Chou et al. |
| 2017/0132801 A1 | 5/2017 | Trenholm et al. |

(56) References Cited

U.S. PATENT DOCUMENTS

| | | | |
|---|---|---|---|
| 2017/0138019 | A1 | 5/2017 | Nicoson et al. |
| 2017/0274489 | A1 | 9/2017 | Baratta |
| 2017/0368661 | A1 | 12/2017 | Nakamura |
| 2018/0011474 | A1 | 1/2018 | Brinkhaus |
| 2018/0068214 | A1 | 3/2018 | Jesme et al. |
| 2018/0071889 | A1 | 3/2018 | Huang et al. |
| 2018/0108241 | A1 | 4/2018 | Wong et al. |
| 2018/0113427 | A1 | 4/2018 | Marcato |
| 2018/0164781 | A1 | 6/2018 | Kubo et al. |
| 2018/0180522 | A1 | 6/2018 | Kalhori et al. |
| 2018/0236628 | A1 | 8/2018 | Eriksen |
| 2018/0285888 | A1 | 10/2018 | Staebler et al. |
| 2018/0345454 | A1 | 12/2018 | Chen et al. |
| 2019/0022820 | A1 | 1/2019 | Kimba et al. |
| 2019/0025114 | A1 | 1/2019 | McLaughlin et al. |
| 2019/0027382 | A1 | 1/2019 | Watanabe et al. |
| 2019/0047117 | A1 | 2/2019 | Watanabe et al. |
| 2019/0099859 | A1 | 4/2019 | Jayaram et al. |
| 2019/0108747 | A1 | 4/2019 | Stenning et al. |
| 2019/0118331 | A1 | 4/2019 | Takahashi et al. |
| 2019/0118332 | A1 | 4/2019 | Sugiyama et al. |
| 2019/0118333 | A1 | 4/2019 | Yagi et al. |
| 2019/0121350 | A1 | 4/2019 | Cella et al. |
| 2019/0131150 | A1 | 5/2019 | Suzuki et al. |
| 2019/0134774 | A1 | 5/2019 | Yagi et al. |
| 2019/0168355 | A1 | 6/2019 | Suzuki et al. |
| 2019/0176316 | A1 | 6/2019 | Numata |
| 2019/0193242 | A1 | 6/2019 | Takahashi et al. |
| 2019/0200201 | A1 | 6/2019 | Schadow et al. |
| 2019/0217438 | A1 | 7/2019 | Harada et al. |
| 2019/0227528 | A1 | 7/2019 | Abbot et al. |
| 2019/0230903 | A1 | 8/2019 | Mcshea |
| 2019/0240799 | A1 | 8/2019 | Takeda et al. |
| 2019/0243333 | A1 | 8/2019 | Yoon et al. |
| 2019/0351526 | A1 | 11/2019 | Umemoto et al. |
| 2020/0016722 | A1 | 1/2020 | Nakamura |
| 2020/0023487 | A1 | 1/2020 | Namiki et al. |
| 2020/0030936 | A1 | 1/2020 | Knudson et al. |
| 2020/0030938 | A1 | 1/2020 | Knudson et al. |
| 2020/0033842 | A1 | 1/2020 | Masuda et al. |
| 2020/0039027 | A1 | 2/2020 | Goulet et al. |
| 2020/0041989 | A1 | 2/2020 | Zhang et al. |
| 2020/0147747 | A1 | 5/2020 | Takahashi et al. |
| 2020/0156210 | A1 | 5/2020 | Sullivan et al. |
| 2020/0206868 | A1 | 7/2020 | Owada et al. |
| 2020/0246939 | A1 | 8/2020 | Kashiwagi et al. |
| 2020/0262027 | A1 | 8/2020 | Nakamura |
| 2020/0269385 | A1 | 8/2020 | Kobata et al. |
| 2020/0282512 | A1 | 9/2020 | Kimba |
| 2020/0306927 | A1 | 10/2020 | Tanikella et al. |
| 2020/0316754 | A1 | 10/2020 | Jayaram et al. |
| 2020/0368874 | A1 | 11/2020 | Kato et al. |
| 2020/0406422 | A1 | 12/2020 | Watanabe |
| 2021/0001447 | A1 | 1/2021 | Abe et al. |
| 2021/0013071 | A1 | 1/2021 | Yamaguchi et al. |
| 2021/0023675 | A1 | 1/2021 | Mandl |
| 2021/0101250 | A1 | 4/2021 | Watanabe et al. |
| 2021/0108959 | A1 | 4/2021 | Feraru et al. |
| 2021/0178554 | A1 | 6/2021 | Eckel et al. |
| 2021/0205976 | A1 | 7/2021 | Matei |
| 2021/0308825 | A1 | 10/2021 | Gabriel et al. |
| 2023/0157601 | A1 | 5/2023 | Schadow et al. |
| 2023/0339074 | A1 | 10/2023 | Jayaram et al. |
| 2024/0028129 | A1 | 1/2024 | Whitmire et al. |
| 2024/0103466 | A1 | 3/2024 | Givot et al. |

FOREIGN PATENT DOCUMENTS

| | | |
|---|---|---|
| CN | 1055652 C | 8/2000 |
| CN | 1322374 A | 11/2001 |
| CN | 1489509 A | 4/2004 |
| CN | 101048260 A | 10/2007 |
| CN | 101180532 A | 5/2008 |
| CN | 101626869 A | 1/2010 |
| CN | 101898319 B | 12/2011 |
| CN | 102892553 A | 1/2013 |
| CN | 104732275 A | 6/2015 |
| CN | 103395001 B | 9/2015 |
| CN | 204748262 U | 11/2015 |
| CN | 204807959 U | 11/2015 |
| CN | 105215852 A | 1/2016 |
| CN | 205696112 U | 11/2016 |
| CN | 106607799 A | 5/2017 |
| CN | 206182955 U | 5/2017 |
| CN | 105415191 B | 6/2018 |
| CN | 108573310 A | 9/2018 |
| CN | 109249300 A | 1/2019 |
| CN | 109410208 A | 3/2019 |
| CN | 308196788 | 8/2023 |
| CN | 308237646 | 9/2023 |
| DE | 1997122121 A1 | 12/1998 |
| DE | 10105781 A1 | 8/2001 |
| DE | 10344602 A1 | 5/2005 |
| DE | 102004053848 A1 | 5/2006 |
| DE | 102007011880 A1 | 9/2008 |
| DE | 102007031299 A1 | 1/2009 |
| DE | 102010027981 A1 | 10/2011 |
| DE | 102013108355 A1 | 2/2015 |
| DE | 102013016068 A1 | 4/2015 |
| EP | 0029280 A1 | 5/1981 |
| EP | 0921906 A1 | 6/1999 |
| EP | 1173308 A1 | 1/2002 |
| EP | 0901881 B1 | 10/2003 |
| EP | 1975985 A1 | 10/2008 |
| EP | 2313233 A2 | 4/2011 |
| EP | 1809130 B1 | 8/2011 |
| EP | 1604782 B1 | 1/2012 |
| EP | 2793132 B1 | 10/2014 |
| EP | 3141350 A1 | 3/2017 |
| EP | 2900423 B1 | 11/2017 |
| EP | 3258327 A1 | 12/2017 |
| EP | 3482876 A1 | 5/2019 |
| EP | 3112089 B1 | 1/2020 |
| EP | 3608059 A1 | 2/2020 |
| EP | 3600782 B1 | 5/2021 |
| EP | 3843908 A1 | 7/2021 |
| GB | 2062511 A | 5/1981 |
| GB | 2420087 A | 5/2006 |
| IN | 374370-001 | 3/2024 |
| JP | S5645373 | 4/1981 |
| JP | H01284413 A | 11/1989 |
| JP | H04109550 U | 9/1992 |
| JP | H11010535 A | 1/1999 |
| JP | H11033909 A | 2/1999 |
| JP | H11316106 A | 11/1999 |
| JP | 2000079565 A | 3/2000 |
| JP | 2000252246 A | 9/2000 |
| JP | 2000292175 A | 10/2000 |
| JP | 2002178257 A | 6/2002 |
| JP | 2003192769 A | 7/2003 |
| JP | 2004142083 A | 5/2004 |
| JP | 2004186493 A | 7/2004 |
| JP | 2004230548 A | 8/2004 |
| JP | 2005291999 A | 10/2005 |
| JP | 2005316580 A | 11/2005 |
| JP | 2006055944 A | 3/2006 |
| JP | 2006093296 A | 4/2006 |
| JP | 2008221460 A | 9/2008 |
| JP | 2009542449 A | 12/2009 |
| JP | 2011218487 A | 11/2011 |
| JP | 2013082051 A | 5/2013 |
| JP | 2013088173 A | 5/2013 |
| JP | 2013176828 A | 9/2013 |
| JP | 2016525458 A | 8/2016 |
| JP | 2016534891 A | 11/2016 |
| JP | 2017509493 A | 4/2017 |
| JP | 2017518887 A | 7/2017 |
| JP | 2018118372 A | 8/2018 |
| JP | 2018520890 A | 8/2018 |
| JP | 2018144207 A | 9/2018 |
| KR | 20030075790 A | 9/2003 |
| KR | 101383600 B1 | 4/2014 |
| KR | 20160145098 A | 12/2016 |
| KR | 301249786.0000 | 2/2024 |

(56) References Cited

FOREIGN PATENT DOCUMENTS

| | | |
|---|---|---|
| KR | 301249787.0000 | 2/2024 |
| SE | 532224 C2 | 11/2009 |
| SU | 1262344 A1 | 10/1986 |
| WO | 9806541 A1 | 2/1998 |
| WO | 0036543 A1 | 6/2000 |
| WO | 2006003455 A1 | 1/2006 |
| WO | 2006066259 A2 | 6/2006 |
| WO | 2007085070 A1 | 8/2007 |
| WO | 2008002735 A2 | 1/2008 |
| WO | 2013073436 A1 | 5/2013 |
| WO | 2013083943 A2 | 6/2013 |
| WO | 2015011489 A1 | 1/2015 |
| WO | 2015110245 A1 | 7/2015 |
| WO | 2015160857 A1 | 10/2015 |
| WO | 2017016752 A1 | 2/2017 |
| WO | 2017039544 A1 | 3/2017 |
| WO | 2017058769 A1 | 4/2017 |
| WO | 2017078933 A1 | 5/2017 |
| WO | 2017083120 A1 | 5/2017 |
| WO | 2017095027 A1 | 6/2017 |
| WO | 2017121671 A1 | 7/2017 |
| WO | 2017123834 A1 | 7/2017 |
| WO | 2017207550 A1 | 12/2017 |
| WO | 2018044178 A1 | 3/2018 |
| WO | 2018147011 A1 | 8/2018 |
| WO | 2018160658 A2 | 9/2018 |
| WO | 2018160663 A2 | 9/2018 |
| WO | 2019071053 A1 | 4/2019 |
| WO | 2019191443 A1 | 10/2019 |
| WO | 2020028855 A9 | 2/2020 |
| WO | 2020039170 A1 | 2/2020 |
| WO | 2020039175 A1 | 2/2020 |
| WO | 2020044157 A1 | 3/2020 |
| WO | 2020044158 A1 | 3/2020 |
| WO | 2020044178 A1 | 3/2020 |
| WO | 2020106959 A1 | 5/2020 |
| WO | 2020106959 A8 | 5/2020 |
| WO | 2020205674 A1 | 10/2020 |
| WO | 2022013766 A1 | 1/2022 |
| WO | 2023100104 A1 | 6/2023 |
| WO | 2023225314 A1 | 11/2023 |
| WO | 2024003838 A4 | 1/2024 |

OTHER PUBLICATIONS

Extended European Search Report for EP20784381.4, dated Jun. 13, 2023, 8 pages.
International Search Report and Written Opinion for PCT/US2018/054474, mailed Jan. 28, 2019, 20 pages.
International Search Report, from PCT application No. PCT/US2019/024602, dated Jul. 5, 2019, 3 pages.
International Search Report and Written Opinion, for International Application No. PCT/US2019/044920, dated Oct. 7, 2019, 9 pages.
International Search Report and Written Opinion for PCT/US2019/044978, dated Nov. 12, 2019, 11 pages.
International Searching Authority, International Search Report and Written Opinion, mailed on Mar. 9, 2020, issued in connection with International Patent Application No. PCT/US2019/062617, filed on Nov. 21, 2019, 12 pages.
International Search Report for PCT/US2020/025583, mailed Jul. 17, 2020, 11 pages.
International Search Report for PCT/US2022/072678, mailed Sep. 20, 2022, 14 pages.
International Search Report for PCT/US2023/022929, mailed Sep. 18, 2023, 9 pages.
Aiello et al., "Real time assessment of hand-arm vibration system based on capacitive MEMS accelerometers", Computers and Electronics in Agriculture 85 (2012), 45-52, 8 pages.
Asanghanwa, "Using RFID Technology to Stop Counterfeiting," ATMEL, 2007, 9 pages.
Armstrong, "PINC Solutions Drives Supply Chain Efficiencies for Daimler Trucks," 2015, 3 pages, Armstrong & Associates, Inc.
The Beginner's Guide to RFID Systems, Atlas RFID Store Ebooks, 2017, 16 pages, https://www.atlasrfidstore.com/.
Belfiore, "Solving NASA's Water Problem," RFID Journal, 2015, 4 pages.
Brown, "Finding Value in the Industrial Internet of Things," 2016, outline of webinar from Lux Research, Inc., full webinar at https://web.luxresearchinc.com/download-iiot-2_16.
English translation of an Office Action for Chinese Application No. 2018800723863, dated Dec. 10, 2021, 13 pages.
EPC Compliant Class-1 Generation-2 UHF RFID Devices Conformance Requirements, GS1, 2015, 96 pages.
Fasl, "Using NI WSN and NI LabVIEW to Wirelessly Monitor Fatigue Damage on Highway Bridges," National Instrucments, 2013, 1 pages, https://sine.ni.com/cs/app/doc/p/id/cs-15206.
Holdowsky et al., "Inside the Internet of Things," Deloitte University Press, 2015, 54 pages.
How Does Rain RFID Technology Work, Impinj, available via the Internet at: https://www.impinj.com/about-rfid/ (last visited Apr. 27, 2020).
"Intermec RFID Tags & Media," Honeywell International Inc., 2013, 7 pages.
Liang, Piezoelectric Pressure Sensors Based on Flexible PZT Thick-Film Composite Device, University of Pittsburgh, 2014, https://d-scholarship.pitt.edu/23716/liangrj_etdPitt2014.pdf, 97 pages.
Loy et al., "ISM-Band and Short Range Device Regulatory Compliance Overview," Texas Instruments, 2005, 17 pages.
Malkin et al., Development of an "Intelligent Grinding Wheel" for In-Process Monitoring of Ceramic Grinding. Semi-annual report #3, published Mar. 26, 1998, DOI: 10.2172/584958, 16 pages.
Malkin et al., Grinding Wheel System, published Jan. 2003, abstract only.
Manyika et al., "The Internet of Things: Mapping the Value Beyond the Hype," 2015, 144 pages, McKinsey Global Institute, McKinsey & Company.
Mernaripour et al., "Atomic In-Place Updates for Non-Volatile Main Memories with Kamino-Tx," EuroSys '17, Apr. 23-26, 2017, pp. 499-512.
Morgan, Michael N. et al. "Design and implementation of an intelligent grinding assistant system," International Journal of Abrasive Technology (IJAT), vol. 1, No. 1, 2007, pp. 106-135.
"PINC Solutions Drives Supply Chain Efficiencies for Daimler Trucks," 2015, 3 pgs, Armstrong & Associates, Inc, avaiable via the Internet at: https://www.3plogistics.com/3pl-case-studies/pinc-solutions-drives-supply-chain-efficiencies-for-daimler-trucks/ (last visited Apr. 27, 2020).
Radio Frequency Identification, Winter Superabrasives brochure, 2009, 1 page.
Regulatory Status for using RFID in the EPC Gen2 (860 to 860 MHZ) band of the UHF spectrum, GS1, 2018, 18 pages.
"RFID for Brand Protection," NXP Semiconductors, 2013, 10 pages, https://nxp-rfid.com/applications/brand-protection-rfid/.
RFID Selection Guide, EBV Elektronik, 2010, 24 pages, https://cdn-shop.adafruit.com/datasheets/rfid+guide.pdf.
Sattlegger et al., "Navigating your way through the RFID jungle," Texas Instruments, 2014, 11 pages.
Standard Catalogue, Precision Grinding Solutions Winter Brochure, 2009, 160 pages.
Stoney et al., Dynamic wireless passive strain measurement in CNC turning using surface acoustic wave sensors, The International Journal of Advanced Manufacturing Technology, published Jun. 20, 2013, 69 (5-8), p. 1421-1430, 10 pages.
Varghese et al., Development of a Sensor-Integrated "Intelligent" Grinding Wheel for In-Process Monitoring, published Jul. 2013, CIRP Annals 49(1):231-234, DOI:10.1016/S0007-8506(07)62935-7, abstract only.
Varghese et al., In-process monitoring of truing using a sensor integrated diamond grinding wheel, published Jan. 2002, abstract only.
"What is a Wireless Sensor Network?" National Instruments, 2016, 2 pages, https://www.ni.com/white-paper/7142/en/.
"Wireless Technologies Overview," Phase IV, 2014, 3 pages, https://www.phaseivengrcom/wireless-technologies/wireless-technologies-overview/.

(56) References Cited

OTHER PUBLICATIONS

Zuo Dun-Wen, "Modern Processing Technology," Beihang University Press, 2005, 9 pages.
Extended European Search Report for EP20782051.5, dated Nov. 8, 2022, 10 pages.
International Search Report & Written Opinion for PCT/US2020/026754, mailed Jul. 27, 2020.
"Wang Heng, Jia Minping, Chen Zuoliang, ""Fill-level measuring and control system based on multi-sensor information fusion for ball mill,"" Electric Power Automation Equipment, Sep. 10, 2012, Issue 32, vol. 9".
"A. Arun, et al, ""Monitoring Of Cylindrical Grinding Process Using Acoustic Emission Sensor,"" Materials Today: Proceedings, Jun. 12, 2018, Issue 2, vol. 5".

\* cited by examiner

PERFORMANCE GRINDING SOLUTIONS

CROSS-REFERENCE TO RELATED APPLICATIONS

This application is a continuation and claims priority under 35 U.S.C. § 120 to U.S. patent application Ser. No. 16/833,580, entitled, "PERFORMANCE GRINDING SOLUTIONS," by Brahmanandam V. TANIKELLA et al., filed Mar. 28, 2020, which application claims priority under 35 U.S.C. § 119(e) to U.S. Provisional Patent Application No. 62/826,971, entitled "PERFORMANCE GRINDING SOLUTIONS," by Brahmanandam V. TANIKELLA et al., filed Mar. 29, 2019, and claims priority to India Patent Application No. 201941020668, entitled "PERFORMANCE GRINDING SOLUTIONS," by Brahmanandam V. TANIKELLA et al., filed on May 24, 2019, of which all are assigned to the current assignee hereof and incorporated herein by reference in their entireties.

BACKGROUND

Abrasive tools can be used in various material removal operations. Such tools have been equipped with sensors that may monitor the usage of the tools. For example, a power sensor may be incorporated into a tool in order to monitor the electrical power that is consumed by the load. Although a power sensor incorporated into the tool may provide a user of the tool with useful information related to the tool, the sensor may not fully capture the operation of the tool and/or the experience of the user. For example, power sensor data cannot effectively be used to determine whether a component of the tool has been damaged or is malfunctioning.

SUMMARY

The present disclosure generally relates to systems and methods for obtaining, analyzing, and utilizing real-time data in abrasive and abrasive device applications.

In a first aspect, a computer-implemented method is provided. The computer-implemented method includes receiving, at a computing device, sensor data from one or more sensors. The one or more sensors are a disposed in proximity to at least one of: one or more abrasive products or one or more workpieces. The one or more sensors are configured to collect abrasion operational data associated with an abrasive operation involving the one or more abrasive products or the one or more workpieces. The computer-implemented method includes training, using the computing device, a machine learning system to determine product-specific information of the one or more abrasive products and/or workpiece-specific information based on the sensor data. The computer-implemented method also includes providing the trained machine learning system using the computing device.

In a second aspect, a computer-implemented method is provided. The computer-implemented method includes receiving, at a computing device, sensor data from one or more sensors. The one or more sensors are a disposed in proximity to at least one of: an abrasive product or a workpiece. The one or more sensors are configured to collect abrasion operational data associated with an abrasive operation involving the abrasive product or the workpiece. The computing device has access to a trained machine learning system configured to receive input sensor data and output product-specific information of the abrasive product or workpiece-specific information based on the input sensor data. The computer-implemented method includes determining, by the trained machine learning system, product-specific information of the abrasive product or workpiece-specific information based on the sensor data. The computer-implemented method additionally includes providing the product-specific information of the abrasive product or workpiece-specific information to one or more client devices.

In a third aspect, a system is provided. The system includes a trained machine learning system configured to receive input sensor data and output at least one of: product-specific information of abrasive products or workpiece-specific information based on the input sensor data. The system also includes a computing device configured to receive, from a client device, sensor data from one or more sensors. The one or more sensors are disposed in proximity to an abrasive product or a workpiece. The one or more sensors are configured to collect abrasion operational data associated with an abrasive operation involving the abrasive product or the workpiece. The computing device is also configured to determine, by applying the trained machine learning system on the sensor data, product-specific information of the abrasive product or workpiece-specific information. The computing device is further configured to provide, the product-specific information of the abrasive product and/or workpiece-specific information to one or more client devices.

In a fourth aspect, a computer-implemented method is provided. The computer-implemented method includes receiving, at a computing device, sensor data from one or more sensors. The one or more sensors are a disposed in proximity to a handheld abrasive product operated by a user. The one or more sensors are configured to collect abrasion operational data associated with an abrasive operation involving the handheld abrasive product. The computing device has access a trained machine learning system configured to receive input sensor data and output product-specific information of the abrasive product based on the input sensor data. The computer-implemented method includes determining, by the trained machine learning system, product-specific information of the abrasive product information based of the sensor data. The computer-implemented method also includes providing the product-specific information relating to the abrasive operation of the abrasive product to one or more client devices.

In a fifth aspect, a computer-implemented method is provided. The computer-implemented method includes receiving, at a computing device, sensor data from one or more sensors. The one or more sensors are a disposed in proximity to an abrasive product operated by an automated process. The one or more sensors are configured to collect abrasion operational data associated with an abrasive operation involving the abrasive product. The computing device has access a trained machine learning system configured to receive input sensor data and output product-specific information of the abrasive product based on the input sensor data. The computer-implemented method includes determining, by the trained machine learning system, product-specific information of the abrasive product based of the sensor data. The computer-implemented method also includes providing the product-specific information relating to the abrasive product to one or more client devices.

In a sixth aspect, a computer-implemented method is provided. The computer-implemented method includes receiving, at a computing device, sensor data from one or more sensors. The one or more sensors are a disposed in proximity to one or more abrasive products. The one or more sensors are configured to collect abrasion operational data associated with an abrasive operation involving the one or more abrasive products. The one or more abrasive products are located across a plurality of enterprises. The computer-implemented method further includes training, using the computing device, a machine learning system to determine product-specific information or workpiece-specific information of the one or more abrasive products based on the sensor data. The computer-implemented method additionally includes providing the trained machine learning system using the computing device.

DETAILED DESCRIPTION

Figure 1B:
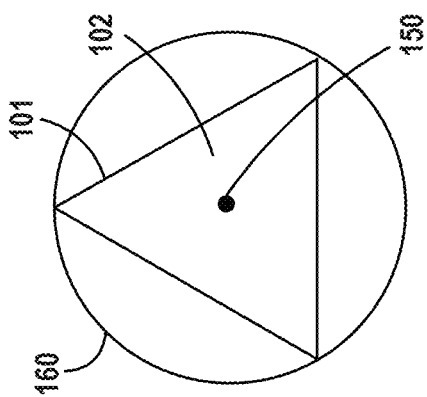
FIG. 1B includes a top-down illustration of the shaped abrasive particle of FIG. 1A, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Abrasive products are used extensively in a wide variety of industrial and domestic operations, ranging from home improvement projects to highly technical precision engineering. With the assistance of these products, operators can perform grinding, polishing, buffing, and other operations to shape and surface-finish many different types of materials.

Often, an abrasive product manufacturer collects operational data from customers to improve the productivity and safety of their abrasive products. For instance, a manufacturer can equip an abrasive product with sensors to generate data streams on inputs (e.g., components that form the product), operations (e.g., the power, speed, and/or vibration of the product), and outputs (e.g., the end-material surface-finish) of the abrasive product. By combining multiple data streams, for example, through Internet of Things (IoT) aggregation tools, the manufacturer can acquire diagnostic information from a wide range of abrasive products, enhancing the manufacturer's ability to perform process monitoring, address customer issues, and improve the development of future abrasive products.

To provide further value, it may be beneficial for the manufacturer to convert diagnostic information into a form easily usable for customers. For example, given that a customer can be an enterprise, a production manager from the enterprise may be concerned with productivity and quality information of an abrasive product, whereas an operator from the enterprise may be concerned with real-time safety information. As such, it may be advantageous for the manufacturer to convert the diagnostic information into a text notification and transmit the notification to graphical interfaces used by the production manager and operator.

To efficiently convert and transmit the diagnostic information, the manufacturer may benefit from a remotely-hosted platform that can understand the individuals/entities operating within the enterprise and distribute, in real-time, diagnostic information to the relevant individuals/entities. The goal of such a platform would be to develop a predictive intelligence and analytical framework for a customer's procedures so that the customer can focus on producing high-value materials with the products rather than wasting time analyzing abrasive product data.

In order to achieve this goal, a machine learning platform is described herein, which may intelligently provide predictive analytics to customers of an abrasive product manufacturer. Such a machine learning platform can be hosted remotely from customers, but may access data and services from the customers by way of secure connections. The machine learning platform may be web-based and accessible from a variety of Internet-enabled client devices. For example, the machine learning platform could have a mobile applications component (iOS/Android) and a web services component that allows customers to easily access the features provided by the platform.

Such a machine learning platform may have several desirable capabilities and characteristics. For example, by utilizing aggregate diagnostic information across multiple customers, the machine learning platform can develop deep insights that provide real-time feedback to recommend and/or adjust customer operations and forecasted statistics in real-time to drive a customer's future business decisions. These characteristics of the machine learning platform may also be leveraged by the manufacturer to develop new business models, including abrasive services and abrasive products, thereby driving further growth for the manufacturer. Other features, functionality, and benefits of such a machine learning platform may exist and will be appreciated and understood from the discussion below.

Accordingly, disclosed herein are methods and systems for using abrasive operational data indicative of a behavior of an abrasive product. As described herein, the abrasive operational data could be sent to a machine learning platform to train one or more machine learning models. Each machine learning model may be configured to predict one or more behaviors of an abrasive product based on the abrasive operational data. The machine learning platform may transmit to the interface on the abrasive product, to a mobile computing device, or to an analytics platform product-specific information or workpiece-specific information related to the abrasive product. This information may include providing ergonomic recommendations to an operator using the product, determining the end of life of the product, and/or determining operational improvements (e.g., workflow best practices).

II. Example Abrasive Particles

As used herein, the term abrasive tool includes any tool configured to be used with an abrasive article. An abrasive article can include a fixed abrasive article including at least a substrate and abrasive particles connected to (e.g., contained within or overlying) the substrate. The abrasive articles of the embodiments herein can be bonded abrasives, coated abrasive, non-woven abrasives, thin wheels, cut-off wheels, reinforced abrasive articles, superabrasives, single-layered abrasive articles and the like. Such abrasive articles can include one or more various types of abrasive particles, including for example, but not limited to, shaped abrasive particles, constant height abrasive particles, unshaped abrasive particles (e.g., crushed, extruded, or exploded abrasive particles) and the like.

Figure 1A:
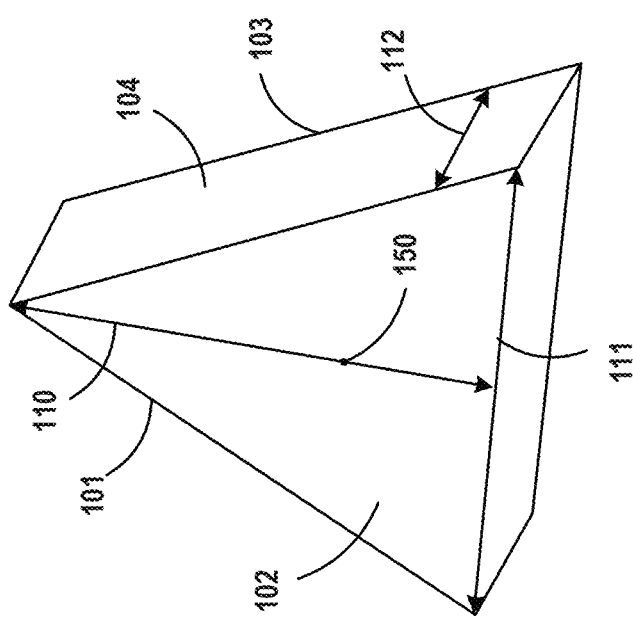
FIG. 1A includes a perspective view illustration of a shaped abrasive particle, according to an example embodiment.

FIG. 1A includes a perspective view illustration of a shaped abrasive particle in accordance with an embodiment. The shaped abrasive particle 100 can include a body 101 including a major surface 102, a major surface 103, and a side surface 104 extending between the major surfaces 102 and 103. As illustrated in FIG. 1A, the body 101 of the shaped abrasive particle 100 can be a thin-shaped body, wherein the major surfaces 102 and 103 are larger than the side surface 104. Moreover, the body 101 can include a longitudinal axis 110 extending from a point to a base and through the midpoint 150 on a major surface 102 or 103. The longitudinal axis 110 can define the longest dimension of the body along a major surface and through the midpoint 150 of the major surface 102.

In certain particles, if the midpoint of a major surface of the body is not readily apparent, one may view the major surface top-down, draw a closest-fit circle around the two-dimensional shape of the major surface and use the center of the circle as the midpoint of the major surface.

FIG. 1B includes a top-down illustration of the shaped abrasive particle of FIG. 1A. Notably, the body 101 includes a major surface 102 having a triangular two-dimensional shape. The circle 160 is drawn around the triangular shape to facilitate location of the midpoint 150 on the major surface 102.

Referring again to FIG. 1A, the body 101 can further include a lateral axis 111 defining a width of the body 101 extending generally perpendicular to the longitudinal axis 110 on the same major surface 102. Finally, as illustrated, the body 101 can include a vertical axis 112, which in the context of thin shaped bodies can define a height (or thickness) of the body 101. For thin-shaped bodies, the length of the longitudinal axis 110 is greater than the vertical axis 112. As illustrated, the thickness along the vertical axis 112 can extend along the side surface 104 between the major surfaces 102 and 103 and perpendicular to the plane defined by the longitudinal axis 110 and lateral axis 111. It will be appreciated that reference herein to length, width, and height of the abrasive particles may be reference to average values taken from a suitable sampling size of abrasive particles of a larger group, including for example, a group of abrasive particle affixed to a fixed abrasive.

The shaped abrasive particles of the embodiments herein, including thin shaped abrasive particles can have a primary aspect ratio of length:width such that the length can be greater than or equal to the width. Furthermore, the length of the body 101 can be greater than or equal to the height. Finally, the width of the body 101 can be greater than or equal to the height. In accordance with an embodiment, the primary aspect ratio of length:width can be at least 1:1, such as at least 1.1:1, at least 1.2:1, at least 1.5:1, at least 1.8:1, at least 2:1, at least 3:1, at least 4:1, at least 5:1, at least 6:1, or even at least 10:1. In another non-limiting embodiment, the body 101 of the shaped abrasive particle can have a primary aspect ratio of length:width of not greater than 100:1, not greater than 50:1, not greater than 10:1, not greater than 6:1, not greater than 5:1, not greater than 4:1, not greater than 3:1, not greater than 2:1, or even not greater than 1:1. It will be appreciated that the primary aspect ratio of the body 101 can be within a range including any of the minimum and maximum ratios noted above.

However, in certain other embodiments, the width can be greater than the length. For example, in those embodiments wherein the body 101 is an equilateral triangle, the width can be greater than the length. In such embodiments, the primary aspect ratio of length:width can be at least 1:1.1 or at least 1:1.2 or at least 1:1.3 or at least 1:1.5 or at least 1:1.8 or at least 1:2 or at least 1:2.5 or at least 1:3 or at least 1:4 or at least 1:5 or at least 1:10. Still, in a non-limiting embodiment, the primary aspect ratio length:width can be not greater than 1:100 or not greater than 1:50 or not greater than 1:25 or not greater than 1:10 or not greater than 5:1 or not greater than 3:1. It will be appreciated that the primary aspect ratio of the body 101 can be within a range including any of the minimum and maximum ratios noted above.

Furthermore, the body 101 can have a secondary aspect ratio of width:height that can be at least 1:1, such as at least 1.1:1, at least 1.2:1, at least 1.5:1, at least 1.8:1, at least 2:1, at least 3:1, at least 4:1, at least 5:1, at least 8:1, or even at least 10:1. Still, in another non-limiting embodiment, the secondary aspect ratio width:height of the body 101 can be not greater than 100:1, such as not greater than 50:1, not greater than 10:1, not greater than 8:1, not greater than 6:1, not greater than 5:1, not greater than 4:1, not greater than 3:1, or even not greater than 2:1. It will be appreciated the secondary aspect ratio of width:height can be within a range including any of the minimum and maximum ratios of above.

In another embodiment, the body 101 can have a tertiary aspect ratio of length:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the tertiary aspect ratio length:height of the body 101 can be not greater than 100:1, such as not greater than 50:1, not greater than 10:1, not greater than 8:1, not greater than 6:1, not greater than 5:1, not greater than 4:1, not greater than 3:1. It will be appreciated that the tertiary aspect ratio the body 101 can be within a range including any of the minimum and maximum ratios and above.

The abrasive particles of the embodiments herein, including the shaped abrasive particles can include a crystalline material, and more particularly, a polycrystalline material. Notably, the polycrystalline material can include abrasive grains. In one embodiment, the body of the abrasive particle, including for example, the body of a shaped abrasive particle can be essentially free of an organic material, such as, a binder. In at least one embodiment, the abrasive particles can consist essentially of a polycrystalline material. In another embodiment, the abrasive particles, such as shaped abrasive particles can be free of silane, and particularly, may not have a silane coating.

The abrasive particles may be made of certain material, including but not limited to nitrides, oxides, carbides, borides, oxynitrides, oxyborides, diamond, carbon-containing materials, and a combination thereof. In particular instances, the abrasive particles can include an oxide compound or complex, such as aluminum oxide, zirconium oxide, titanium oxide, yttrium oxide, chromium oxide, strontium oxide, silicon oxide, magnesium oxide, rare-earth oxides, and a combination thereof. The abrasive particles may be superabrasive particles.

In one particular embodiment, the abrasive particles can include a majority content of alumina. For at least one embodiment, the abrasive particle can include at least 80 wt % alumina, such as at least 90 wt % alumina, at least 91 wt % alumina, at least 92 wt % alumina, at least 93 wt % alumina, at least 94 wt % alumina, at least 95 wt % alumina, at least 96 wt % alumina, or even at least 97 wt % alumina. Still, in at least one particular embodiment, the abrasive particle can include not greater than 99.5 wt % alumina, such as not greater than 99 wt % alumina, not greater than 98.5 wt % alumina, not greater than 97.5 wt % alumina, not greater than 97 wt % alumina not greater than 96 wt % alumina, or even not greater than 94 wt % alumina. It will be appreciated that the abrasive particles of the embodiments herein can include a content of alumina within a range including any of the minimum and maximum percentages noted above. Moreover, in particular instances, the shaped abrasive particles can be formed from a seeded sol-gel. In at least one embodiment, the abrasive particles can consist essentially of alumina and certain dopant materials as described herein.

The abrasive particles of the embodiments herein can include particularly dense bodies, which may be suitable for use as abrasives. For example, the abrasive particles may have a body having a density of at least 95% theoretical density, such as at least 96% theoretical density, at least 97% theoretical density, at least 98% theoretical density or even at least 99% theoretical density.

The abrasive grains (i.e., crystallites) contained within the body of the abrasive particles may have an average grain size (i.e., average crystal size) that is generally not greater than about 100 microns. In other embodiments, the average grain size can be less, such as not greater than about 80 microns or not greater than about 50 microns or not greater than about 30 microns or not greater than about 20 microns or not greater than about 10 microns or not greater than 6 microns or not greater than 5 microns or not greater than 4 microns or not greater than 3.5 microns or not greater than 3 microns or not greater than 2.5 microns or not greater than 2 microns or not greater than 1.5 microns or not greater than 1 micron or not greater than 0.8 microns or not greater than 0.6 microns or not greater than 0.5 microns or not greater than 0.4 microns or not greater than 0.3 microns or even not greater than 0.2 microns. Still, the average grain size of the abrasive grains contained within the body of the abrasive particle can be at least about 0.01 microns, such as at least about 0.05 microns or at least about 0.06 microns or at least about 0.07 microns or at least about 0.08 microns or at least about 0.09 microns or at least about 0.1 microns or at least about 0.12 microns or at least about 0.15 microns or at least about 0.17 microns or at least about 0.2 microns or even at least about 0.3 microns. It will be appreciated that the abrasive particles can have an average grain size (i.e., average crystal size) within a range between any of the minimum and maximum values noted above.

The average grain size (i.e., average crystal size) can be measured based on the uncorrected intercept method using scanning electron microscope (SEM) photomicrographs. Samples of abrasive grains are prepared by making a bakelite mount in epoxy resin then polished with diamond polishing slurry using a Struers Tegramin 30 polishing unit. After polishing the epoxy is heated on a hot plate, the polished surface is then thermally etched for 5 minutes at 150° C. below sintering temperature. Individual grains (5-10 grits) are mounted on the SEM mount then gold coated for SEM preparation. SEM photomicrographs of three individual abrasive particles are taken at approximately 50,000× magnification, then the uncorrected crystallite size is calculated using the following steps: 1) draw diagonal lines from one corner to the opposite corner of the crystal structure view, excluding black data band at bottom of photo 2) measure the length of the diagonal lines as L1 and L2 to the nearest 0.1 centimeters; 3) count the number of grain boundaries intersected by each of the diagonal lines, (i.e., grain boundary intersections I1 and I2) and record this number for each of the diagonal lines, 4) determine a calculated bar number by measuring the length (in centimeters) of the micron bar (i.e., "bar length") at the bottom of each photomicrograph or view screen, and divide the bar length (in microns) by the bar length (in centimeters); 5) add the total centimeters of the diagonal lines drawn on photomicrograph (L1+L2) to obtain a sum of the diagonal lengths; 6) add the numbers of grain boundary intersections for both diagonal lines (I1+I2) to obtain a sum of the grain boundary intersections; 7) divide the sum of the diagonal lengths (L1+L2) in centimeters by the sum of grain boundary intersections (I1+I2) and multiply this number by the calculated bar number. This process is completed at least three different times for three different, randomly selected samples to obtain an average crystallite size.

In accordance with certain embodiments, certain abrasive particles can be composite articles including at least two different types of grains within the body of the abrasive particle. It will be appreciated that different types of grains are grains having different compositions with regard to each other. For example, the body of the abrasive particle can be formed such that is includes at least two different types of grains, wherein the two different types of grains can be nitrides, oxides, carbides, borides, oxynitrides, oxyborides, diamond, and a combination thereof.

In accordance with an embodiment, the abrasive particles can have an average particle size, as measured by the largest dimension (i.e., length) of at least about 100 microns. In fact, the abrasive particles can have an average particle size of at least about 150 microns, such as at least about 200 microns, at least about 300 microns, at least about 400 microns, at least about 500 microns, at least about 600 microns, at least about microns, at least about 800 microns, or even at least about 900 microns. Still, the abrasive particles of the embodiments herein can have an average particle size that is not greater than about 5 mm, such as not greater than about 3 mm, not greater than about 2 mm, or even not greater than about 1.5 mm. It will be appreciated that the abrasive particles can have an average particle size within a range between any of the minimum and maximum values noted above.

FIG. 1A includes an illustration of a shaped abrasive particle having a two-dimensional shape as defined by the plane of the upper major surface 102 or major surface 103, which has a generally triangular two-dimensional shape. It will be appreciated that the shaped abrasive particles of the embodiments herein are not so limited and can include other two-dimensional shapes. For example, the shaped abrasive particles of the embodiment herein can include particles having a body with a two-dimensional shape as defined by a major surface of the body from the group of shapes including polygons, regular polygons, irregular polygons, irregular polygons including arcuate or curved sides or portions of sides, ellipsoids, numerals, Greek alphabet characters, Latin alphabet characters, Russian alphabet characters, Kanji characters, complex shapes having a combination of polygons shapes, shapes including a central region and a plurality of arms (e.g., at least three arms) extending from a central region (e.g., star shapes), and a combination thereof. Particular polygonal shapes include rectangular, trapezoidal, quadrilateral, pentagonal, hexagonal, heptagonal, octagonal, nonagonal, decagonal, and any combination thereof. In another instance, the finally-formed shaped abrasive particles can have a body having a two-dimensional shape such as an irregular quadrilateral, an irregular rectangle, an irregular trapezoid, an irregular pentagon, an irregular hexagon, an irregular heptagon, an irregular octagon, an irregular nonagon, an irregular decagon, and a combination thereof. An irregular polygonal shape is one where at least one of the sides defining the polygonal shape is different in dimension (e.g., length) with respect to another side. As illustrated in other embodiments herein, the two-dimensional shape of certain shaped abrasive particles can have a particular number of exterior points or external corners. For example, the body of the shaped abrasive particles can have a two-dimensional polygonal shape as viewed in a plane defined by a length and width, wherein the body comprises a two-dimensional shape having at least 4 exterior points (e.g., a quadrilateral), at least 5 exterior points (e.g., a pentagon), at least 6 exterior points (e.g., a hexagon), at least 7 exterior points (e.g., a heptagon), at least 8 exterior points (e.g., an octagon), at least 9 exterior points (e.g., a nonagon), and the like.

Figure 1C:
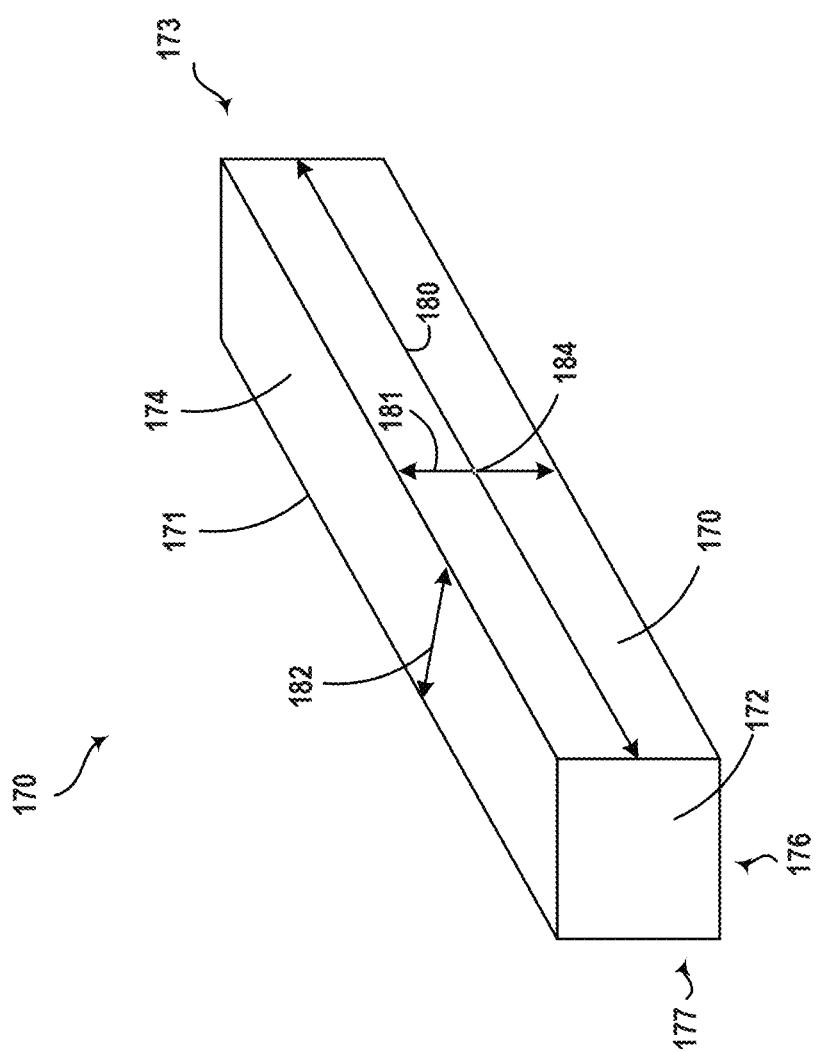
FIG. 1C includes a perspective view illustration of a shaped abrasive particle, according to an example embodiment.

FIG. 1C includes a perspective view illustration of a shaped abrasive particle according to another embodiment. Notably, the shaped abrasive particle 170 can include a body 171 including a surface 172 and a surface 173, which may be referred to as end surfaces 172 and 173. The body can further include major surfaces 174, 175, 176, 177 extending between and coupled to the end surfaces 172 and 173. The shaped abrasive particle of FIG. 1C is an elongated shaped abrasive particle having a longitudinal axis 180 that extends along the major surface 175 and through the midpoint 184 between the end surfaces 172 and 173. For particles having an identifiable two-dimensional shape, such as the shaped abrasive particles of FIGS. 1A-C, the longitudinal axis is the dimension that would be readily understood to define the length of the body through the midpoint on a major surface. For example, in FIG. 1C, the longitudinal axis 180 of the shaped abrasive particle 170 extends between the end surfaces 172 and 173 parallel to the edges defining the major surface as shown. Such a longitudinal axis is consistent with how one would define the length of a rod. Notably, the longitudinal axis 180 does not extend diagonally between the corners joining the end surfaces 172 and 173 and the edges defining the major surface 175, even though such a line may define the dimension of greatest length. To the extent that a major surface has undulations or minor imperfections from a perfectly planar surface, the longitudinal axis can be determined using a top-down, two-dimensional image that ignores the undulations.

It will be appreciated that the surface 175 is selected for illustrating the longitudinal axis 180, because the body 171 has a generally square cross-sectional contour as defined by the end surfaces 172 and 173. As such, the surfaces 174, 175, 176, and 177 can be approximately the same size relative to each other. However, in the context of other elongated abrasive particles, the surfaces 172 and 173 can have a different shape, for example, a rectangular shape, and as such, at least one of the surfaces 174, 175, 176, and 177 may be larger relative to the others. In such instances, the largest surface can define the major surface and the longitudinal axis would extend along the largest of those surfaces through the midpoint 184 and may extend parallel to the edges defining the major surface. As further illustrated, the body 171 can include a lateral axis 181 extending perpendicular to the longitudinal axis 180 within the same plane defined by the surface 175. As further illustrated, the body 171 can further include a vertical axis 182 defining a height of the abrasive particle, were in the vertical axis 182 extends in a direction perpendicular to the plane defined by the longitudinal axis 180 and lateral axis 181 of the surface 175.

It will be appreciated that like the thin shaped abrasive particle of FIGS. 1A-B, the elongated shaped abrasive particle of FIG. 1C can have various two-dimensional shapes, such as those defined with respect to the shaped abrasive particle of FIGS. 1A-B. The two-dimensional shape of the body 171 can be defined by the shape of the perimeter of the end surfaces 172 and 173. The elongated shaped abrasive particle 170 can have any of the attributes of the shaped abrasive particles of the embodiments herein.

Figure 2A:
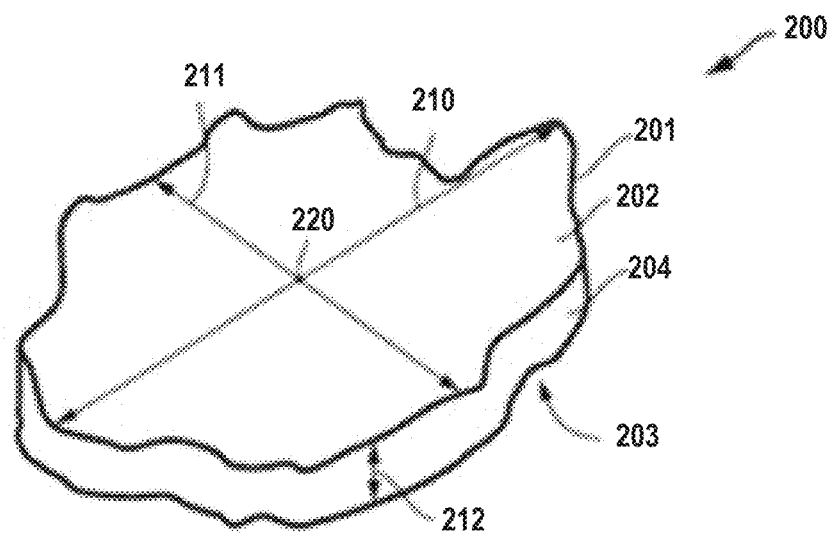
FIG. 2A includes a perspective view illustration of a controlled height abrasive particle (CHAP), according to an example embodiment.

FIG. 2A includes a perspective view illustration of a controlled height abrasive particle according (CHAP) to an embodiment. As illustrated, the CHAP 200 can include a body 201 including a first major surface 202, a second major surface 203, and a side surface 204 extending between the first and second major surfaces 202 and 203. As illustrated in FIG. 2A, the body 201 can have a thin, relatively planar shape, wherein the first and second major surfaces 202 and 203 are larger than the side surface 204 and substantially parallel to each other. Moreover, the body 201 can include a longitudinal axis 210 extending through the midpoint 220 and defining a length of the body 201. The body 201 can further include a lateral axis 211 on the first major surface 202, which extends through the midpoint 220 of the first major surface 202, perpendicular to the longitudinal axis 210, and defining a width of the body 201.

The body 201 can further include a vertical axis 212, which can define a height (or thickness) of the body 201. As illustrated, the vertical axis 212 can extend along the side surface 204 between the first and second major surfaces 202 and 203 in a direction generally perpendicular to the plane defined by the axes 210 and 211 on the first major surface. For thin-shaped bodies, such as the CHAP 200 illustrated in FIG. 2A, the length can be equal to or greater than the width and the length can be greater than the height. It will be appreciated that reference herein to length, width, and height of the abrasive particles may be referenced to average values taken from a suitable sampling size of abrasive particles of a batch of abrasive particles.

Unlike the shaped abrasive particles of FIGS. 1A, 1B, and 1C, the CHAP 200 of FIG. 2A does not have a readily identifiable two-dimensional shape based on the perimeter of the first or second major surfaces 202 and 203. Such abrasive particles may be formed in a variety of ways, including but not limited to, fracturing of a thin layer of material to form abrasive particles having a controlled height but with irregularly formed, planar, major surfaces. For such particles, the longitudinal axis is defined as the longest dimension on the major surface that extends through a midpoint on the surface. To the extent that the major surface has undulations, the longitudinal axis can be determined using a top-down, two-dimensional image that ignores the undulations. Moreover, as noted above in FIG. 1B, a closest-fit circle may be used to identify the midpoint of the major surface and identification of the longitudinal and lateral axes.

Figure 2B:
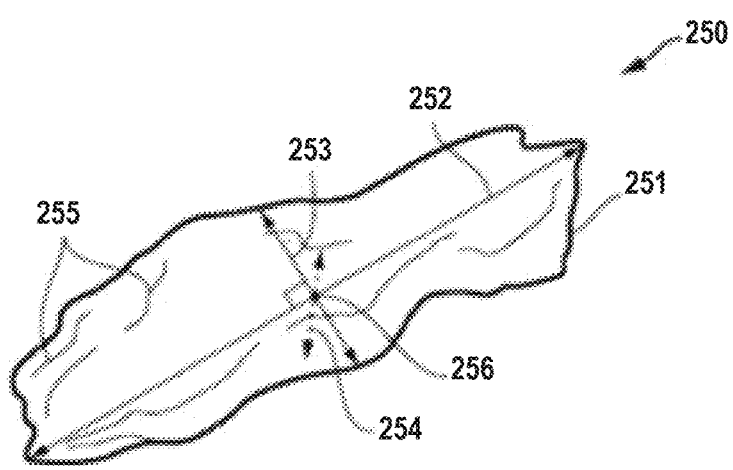
FIG. 2B includes a perspective view illustration of a non-shaped particle, according to an example embodiment.

FIG. 2B includes an illustration of a non-shaped particle, which may be an elongated, non-shaped abrasive particle or a secondary particle, such as a diluent grain, a filler, an agglomerate, or the like. Shaped abrasive particles may be formed through particular processes, including molding, printing, casting, extrusion, and the like. Shaped abrasive particles can be formed such that the each particle has substantially the same arrangement of surfaces and edges relative to each other. For example, a group of shaped abrasive particles generally have the same arrangement and orientation and or two-dimensional shape of the surfaces and edges relative to each other. As such, the shaped abrasive particles have a relatively high shape fidelity and consistency in the arrangement of the surfaces and edges relative to each other. Moreover, constant height abrasive particles (CHAPs) can also be formed through particular processes that facilitate formation of thin-shaped bodies that can have irregular two-dimensional shapes when viewing the major surface top-down. CHAPs can have less shape fidelity than shaped abrasive particles, but can have substantially planar and parallel major surfaces separated by a side surface.

By contrast, non-shaped particles can be formed through different processes and have different shape attributes compared to shaped abrasive particles and CHAPs. For example, non-shaped particles are typically formed by a comminution process wherein a mass of material is formed and then crushed and sieved to obtain abrasive particles of a certain size. However, a non-shaped particle will have a generally random arrangement of surfaces and edges, and generally will lack any recognizable two-dimensional or three dimensional shape in the arrangement of the surfaces and edges. Moreover, non-shaped particles do not necessarily have a consistent shape with respect to each other, and therefore have a significantly lower shape fidelity compared to shaped abrasive particles or CHAPs. The non-shaped particles generally are defined by a random arrangement of surfaces and edges for each particle and with respect to other non-shaped particles FIG. 2B includes a perspective view illustration of a non-shaped particle. The non-shaped particle 250 can have a body 251 including a generally random arrangement of edges 255 extending along the exterior surface of the body 251. The body can further include a longitudinal axis 252 defining the longest dimension of the particle. The longitudinal axis 252 defines the longest dimension of the body as viewed in two-dimensions. Thus, unlike shaped abrasive particles and CHAPs, where the longitudinal axis is measured on the major surface, the longitudinal axis of a non-shaped particle is defined by the points on the body furthest from each other as the particle is viewed in two-dimensions using an image or vantage that provides a view of the particle's longest dimension. That is, an elongated particle, but non-shaped particles, such as illustrated in FIG. 2B, should be viewed in a perspective that makes the longest dimension apparent to properly evaluate the longitudinal axis. The body 251 can further include a lateral axis 253 extending perpendicular to the longitudinal axis 252 and defining a width of the particle. The lateral axis 253 can extend perpendicular to the longitudinal axis 252 through the midpoint 256 of the longitudinal axis in the same plane used to identify the longitudinal axis 252. The abrasive particle may have a height (or thickness) as defined by the vertical axis 254. The vertical axis 254 can extend through the midpoint 256 but in a direction perpendicular to the plane used to define the longitudinal axis 252 and lateral axis 253. To evaluate the height, one may have to change the perspective of view of the abrasive particle to look at the particle from a different vantage than is used to evaluate the length and width.

As will be appreciated, the abrasive particle can have a length defined by the longitudinal axis 252, a width defined by the lateral axis 253, and a vertical axis 254 defining a height. As will be appreciated, the body 251 can have a primary aspect ratio of length:width such that the length is equal to or greater than the width. Furthermore, the length of the body 251 can be equal to or greater than or equal to the height. Finally, the width of the body 251 can be greater than or equal to the height. In accordance with an embodiment, the primary aspect ratio of length:width can be at least 1.1:1, at least 1.2:1, at least 1.5:1, at least 1.8:1, at least 2:1, at least 3:1, at least 4:1, at least 5:1, at least 6:1, or even at least 10:1. In another non-limiting embodiment, the body 251 of the elongated shaped abrasive particle can have a primary aspect ratio of length:width of not greater than 100:1, not greater than 50:1, not greater than 10:1, not greater than 6:1, not greater than 5:1, not greater than 4:1, not greater than 3:1, or even not greater than 2:1. It will be appreciated that the primary aspect ratio of the body 251 can be within a range including any of the minimum and maximum ratios noted above.

Furthermore, the body 251 can include a secondary aspect ratio of width:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the secondary aspect ratio width:height of the body 251 can be not greater than 100:1, such as not greater than 50:1, not greater than 10:1, not greater than 8:1, not greater than 6:1, not greater than 5:1, not greater than 4:1, not greater than 3:1, or even not greater than 2:1. It will be appreciated the secondary aspect ratio of width:height can be with a range including any of the minimum and maximum ratios of above.

In another embodiment, the body 251 can have a tertiary aspect ratio of length:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the tertiary aspect ratio length:height of the body 251 can be not greater than 100:1, such as not greater than 50:1, not greater than 10:1, not greater than 8:1, not greater than 6:1, not greater than 5:1, not greater than 4:1, not greater than 3:1, It will be appreciated that the tertiary aspect ratio the body 251 can be with a range including any of the minimum and maximum ratios and above.

The non-shaped particle 250 can have any of the attributes of abrasive particles described in the embodiments herein, including for example but not limited to, composition, microstructural features (e.g., average grain size), hardness, porosity, and the like.

The abrasive articles of the embodiments herein may incorporate different types of particles, including different types of abrasive particles, different types of secondary particles, or any combination thereof. For example, in one embodiment, the coated abrasive article can include a first type of abrasive particle comprising shaped abrasive particles and a second type of abrasive particle. The second type of abrasive particle may be a shaped abrasive particle or a non-shaped abrasive particle.

Figure 3:
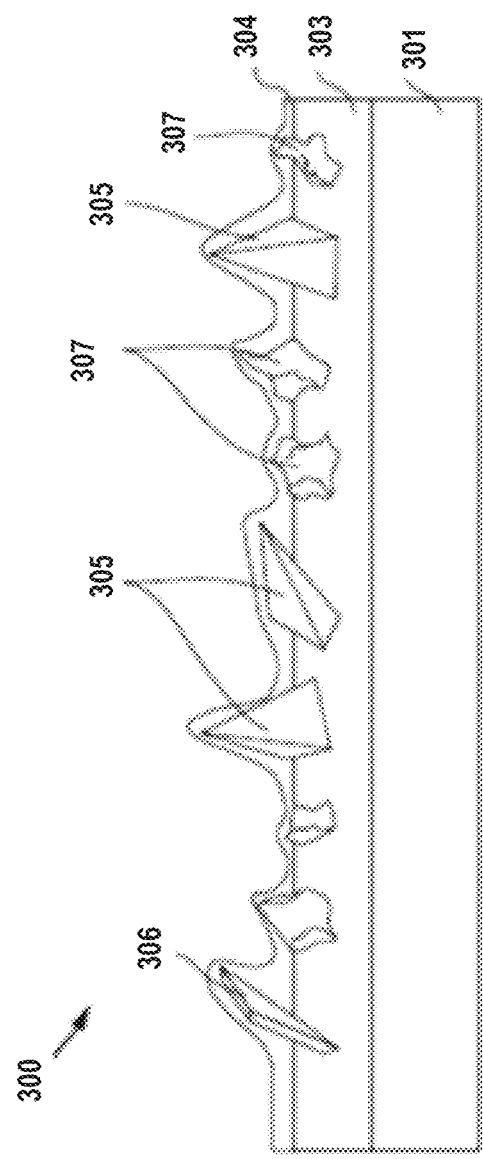
FIG. 3 includes a cross-sectional illustration of a coated abrasive article incorporating particulate material, according to an example embodiment.

FIG. 3 includes a cross-sectional illustration of a coated abrasive article incorporating particulate material in accordance with an embodiment. As illustrated, the coated abrasive 300 can include a substrate 301 and a make coat 303 overlying a surface of the substrate 301. The coated abrasive 300 can further include a first type of particulate material 305 in the form of a first type of shaped abrasive particle, a second type of particulate material 306 in the form of a second type of shaped abrasive particle, and a third type of particulate material 307, which may be a secondary particle, such as a diluent abrasive particle, a non-shaped abrasive particle, a filler, and the like. The coated abrasive 300 may further include size coat 304 overlying and bonded to the abrasive particulate materials 305, 306, 307, and the size coat 304. It will be appreciated that other layers or materials may be added to the substrate other component layers, including for example, but not limited to, a frontfill, a backfill, and the like as known to those of ordinary skill in the art.

According to one embodiment, the substrate 301 can include an organic material, inorganic material, and a combination thereof. In certain instances, the substrate 301 can include a woven material. However, the substrate 301 may be made of a non-woven material. Particularly suitable substrate materials can include organic materials, including polymers, and particularly, polyester, polyurethane, polypropylene, polyimides such as KAPTON from DuPont, paper or any combination thereof. Some suitable inorganic materials can include metals, metal alloys, and particularly, foils of copper, aluminum, steel, and a combination thereof. In the context of a non-woven substrate, which may be open web of fibers, the abrasive particles may be adhered to the fibers by one or more adhesive layers. In such non-woven products, the abrasive particles are coating the fibers, but not necessarily forming a conformal layer overlying a major surface of the substrate as illustrated in FIG. 3. It will be appreciated that such non-woven products are included in the embodiments herein.

The make coat 303 can be applied to the surface of the substrate 301 in a single process, or alternatively, the particulate materials 305, 306, 307 can be combined with a make coat 303 material and the combination of the make coat 303 and particulate materials 305-307 can be applied as a mixture to the surface of the substrate 301. In certain instances, controlled deposition or placement of the particles 305-307 in the make coat may be better suited by separating the processes of applying the make coat 303 from the deposition of the abrasive particulate materials 305-307 in the make coat 303. Still, it is contemplated that such processes may be combined. Suitable materials of the make coat 303 can include organic materials, particularly polymeric materials, including for example, polyesters, epoxy resins, polyurethanes, polyamides, polyacrylates, polymethacrylates, polyvinylchlorides, polyethylene, polysiloxane, silicones, cellulose acetates, nitrocellulose, natural rubber, starch, shellac, and mixtures thereof. In one embodiment, the make coat 303 can include a polyester resin. The coated substrate can then be heated in order to cure the resin and the abrasive particulate material to the substrate. In general, the coated substrate 301 can be heated to a temperature of between about 100° C. to less than about 250° C. during this curing process.

The particulate materials 305-307 can include different types of abrasive particles according to embodiments herein. The different types of abrasive particles can include different types of shaped abrasive particles, different types of secondary particles or a combination thereof. The different types of particles can be different from each other in composition, two-dimensional shape, three-dimensional shape, grain size, particle size, hardness, friability, agglomeration, and a combination thereof. As illustrated, the coated abrasive 300 can include a first type of shaped abrasive particle 305 having a generally pyramidal shape and a second type of shaped abrasive particle 306 having a generally triangular two-dimensional shape. The coated abrasive 300 can include different amounts of the first type and second type of shaped abrasive particles 305 and 306. It will be appreciated that the coated abrasive may not necessarily include different types of shaped abrasive particles, and can consist essentially of a single type of shaped abrasive particle. As will be appreciated, the shaped abrasive particles of the embodiments herein can be incorporated into various fixed abrasives (e.g., bonded abrasives, coated abrasive, non-woven abrasives, thin wheels, cut-off wheels, reinforced abrasive articles, and the like), including in the form of blends, which may include different types of shaped abrasive particles, secondary particles, and the like.

The particles 307 can be secondary particles different than the first and second types of shaped abrasive particles 305 and 306. For example, the secondary particles 307 can include crushed abrasive grit representing non-shaped abrasive particles.

After sufficiently forming the make coat 303 with the abrasive particulate materials 305-307 contained therein, the size coat 304 can be formed to overlie and bond the abrasive particulate material 305 in place. The size coat 304 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

III. Example Abrasive Articles

Figure 4:
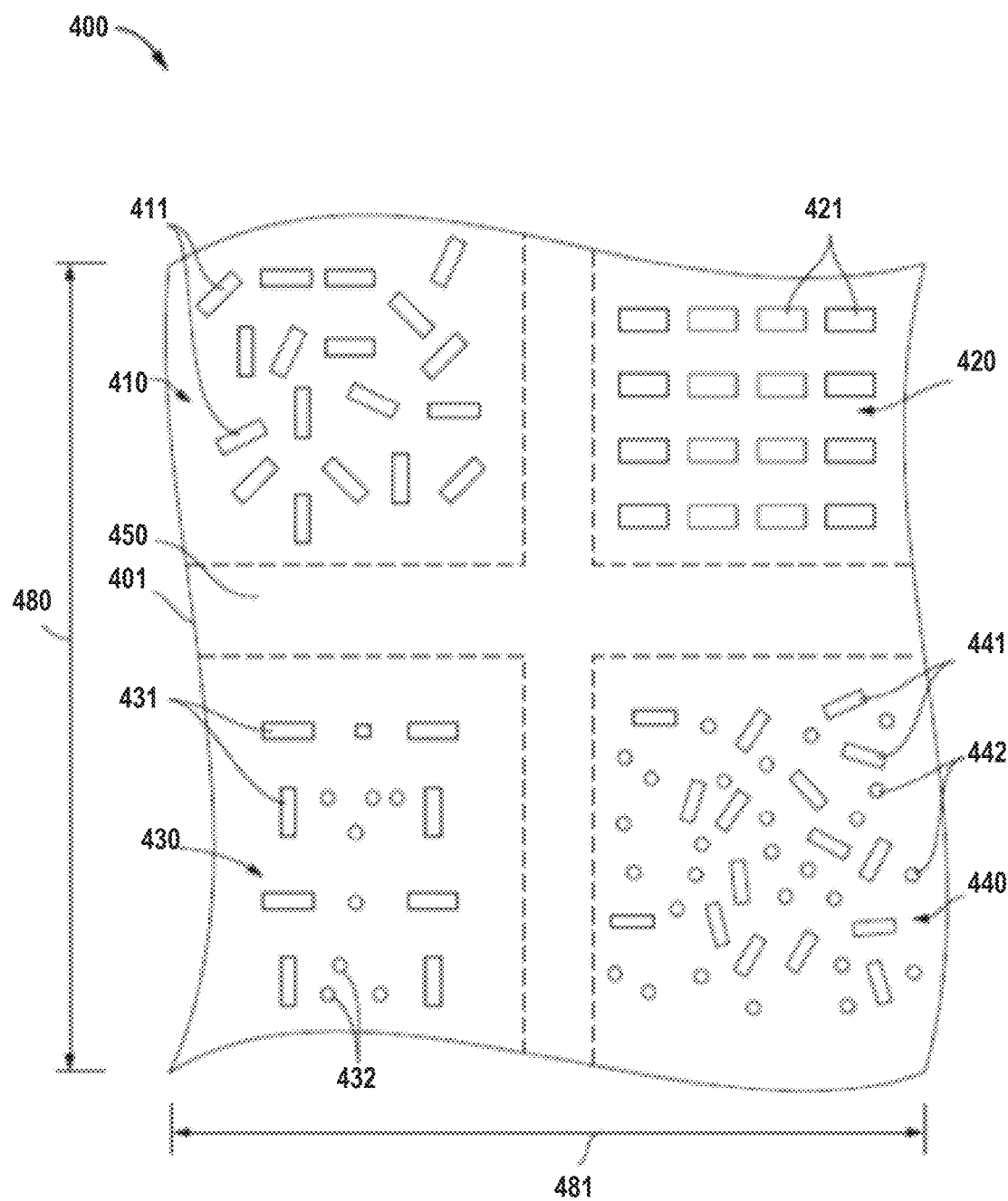
FIG. 4 includes a top view of a portion of a coated abrasive, according to an example embodiment.

FIG. 4 includes a top view of a portion of a coated abrasive according to an embodiment. The coated abrasive 400 can include a plurality of regions, such as a first region 410, a second region 420, a third region 430 and a fourth region 440. Each of the regions 410, 420, 430, and 440 can be separated by a channel region 450, wherein the channel region 450 defines a region the backing that is free of particles. The channel region 450 can have any size and shape and may be particularly useful for removing swarf and improved grinding operations. The channel region may have a length (i.e., longest dimension) and width (i.e., shortest dimension perpendicular to the length) that is greater than the average spacing between immediately adjacent abrasive particles within any of the regions 410, 420, 430, and 440. The channel region 450 is an optional feature for any of the embodiments herein.

As further illustrated, the first region 410 can include a group of shaped abrasive particles 411 having a generally random rotational orientation with respect to each other. The group of shaped abrasive particles 411 can be arranged in a random distribution relative to each other, such that there is no discernable short-range or long-range order with regard to the placement of the shaped abrasive particles 411. Notably, the group of shaped abrasive particles 411 can be substantially homogenously distributed within the first region 410, such that the formation of clumps (two or more particles in contact with each other) is limited. It will be appreciated that the grain weight of the group of shaped abrasive particles 411 in the first region 410 can be controlled based on the intended application of the coated abrasive.

The second region 420 can include a group of shaped abrasive particles 421 arranged in a controlled distribution relative to each other. Moreover, the group of shaped abrasive particles 421 can have a regular and controlled rotational orientation relative to each other. As illustrated, the group of shaped abrasive particles 421 can have generally the same rotational orientation as defined by the same rotational angle on the backing of the coated abrasive 401. Notably, the group of shaped abrasive particles 421 can be substantially homogenously distributed within the second region 420, such that the formation of clumps (two or more particles in contact with each other) is limited. It will be appreciated that the grain weight of the group of shaped abrasive particles 421 in the second region 420 can be controlled based on the intended application of the coated abrasive.

The third region 430 can include a plurality of groups of shaped abrasive particles 421 and secondary particles 432. The group of shaped abrasive particles 431 and secondary particles 432 can be arranged in a controlled distribution relative to each other. Moreover, the group of shaped abrasive particles 431 can have a regular and controlled rotational orientation relative to each other. As illustrated, the group of shaped abrasive particles 431 can have generally one of two types of rotational orientations on the backing of the coated abrasive 401. Notably, the group of shaped abrasive particles 431 and secondary particles 432 can be substantially homogenously distributed within the third region 430, such that the formation of clumps (two or more particles in contact with each other) is limited. It will be appreciated that the grain weight of the group of shaped abrasive particles 431 and secondary particles 432 in the third region 430 can be controlled based on the intended application of the coated abrasive.

The fourth region 440 can include a group of shaped abrasive particles 441 and secondary particles 442 having a generally random distribution with respect to each other. Additionally, the group of shaped abrasive particles 441 can have a random rotational orientation with respect to each other. The group of shaped abrasive particles 441 and secondary particles 442 can be arranged in a random distribution relative to each other, such that there is no discernable short-range or long-range order. Notably, the group of shaped abrasive particles 441 and the secondary particles 442 can be substantially homogenously distributed within the fourth region 440, such that the formation of clumps (two or more particles in contact with each other) is limited. It will be appreciated that the grain weight of the group of shaped abrasive particles 441 and secondary particles 442 in the fourth region 440 can be controlled based on the intended application of the coated abrasive.

As illustrated in FIG. 4, the coated abrasive article 400 can include different regions 410, 420, 430, and 440, each of which can include different groups of particles, such as shaped particles and secondary particles. The coated abrasive article 400 is intended to illustrate the different types of groupings, arrangements and distributions of particles that may be created using the systems and processes of the embodiments herein. The illustration is not intended to be limited to only those groupings of particles and it will be appreciated that coated abrasive articles can be made including only one region as illustrated in FIG. 4. It will also be understood that other coated abrasive articles can be made including a different combination or arrangement of one or more of the regions illustrated in FIG. 4.

Figure 5:
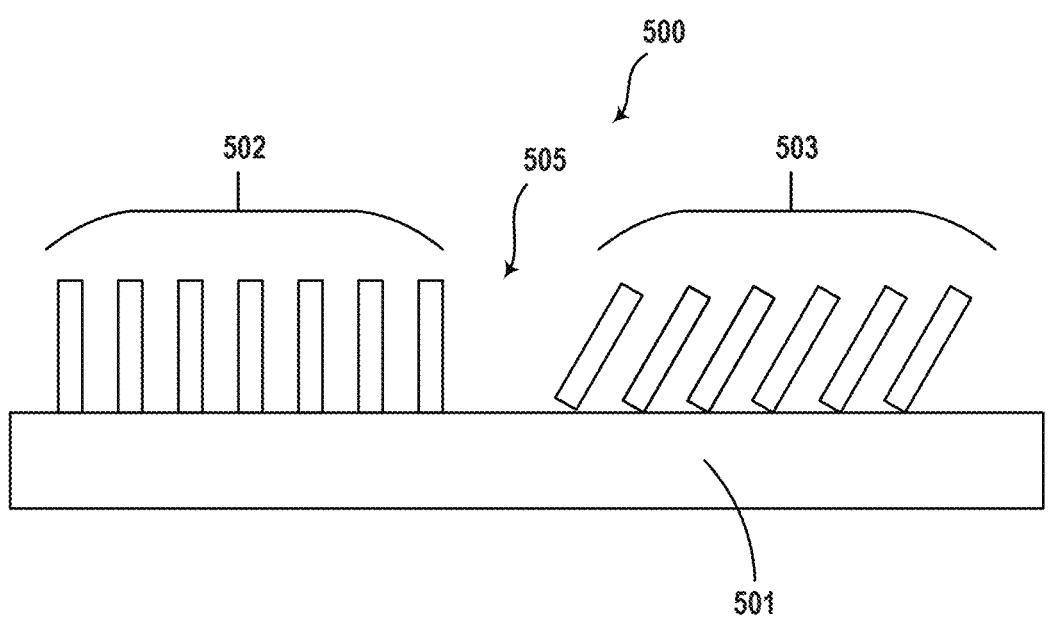
FIG. 5 illustrates a cross-sectional of a portion of a coated abrasive, according to an example embodiment.

According to another embodiment, a coated abrasive article may be formed that includes different groups of abrasive particles, wherein the different groups have different tilt angles with respect to each other. For example, as illustrated in FIG. 5, a cross-sectional illustration of a portion of a coated abrasive is provided. The coated abrasive 500 can include a backing 501 and a first group of abrasive particles 502, wherein each of the abrasive particles in the first group of abrasive particles 502 have a first average tilt angle. The coated abrasive 500 can further include a second group of abrasive particles 503, wherein each of the abrasive particles in the second group of abrasive particles 503 have a second average tilt angle. According to one embodiment the first group of abrasive particles 502 and the second group of abrasive particles 503 can be separated by a channel region 505. Moreover, the first average tilt angle can be different than the second average tilt angle. In a more particular embodiment, the first group of abrasive particles may be oriented in an upright orientation and the second group of abrasive particles may be oriented in a slanted orientation. Without wishing to be tied to a particular theory, it is thought that controlled variation of the tilt angle for different groups of abrasive particles in different regions of the coated abrasive may facilitate improved performance of the coated abrasive.

According to one particular aspect, the content of abrasive particles overlying the backing can be controlled based on the intended application. For example, the abrasive particles can be overlying at least 5% of the total surface area of the backing, such as at least 10% or at least 20% or at least 30% or at least 40% or at least 50% or at least 60% or at least 70% or at least 80% or at least 90%. In still another embodiment, the coated abrasive article may be essentially free of silane.

Furthermore, the abrasive articles of the embodiments herein can have a particular content of particles overlying the substrate. Moreover, it is noted that for certain contents of particles on the backing, such as open coat densities, the industry has found it challenging to obtain certain contents of particles in desired vertical orientations. In one embodiment, the particles can define an open coat abrasive product having a coating density of particles (i.e., abrasive particles, secondary particles, or both abrasive particles and secondary particles) of not greater than about 70 particles/cm$^2$. In other instances, the density of shaped abrasive particle per square centimeter of the abrasive article may be not greater than about 65 particles/cm$^2$, such as not greater than about 60 particles/cm$^2$, not greater than about 55 particles/cm$^2$, or even not greater than about 50 particles/cm$^2$. Still, in one non-limiting embodiment, the density of the open coat coated abrasive using the shaped abrasive particle herein can be at least about 5 particles/cm$^2$, or even at least about 10 particles/cm$^2$. It will be appreciated that the density of shaped abrasive particles per square centimeter of abrasive article can be within a range between any of the above minimum and maximum values.

In certain instances, the abrasive article can have an open coat density of not greater than about 50% of particles (i.e., abrasive particles or secondary particles or the total of abrasive particles and secondary particles) covering the exterior abrasive surface of the article. In other embodiments, the area of the abrasive particles relative to the total area of the surface on which the particles are placed can be not greater than about 40%, such as not greater than about 30%, not greater than about 25%, or even not greater than about 20%. Still, in one non-limiting embodiment, the percentage coating of the particles relative to the total area of the surface can be at least about 5%, such as at least about 10%, at least about 15%, at least about 20%, at least about 25%, at least about 30%, at least about 35%, or even at least about 40%. It will be appreciated that the percent coverage of the particles for the total area of abrasive surface can be within a range between any of the above minimum and maximum values.

Some abrasive articles may have a particular content of particles (i.e., abrasive particles or secondary particles or the total of abrasive particles and secondary particles) for a given area (e.g., ream, wherein 1 ream=30.66 m$^2$) of the backing. For example, in one embodiment, the abrasive article may utilize a normalized weight of particles of at least about 1 lbs/ream (14.8 grams/m$^2$), such as at least 5 lbs/ream or at least 10 lbs/ream or at least about 15 lbs/ream or at least about 20 lbs/ream or at least about 25 lbs/ream or even at least about 30 lbs/ream. Still, in one non-limiting embodiment, the abrasive article can include a normalized weight of particles of not greater than about 90 lbs/ream (1333.8 grams/m$^2$), such as not greater than 80 lbs/ream or not greater than 70 lbs/ream or not greater than 60 lbs/ream or not greater than about 50 lbs/ream or even not greater than about 45 lbs/ream. It will be appreciated that the abrasive articles of the embodiments herein can utilize a normalized weight of particles within a range between any of the above minimum and maximum values.

In certain instances, the abrasive articles can be used on particular workpieces. A suitable exemplary workpiece can include an inorganic material, an organic material, a natural material, and a combination thereof. According to a particular embodiment, the workpiece can include a metal or metal alloy, such as an iron-based material, a nickel-based material, and the like. In one embodiment, the workpiece can be steel, and more particularly, can consist essentially of stainless steel (e.g., 304 stainless steel).

In another embodiment, the fixed abrasive article may be a bonded abrasive, including abrasive particles contained within the three-dimensional volume of the bond material, which can be distinct from certain other fixed abrasive articles including, for example, coated abrasive articles, which generally include a single layer of abrasive particles contained within a binder, such as a make coat and/or size coat. Furthermore, coated abrasive articles generally include a backing as a support for the layer of abrasive particles and binder. By contrast, bonded abrasive articles are generally self-supporting articles including a three-dimensional volume of abrasive particles, bond material, and optionally some porosity. Bonded abrasive articles may not necessarily include a substrate, and can be essentially free of a substrate.

Figure 6:
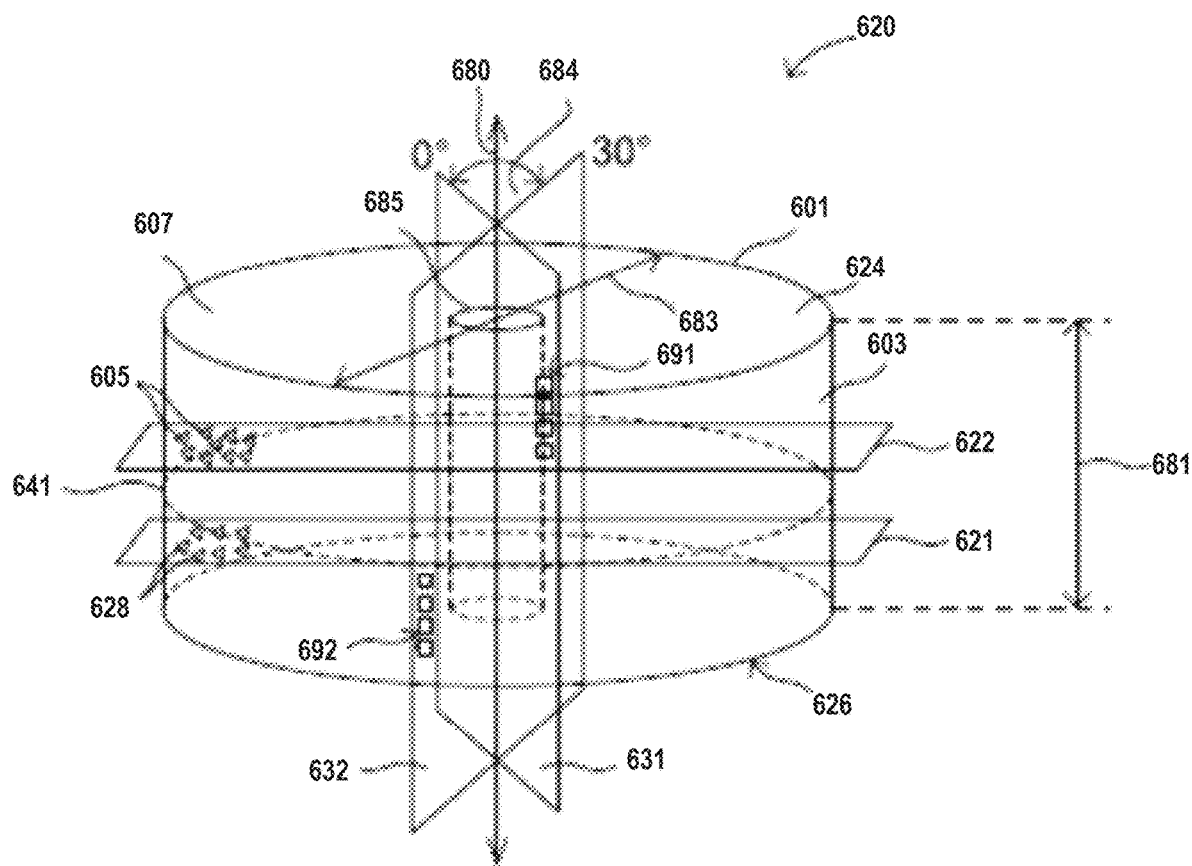
FIG. 6 includes a perspective view illustration of a bonded abrasive article, according to an example embodiment.

FIG. 6 includes a perspective view illustration of a bonded abrasive article in accordance with an embodiment. As illustrated, the bonded abrasive article 620 can have a body 601 of a generally cylindrical shape including an upper surface 624, a bottom surface 626, and a side surface 603 extending between the upper surface 624 and bottom surface 626. It will be appreciated that the fixed abrasive article of FIG. 6 is a non-limiting example, and other shapes of the body may be utilized including, but not limited to, conical, cup-shaped, depressed center wheels (e.g., T42), and the like. Finally, as further illustrated, the body 601 can include a central opening 685 which may be configured to accept an arbor or shaft for mounting of the body 601 on a machine configured to rotate the body 601 and facilitate a material removal operation.

The bonded abrasive article 620 can have a body 601 including abrasive particles, including for example, the groups of abrasive particles 605 and 628, contained within the volume of the body 601. The abrasive particles may be contained within the three-dimensional volume of the body 601 by a bond material 607 that can extend throughout the three-dimensional volume of the body 601. In accordance with an embodiment, the bond material 607 can include materials such as vitreous, polycrystalline, monocrystalline, organic (e.g., resin), metal, metal alloys, and a combination thereof.

In a particular embodiment, the abrasive particles may be encapsulated within the bond material 607. As used herein, "encapsulated" refers to a condition whereby at least one of the abrasive particles is fully surrounded by a homogenous, or generally homogenous, composition of bond material. In an embodiment, the bonded abrasive article 620 can be essentially free of a fixation layer. In a particular instance, the bonded abrasive article 620 can be substantially uniform throughout a volume of the body 601. In more particular instances, the body 601 can have a substantially homogenous composition throughout the volume of the body 601.

In accordance with an embodiment, the abrasive particles contained within the bonded abrasive article 620 can include abrasive materials in accordance with those described in embodiments herein.

The bonded abrasive article 620 can include a combination of abrasive particles, including one or more types of abrasive particles, such as primary and secondary types of abrasive particles. Primary and secondary types may refer to the content of the abrasive particles within the body of the fixed abrasive article, wherein the primary type abrasive particles are present in a higher content than the secondary type of abrasive particles. In other instances, the distinction between primary and secondary types of abrasive particles may be based upon the position of the abrasive particle within the body, wherein the primary abrasive particles may be positioned to conduct an initial stage of material removal or conduct the majority of material removal compared to the secondary abrasive particles. In still other instances, the distinction between primary and secondary abrasive particles may pertain to the abrasive nature (e.g., hardness, friability, fracture mechanics, etc.) of the abrasive particles, wherein the abrasive nature of the primary particles is typically more robust as compared to the secondary type of abrasive particles. Some suitable examples of abrasive particles that may be considered as a secondary type of abrasive particle include diluent particles, agglomerated particles, unagglomerated particles, naturally occurring materials (e.g., minerals), synthetic materials, and a combination thereof.

In certain instances, the bonded abrasive article 620 can include a particular content of abrasive particles within the body 601 that may facilitate suitable material removal operations. For example, the body 601 can include a content of abrasive particles of at least 0.5 vol % and not greater than 60 vol % for a total volume of the body.

Furthermore, the body 601 of the bonded abrasive article 620 can include a particular content of bond material 607 that may facilitate suitable operation of the bonded abrasive article 620. For example, the body 601 can include a content of bond material 607 of at least 0.5 vol % and not greater than about 90 vol % for a total volume of the body.

In certain instances, the fixed abrasive article can have a body 601 including a content of porosity. The porosity can extend throughout at least a portion of the entire volume of the body 601, and in certain instances, may extend substantially uniformly throughout the entire volume of the body 601. For example, the porosity can include closed porosity or open porosity. Closed porosity can be in the form of discrete pores that are isolated from each other by bond material and/or abrasive particles. Such closed porosity may be formed by pore formers. In other instances, the porosity may be open porosity defining an interconnected network of channels extending throughout at least a portion of the three-dimensional volume of the body 601. It will be appreciated that the body 601 may include a combination of closed porosity and open porosity.

In accordance with an embodiment, the fixed abrasive article can have a body 601 including a particular content of porosity that can facilitate suitable material removal operations. For example, the body 601 can have a porosity of at least 0.5 vol % and not greater than 80 vol % for a total volume of the body.

In accordance with another embodiment, it will be appreciated that the bonded abrasive article 620 can include a body 601 including certain additives that may facilitate certain grinding operations. For example, the body 601 can include additives such as fillers, grinding aids, pore inducers, hollow materials, catalysts, coupling agents, curants, antistatic agents, suspending agents, anti-loading agents, lubricants, wetting agents, dyes, fillers, viscosity modifiers, dispersants, defoamers, and a combination thereof.

As further illustrated in FIG. 6, the body 601 can have a diameter 683, which may be varied according to the desired material removal operation. The diameter can refer to the maximum diameter of the body, particularly in those cases where the body 601 has a conical or cup-shaped contour.

Moreover, the body 601 can have a particular thickness 681 extending along the side surface 603 between the upper surface 624 and the bottom surface 626 along the axial axis 680. The body 601 can have a thickness 681, which may be an average thickness of the body 601, which can be not greater than 1 m.

In accordance with an embodiment, the body 601 may have a particular relationship between the diameter 683 and thickness 681, defining a ratio of diameter:thickness that may be suitable for certain material removal operations. For example, the body 601 can have a ratio of diameter:thickness of at least 10:1, such as at least 15:1, at least 20:1, at least 50:1, or even at least 100:1. It will be appreciated that the body may have a ratio of diameter:thickness of not greater than 10,000:1 or not greater than 1000:1.

The bonded abrasive article 620 may include at least one reinforcing member 641. In particular instances, the reinforcing material 641 can extend for a majority of the entire width (e.g., the diameter 683) of the body 601. However, in other instances, the reinforcing member 641 may extend for only a fraction of the entire width (e.g., diameter 183) of the body 601. In certain instances, the reinforcing member 641 may be included to add suitable stability to the body for certain material removal operations. In accordance with an embodiment, the reinforcing member 641 can include a material such as a woven material, a nonwoven material, a composite material, a laminated material, a monolithic material, a natural material, a synthetic material, and a combination thereof. More particularly, in certain instances, the reinforcing member 641 can include a material such as a monocrystalline material, a polycrystalline material, a vitreous material, an amorphous material, a glass (e.g., a glass fiber), a ceramic, a metal, an organic material, an inorganic material, and a combination thereof. In particular instances, the reinforcing material 641 may include fiberglass, and may be formed essentially from fiberglass.

In particular instances, the reinforcing material 641 can be substantially contained within the three-dimensional volume of the body 601, more particularly, within the three-dimensional volume of the bond material 607. In certain instances, the reinforcing material 641 may intersect an exterior surface of the body 601 including, but not limited to, the upper surface 624, side surface 603, and/or bottom surface 626. For example, the reinforcing material 641 can intersect the upper surface 624 or bottom surface 626. In at least one embodiment, the reinforcing material 641 may define the upper surface 624 or bottom surface 626 of the body 601, such that the bond material 607 is disposed between one or more reinforcing materials. It will be appreciated that while a single reinforcing member 641 is illustrated in the embodiment of FIG. 6 a plurality of reinforcing members may be provided within the body 601 in a variety of arrangements and orientations suitable for the intended material removal application.

As further illustrated, the body 601 can include certain axes and planes defining the three-dimensional volume of the body 601. For example, the body 601 of the fixed abrasive article 620 can include an axial axis 680. As further illustrated along the axial axis 680, the body 601 can include a first axial plane 631 extending along the axial axis 680 and through a particular diameter of the body 601 at a particular angular orientation, designated herein as 0°. The body 601 can further include a second axial plane 632 distinct from the first axial plane 631. The second axial plane 632 can extend along the axial axis 680 and through a diameter of the body 601 at an angular position, as designated by example herein as 30°. The first and second axial planes 631 and 632 of the body 601 may define particular axial collections of abrasive particles within the body 601 including, for example, the axial collection of abrasive particles 691 within the axial plane 631 and the axial collection of abrasive particles 692 within the axial plane 632. Furthermore, the axial planes of the body 601 may define sectors there between, including for example, sector 684 defined as the region between the axial planes 631 and 632 within the body 601. The sectors can include a particular group of abrasive particles that may facilitate improved material removal operations. Reference herein to features of portions of abrasive particles within the body, including for example, abrasive particles within axial planes will also be relevant to groups of abrasive particles contained within one or more sectors of the body.

As further illustrated, the body 601 can include a first radial plane 621 extending along a plane that is substantially parallel to the upper surface 624 and/or bottom surface 626 at a particular axial location along the axial axis 680. The body can further include a second radial plane 622, which can extend in a substantially parallel manner to the upper surface 624 and/or bottom surface 626 at a particular axial location along the axial axis 680. The first radial plane 621 and second radial plane 622 can be separated from each other within the body 601, and more particularly, the first radial plane 621 and second radial plane 622 can be axially separated from each other. As further illustrated, in certain instances, one or more reinforcing members 641 may be disposed between the first and second radial planes 621 and 622. The first and second radial planes 621 and 622 may include one or more particular groups of abrasive particles including, for example, the group of abrasive particles 628 of the first radial plane 621 and the group of abrasive particles 605 of the second radial plane 622, which may have certain features relative to each other that may facilitate improved grinding performance.

The abrasive particles of the embodiments herein can include particular types of abrasive particles. For example, the abrasive particles may include shaped abrasive particles and/or elongated abrasive particles, wherein the elongated abrasive particles may have an aspect ratio of length:width or length:height of at least 1.1:1. Various methods may be utilized to obtain shaped abrasive particles. The particles may be obtained from a commercial source or fabricated. Some suitable processes used to fabricate the shaped abrasive particles can include, but is not limited to, depositing, printing (e.g., screen-printing), molding, pressing, casting, sectioning, cutting, dicing, punching, pressing, drying, curing, coating, extruding, rolling, and a combination thereof. Similar processes may be utilized to obtain elongated abrasive particles. Elongated un-shaped abrasive particles may be formed through crushing and sieving techniques.

Figure 7A:
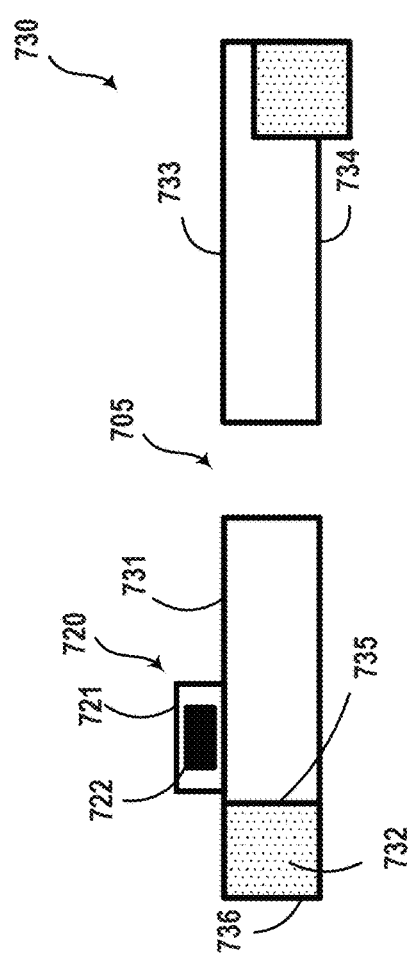
FIG. 7A illustrates a cross-sectional view of an abrasive article, according to an example embodiment.

FIG. 7A illustrates a cross-sectional view of an abrasive article 730, according to an example embodiment. The abrasive article 730 includes an abrasive portion 732 and a non-abrasive portion 731, and an electronic assembly 720 coupled to the non-abrasive portion 731 of an abrasive article 730. The non-abrasive portion 731 can have a first surface 733, a second surface 734, and a side surface 735 extending between the first surface 733 and second surface 734. The first and second surfaces 733 and 734 may be major planar surfaces. The second surface 734 may be a major planar surface of the same size or different size relative to the first surface 733. As further illustrated, the non-abrasive portion 731 may include an opening 705, such as an arbor hole. The electronic assembly 720 can be coupled to the first surface 733. The electronic assembly 720 may include an electronic device 722 and package 721 as described in embodiments herein. In one embodiment, the electronic assembly 720 can include at least one electronic device 722 that may be contained within a package 721. The package 721 may be suitable for attaching the electronic assembly 720 to the body of the abrasive article 730, and may provide some suitable protection of the one or more electronic devices contained therein. In particular examples, the electronic device 722 can be encapsulated within the package 721.

According to one embodiment, the electronic device 722 can be configured to be written-to with information, store information, or provide information to other objects during a read operation. Such information may be relevant to the manufacturing of the abrasive article, operation of the abrasive article or conditions encountered by the electronic assembly 720. Reference herein to the electronic device will be understood to be reference to at least one electronic device, which can include one or more electronic devices. In at least one embodiment, the electronic device 722 can include at least one device selected from the group including an integrated circuit and chip, data transponder, a radio frequency based tag or sensor with or without chip, an electronic tag, electronic memory, a sensor, an analog to digital converter, a transmitter, a receiver, a transceiver, a modulator circuit, a multiplexer, an antenna, a near-field communication device, a power source, a display (e.g., LCD or OLED screen), optical devices (e.g., LEDs), global positioning system (GPS) or device, or any combination thereof. In some instances, the electronic device may optionally include a substrate, a power source, or both. In one particular embodiment, the electronic device 722 can include a tag, such as a passive radio frequency identification (RFID) tag. In another embodiment, the electronic device 722 can include an active radio frequency identification (RFID) tag. An active RFID tag can include a power supply, such as a batter or inductive capacitive (LC) tank circuit. In a further embodiment, the electronic device 1722 can be wired or wireless.

According to one aspect, the electronic device 722 can include a sensor. The sensor may be selectively operated by any system and/or individual within the supply chain. For example, the sensor can be configured to sense one or more processing conditions during the formation of the abrasive article. In another embodiment, the sensor may be configured to sense a condition during use of the abrasive article. In yet another embodiment, the sensor can be configured to sense a condition in the environment of the abrasive article. The sensor can include an acoustic sensor (e.g., ultrasound sensor), force sensor, vibration sensor, temperature sensor, moisture sensor, pressure sensor, gas sensor, timer, accelerometer, gyroscope, or any combination thereof. The sensor can be configured to alert any system and/or individual associated with the abrasive article, such as a manufacturer and/or customer to a particular condition sensed by the sensor. The sensor may be configured to generate an alarm signal to one or more systems and/or individuals in the supply chain, including but not limited to, manufacturers, distributors, customers, users, or any combination thereof.

In another embodiment, the electronic device 722 may include a near-field communication device. A near field communication device can be any device capable of transmitting information via electromagnetic radiation within a certain defined radius of the device, typically less than 20 meters. The near-field communication device can be coupled to one or more electronic devices, including for example a sensor. In one particular embodiment, a sensor can be coupled to the near-field communication device and configured to relay information to one or systems and/or individuals in the supply chain via the near-field communication device.

In an alternative embodiment, the electronic device 722 can include a transceiver. A transceiver can be a device that can receive information and/or transmit information. Unlike passive RFID tags or passive near-field communication devices, which are generally read-only devices that store information for a read operation, a transceiver can actively transmit information without having to conduct an active read operation. Moreover, the transceiver may be capable of transmitting information over various select frequencies, which may improve the communication capabilities of the electronic assembly with a variety of systems and/or individuals in the supply chain.

Figure 7B:
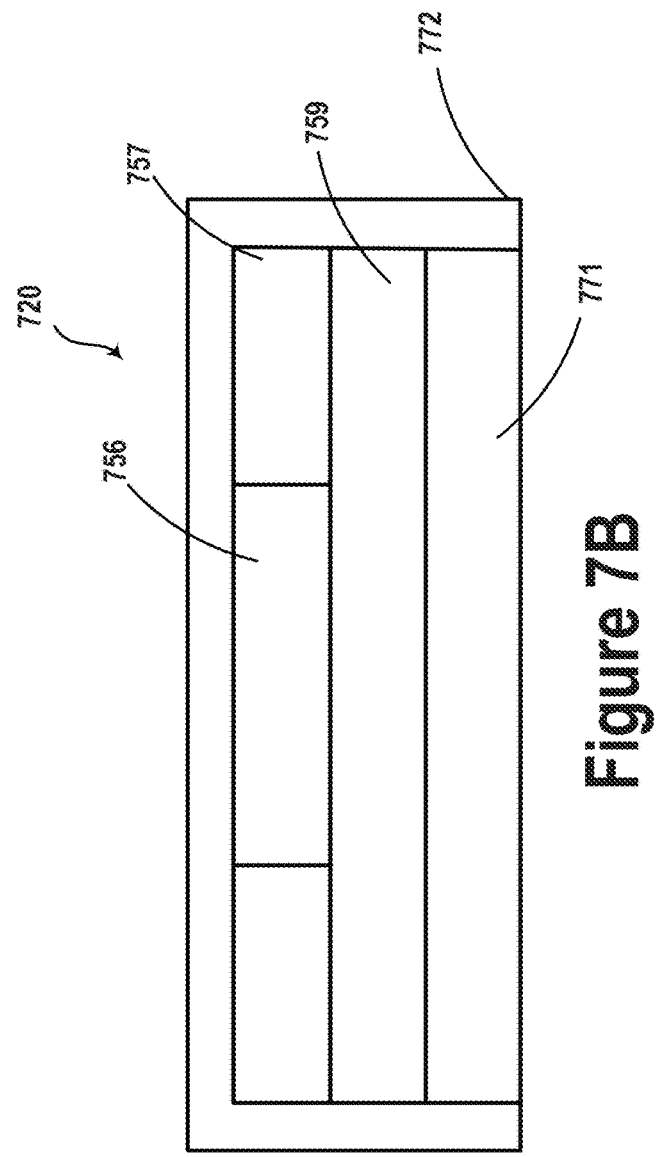
FIG. 7B illustrates a cross-sectional view of an electronic assembly, according to an example embodiment.

FIG. 7B illustrates a cross-sectional view of an electronic assembly, according to an example embodiment. In accordance with one aspect, the electronic assembly 720 may include one or more electronic devices, including for example electronic device 756 and electronic device 757. In certain instances, the electronic assembly 720 may include a substrate 759 upon which the one or more electronic devices 756 and 757 can be disposed. In yet other instances, the electronic assembly 720 may further include a first portion 771 and a second portion 772. The first portion 771 and second portion 772 may be part of a package that may overlie at least a portion of the electronic assembly 720. The package 721 may consist essentially of the first and second portions 771 and 772. For example, as illustrated in FIG. 7B, the first portion 771 can be underlying the substrate 759 and one or more electronic devices 756 and 757. In certain instances, the first portion 771 can be coupled to, such as directly contacting, the second portion 772. In still another embodiment, electronic assembly 720 may include a first portion 771 that is underlying and partially enveloping at least a portion of the substrate 1759 and the one or more electronic devices 756 and 757. The second portion 772 can be overlying at least a portion of the one or more electronic devices 756 and 757. The second portion 772 may be indirectly coupled or directly coupled (e.g., directly contacting or bonded to) the first portion 771. As illustrated, the first portion 771 and second portion 772 can substantially surround the entire one or more electronic devices 756 and 757 as well as substrate 759.

The first portion 771 can underlie at least a portion, such as at least 50% of the electronic device 757. The first portion 771 can electrically insulate and isolate the electronic device 757 from the non-abrasive portion to which it is coupled. In particular instances, the first portion 771 can be disposed between and electrically insulating at least one of the at least one or more electronic devices 756 and 757 from the body of the abrasive article. More particularly, the electronic devices 756 and/or 757 may include at least one antenna, and the first portion 771 can be disposed between and electrically insulating the antenna from the body of the abrasive article.

In certain instances, second portion 772 may act as a protective layer. In some instances, the substrate can serve as a protective layer or facilitate bonding of the electronic assembly to a body to obviate the use of a protective layer that is disposed underlying the substrate. In another instance, the protective layer may be disposed to underlie the electronic device and an upper surface and side surfaces of the electronic devices 757 or 756 may not be covered by the protective layer. In a further embodiment, the electronic assembly 720 can include an extra protection layer that is disposed over and/or under the second portion for additional protection. The second portion 772 can act as a protective layer to limit impact of coolant and swarf on the electronic assembly. In other instances, the protective layer may protect the electronic devices from mechanical damage or chemical damage during re-profiling, dressing, maintenance of the abrasive portion or non-abrasive portion, and the like.

Figure 8A:
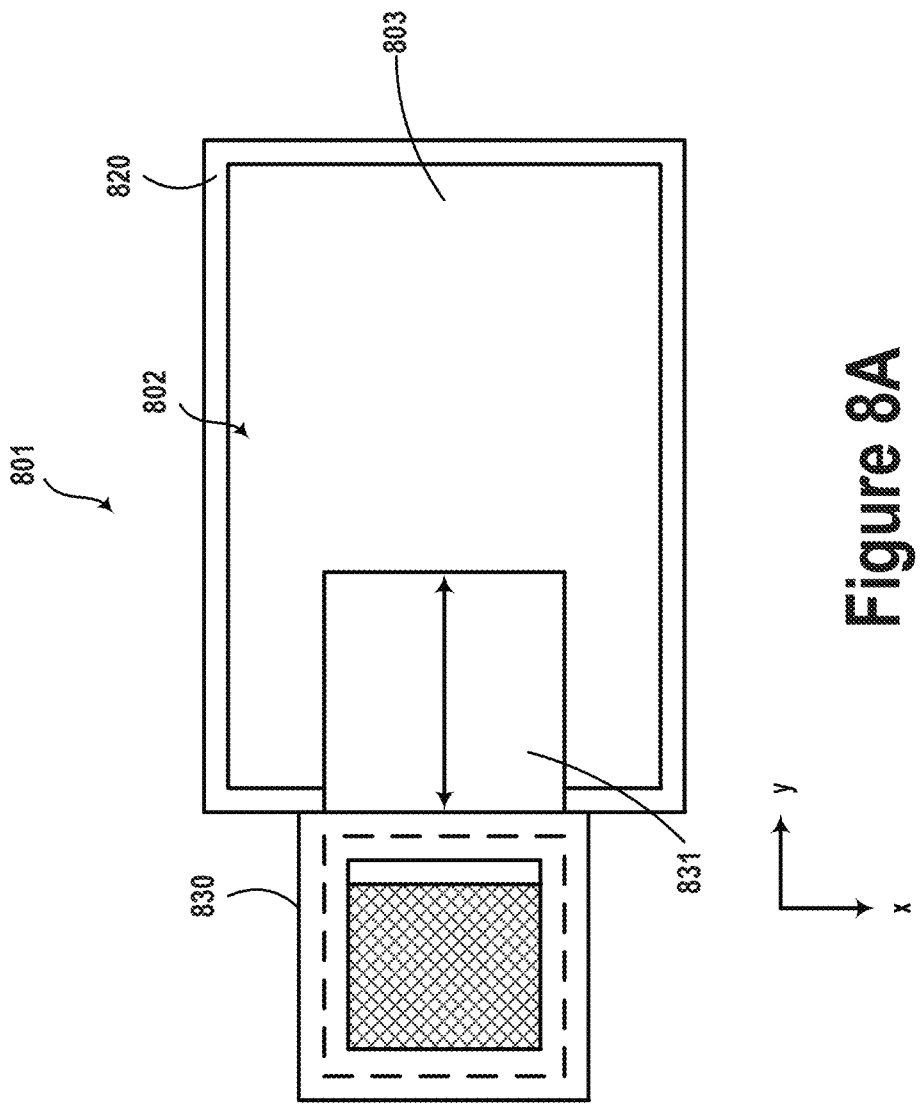
FIG. 8A illustrates a top-down view of a releasable coupling of an electronic assembly on a body, according to an example embodiment.

FIG. 8A illustrates a top-down view of a releasable coupling of an electronic assembly on a body, according to an example embodiment. As illustrated, the body 801 can include an upper surface 802. An electronic assembly 803 may be contained within a cavity 820 in the body 801. The electronic assembly 803 may be press-fit in the cavity 820. A securing assembly 830 including a securing element 831 may be configured to translate from and engaged position to a disengaged position. In an engaged position, as illustrated in FIG. 8A, the securing element 831 can be overlying and engaging the electronic assembly 803, thus securing the electronic assembly 803 to the body 801. In a disengaged position, the securing element 831 may be spaced apart from and disengaged from the electronic assembly 803. The securing element 831 may articulate between the engaged position and the disengaged position by translating in the Y-direction. In the disengaged position, the electronic assembly 803 is in a non-secure position and may be readily removed from the body 801. In such instances, removal of electronic assembly 803 from the body 801 may be accomplished without need for applying heat or other chemical additives to remove or dissolve an adhesive.

Figure 8B:
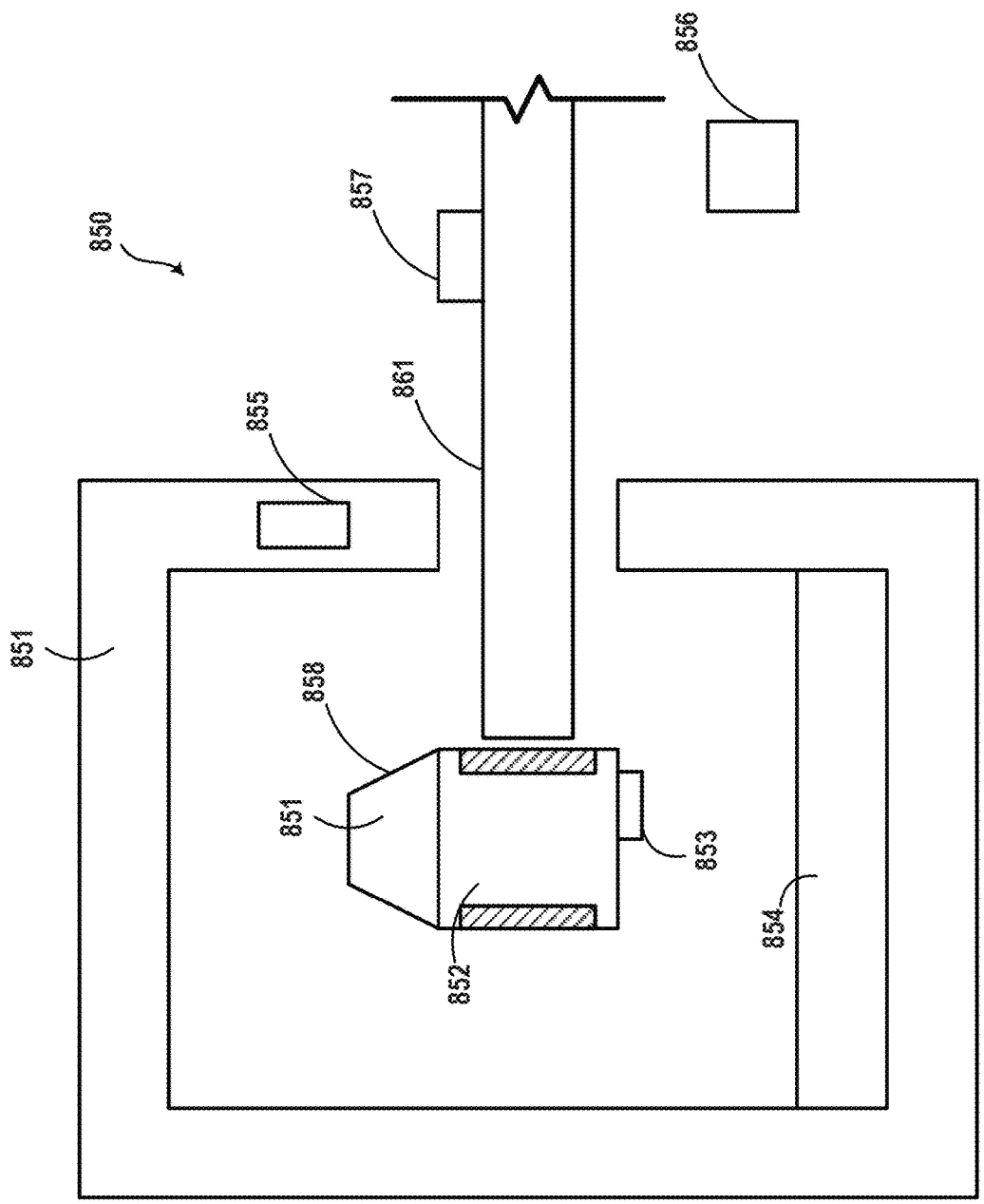
FIG. 8B illustrates an abrasive system, according to an example embodiment.

FIG. 8B illustrates an abrasive system 850, according to an example embodiment. The abrasive system 850 includes a housing 851 and a body 852 contained within the housing 851. The body 852 may include an electronic assembly 853 coupled to the body 952. The body 852, as illustrated, may be a particular type of edge grinding tool, wherein the workpiece 1961 may be a piece of glass. The housing 851 may further include coolant 854 that is applied to the grinding interface during a material removal operation. In one embodiment, the housing 851 may include at least one electronic device 855. The at least one electronic device 855 can be coupled to a surface or embedded in the material of the housing 851. The electronic assembly 853 includes one or more electronic devices configured to communicate with the one or more electronic devices 855 in the housing 851. Information received by the electronic device 855 may be related to a remote electronic device 856 which is positioned outside of the housing 851.

As further illustrated, the workpiece 861 may include one or more electronic devices 857 coupled to the workpiece 861 and configured to transmit and/or receive information from one of the other electronic devices, such as the electronic assembly 853, the electronic device 855, and/or the electronic device 856. In particular instances, it may be suitable that the electronic assembly 853 include a protective layer configured to protect against corrosive effects of the coolant 854.

In an alternative embodiment, the electronic assembly 853 may also be coupled to, partially embedded, or fully embedded, in a surface 858 of the body 852. The placement and position of the electronic assembly may facilitate improved communication with the electronic devices 855, 856, and/or 857. Moreover, in certain instances, of the electronic devices 855, 856, 857 and/or electronic assembly 853 may utilize a vertically polarized antenna, booster antenna, 3D polarized antenna, or any combination thereof. It will also be appreciated that in certain instances, it may be suitable to use a plurality of electronic assemblies located at different positions and orientations on the body 852.

IV. Example Microscopic Interactions

Figure 9A:
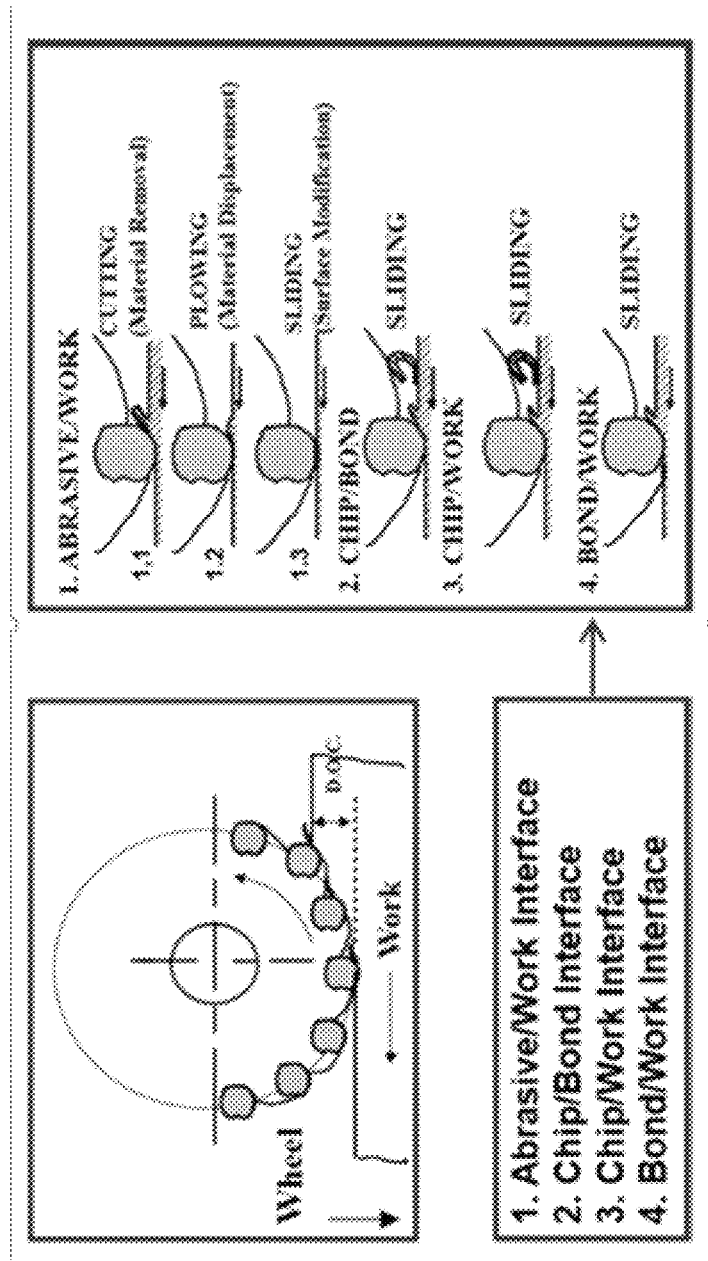
FIGS. 9A-9C illustrate microscopic interactions, according to an example embodiment.

FIG. 9A depicts various types of interactions associated with grinding processes. Each type of interaction could be incorporated into the analytical models and/or machine learning methods and systems described herein. For example, an abrasive-type interaction could include cutting (material removal), plowing (material displacement), or sliding (surface modification) effects. Abrasion processes include sliding a hard material such as an abrasive grain, against a softer material, during which the softer material undergoes deformation and surface modification. In some cases, this may be due to deep scratches or plowing, such as work material being displaced without material removal or sliding between abrasive grain and work piece. If the depth of penetration of abrasive grains against the work material is sufficiently intense, then the abrasive grain can act as a cutting edge, leading to the generation of a fresh surface and removal of debris called "chips" from the work surface. If the depth of penetration is not sufficient, it is likely that the hard abrasive grain will locally deform the work material. This interaction or deformation is often termed as plowing. Finally, if the depth of penetration of abrasive grain against work material is extremely shallow, the result would be the sliding of abrasive grain against work material, although at high contact stress. The surface generated at the end is the cumulative effect of all these abrasive/work interactions during the grinding process. Additionally or alternatively, various chip/bond, chip/workpiece, bond/workpiece, and/or other sliding interactions are possible and contemplated.

Figure 9B:
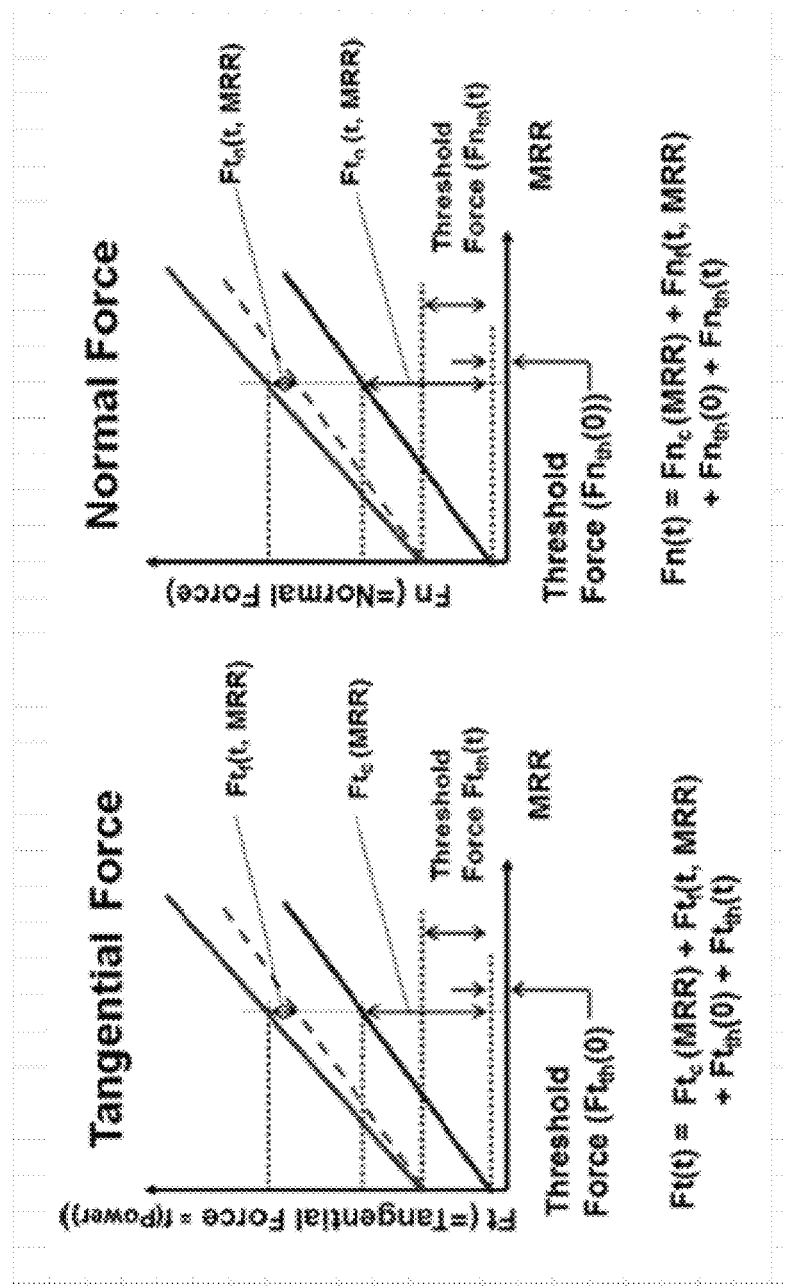

FIG. 9B depicts example force interactions and associated analytical models on a grinding process. As an example, the material removal rate (MRR) could increase proportionally to the tangential force and/or the normal force. Furthermore, FIG. 9B illustrates MRR as a function of the components of applied force (e.g., tangential force Ft and normal force Fn), which follow relationships that are governed by the principles of machining and tribology. As an example, for a given material removal rate, tangential force Ft=the force required to form chips, $Ft_c$+frictional force, $Ft_f$+threshold force at time zero, $Ft_{th}(0)$+threshold force at time t, $Ft_{th}(t)$. A similar relationship applies for the normal force component.

Figure 9C:
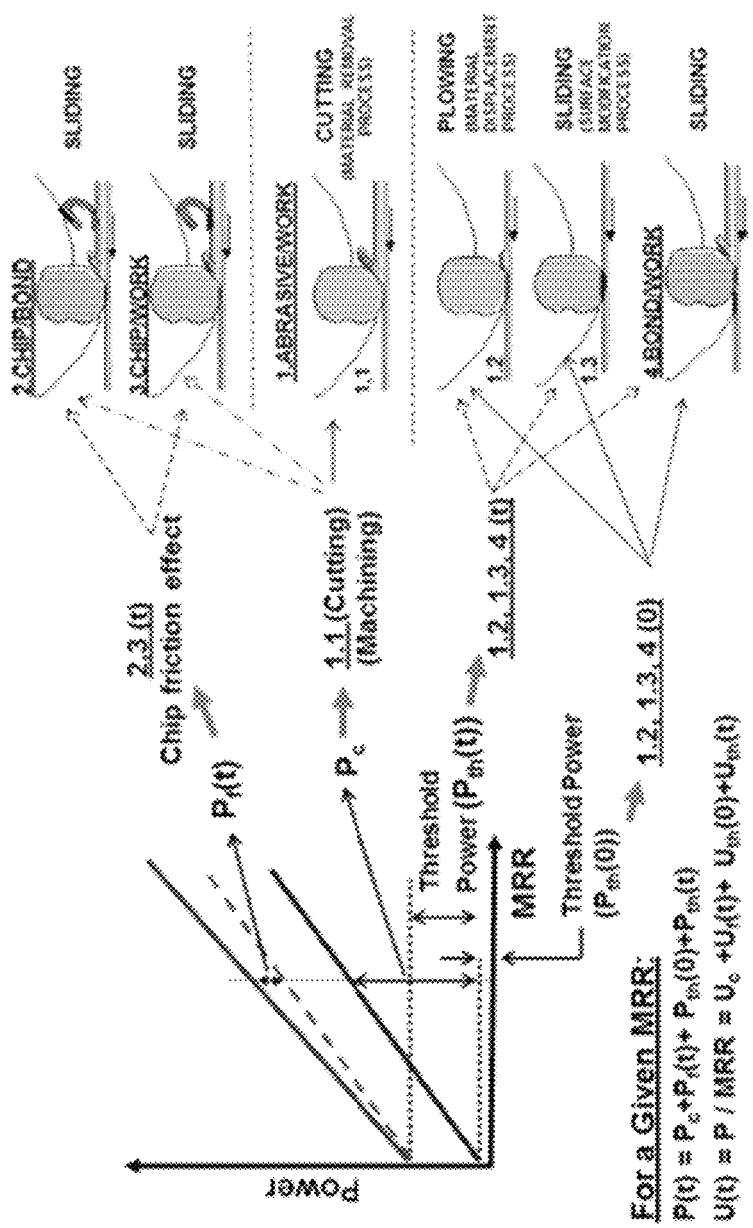

FIG. 9C depicts example power interactions and associated analytical models of a grinding process. For example, FIG. 9C illustrates the variation in grinding power after time "t" at a given MRR and its associated four components: (1) initial threshold power $P_{th}(0)$, (2) change in threshold power with time $P_{th}(t)$, (3) power for cutting or chip making $P_c$, and (4) change in $P_c$ caused by chip friction effects, $P_f(t)$. It should also be appreciated that FIGS. 9A-9C are presented as conceptual representations of example microscopic interactions and are not intended to be limiting with respect to the types of microscopic interactions, analytical models, or grinding processes that may be used in the current disclosure.

V. Example Computing Devices

Figure 10:
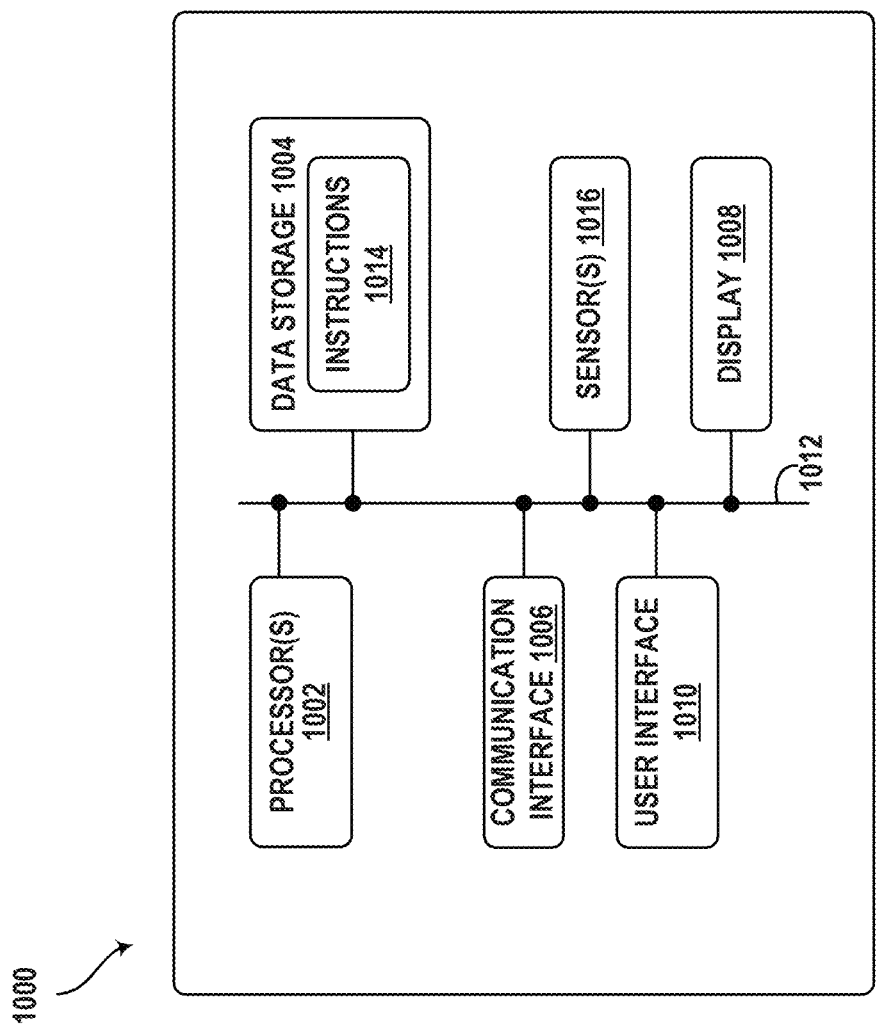
FIG. 10 illustrates a block diagram of a computing device, according to an example embodiment.

FIG. 10 illustrates a block diagram of a computing device 1000, according to an example embodiment. In particular, computing device 1000 can be configured to perform at least the functions related to the components of and/or related to machine learning platform 1110, enterprise 1120, outside vendors 1130, $3^{rd}$ party users 1140, machine learning system 1210, manual abrasive device 1310, wearable device 1320, automated abrasive device 1330, server device 1340, other sensors 1350, abrasive products 1410, remote devices 1420, vendors 1430, analytics platform 1440, method 1500, method 1600, method 1700, microcontroller 1810B, controller 2020, remote network 2110, client network 2120, mobile device 2400, and/or other elements described herein.

Computing device 1000 may include one or more sensors 1016 for collecting data, a data storage 1004, which may store the collected data and may include instructions 1014, one or more processor(s) 1002, a communication interface 1006 for communicating with a remote source (e.g., a server or another device/sensor), and a display 1008. Additionally, computing device 1000 may include an audio output device (e.g., a speaker) and a haptic feedback device (e.g., an eccentric rotating mass (ERM) actuator, linear resonant actuator (LRA), or piezoelectric actuators, among other examples).

Processor 1002 may include one or more general purpose processors or special purpose processors (e.g., GPUs). Processor 1002 may be configured to execute computer-readable instructions 1014. For example, processor 1002 may control the one or more sensors 1016 based, at least in part, on computer-readable instructions 1014. Processor 1002 may be configured to process the real-time data collected by the one or more sensors 1016.

Data storage 1004 is a non-transitory computer-readable medium that may include, without limitation, magnetic disks, optical disks, organic memory, and/or any other volatile (e.g. RAM) or non-volatile (e.g. ROM) storage system readable by the processor 1002. Data storage 1004 may include a data storage to store indications of data, such as sensor readings, machine learning models, program settings (e.g., to adjust behavior of the computing device 1000), user inputs (e.g., from a user interface on the device 1000 or communicated from a remote device), etc. Data storage 1004 may also include program instructions 1014 for execution by the processor 1002 to cause the device 1000 to perform operations specified by the instructions. The operations may include any of the methods described herein.

Communication interface 1006 may include hardware to enable communication within the computing device 1000 and/or between the computing device 1000 and one or more other devices. The hardware can include transmitters, receivers, and antennas, for example. Communication interface 1006 can be configured to facilitate communication with one or more other devices, in accordance with one or more wired or wireless communication protocols. For example, the communication interface 1006 can be configured to facilitate wireless data communication for computing device 1000 according to one or more wireless communication standards, such as one or more IEEE 801.11 standards, ZigBee standards, Bluetooth standards, etc. For instance, communication interface 1006 could include WiFi connectivity and access to cloud computing and/or cloud storage capabilities. As another example, communication interface 1006 can be configured to facilitate wired data communication with one or more other devices.

Display 1008 can be any type of display component configured to display data. As one example, display 1008 can include a touchscreen display. As another example, the display 1008 can include a flat-panel display, such as a liquid-crystal display (LCD) or a light-emitting diode (LED) display.

User interface 1010 can include one or more pieces of hardware used to provide data and control signals to computing device 1000. For instance, user interface 1010 can include a mouse or a pointing device, a keyboard or a keypad, a microphone, a touchpad, or a touchscreen, among other possible types of user input devices. Generally, user interface 1010 can enable an operator to interact with a graphical user interface (GUI) provided by computing device 1000 (e.g., displayed by the display 1008). As an example, user interface 1010 may allow an operator to provide input data to computing device 1000. As another example, the operator may provide an input indicative of a product to be used to perform the operation and/or an input indicative of a workpiece on which the operator may perform the abrasive operation.

In some embodiments, a user could utilize the GUI to provide a desired operation level (e.g., maximum desired vibration level, maximum desired noise level, etc.), which could be based on, for example, user preference and/or user comfort. It will be understood that a user could provide information indicative of the desired operation level by other means as well.

One or more sensors 1016 may be configured to collect data in real-time from or associated with an environment of the computing device 1000. Real-time collection of data may involve the sensors periodically or continuously collecting data. For example, the one or more sensors 1016 may include a sound detection device (e.g., a microphone) that is configured to detect sound in the environment of the sensor (e.g., from an abrasive device operating in proximity of the sensor). Additionally and/or alternatively, the sensors 1016 may be configured to collect data from or associated with an operator of computing device 1000. For example, the one or more sensors 1016 may include an accelerometer. As described herein, the data collected by the one or more sensors 1016 may be used to determine abrasive operational data, which could then be used for obtaining real-time data about grinding/abrasive operations, capturing a user experience of a user that is using the device, and/or determining operational and/or or enterprise improvements (e.g., based on data collected over a period of time).

The one or more sensors 1016 may also include other sensors for detecting movement, such IMUS and gyroscopes. Further, the one or more sensors 1016 may include other types of sensors such as location-tracking sensors (e.g., a GPS or other positioning device), light intensity sensors, thermometers, clocks, force sensors, pressure sensors, photo-sensors, Hall sensors, vibration sensors, sound-pressure sensors, a magnetometer, an infrared sensor, cameras, and piezo sensors, among other examples. Sensors and their components may be miniaturized.

VI. Example Machine Learning Platforms

Figure 11:
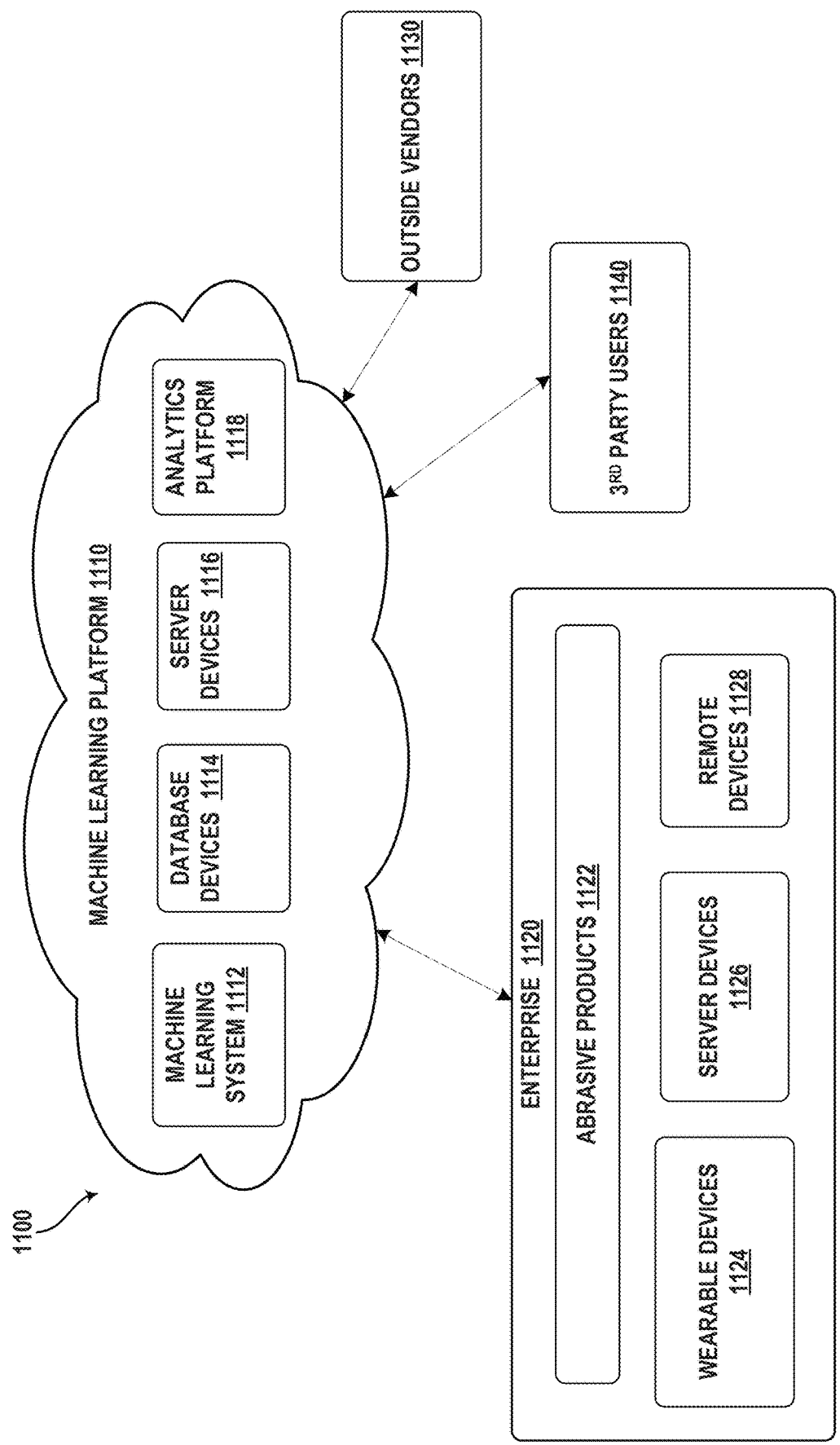
FIG. 11 illustrates an arrangement of a machine learning platform, according to an example embodiment.

FIG. 11 illustrates arrangement 1100 of machine learning platform 1110, according to an example embodiment. As shown in FIG. 11, machine learning platform 1110 may be communicatively coupled to enterprise 1120, outside vendors 1130, and $3^{rd}$ party users 1140. Machine learning platform 1110 may include, for example, machine learning system 1112, database devices 1114, server devices 1116, and analytics platform 1118. Machine learning platform 1110 may utilize machine learning to process and/or analyze the sensor data collected by the enterprise 1120. Machine learning platform 1110 may store the received sensor data and then analyze the data to provide product-specific information of the abrasive products and/or workpiece-specific information associated with an abrasive product on enterprise 1120. As used herein, product-specific information may refer to any information related to elements of an abrasive product/device or elements of any abrasive operations/processes performed by the abrasive product/device. For example, machine learning platform 1110 may determine best operational practices for enterprise 1120. In another example, the machine learning platform 1110 may determine different value metrics (e.g., productivity, product life, etc.) for different abrasive products. As used herein, abrasive product may refer to an apparatus associated with or embodied by an abrasive tool.

Machine learning system 1112 may include one or more machine learning models configured to receive sensor data from enterprise 1120. For example, sensor data may be related to an abrasive product and correlated with a grinding operation mode, a particular workpiece, a particular abrasive tool, or a particular grinding condition from enterprise 1120. In response to receiving the sensor data, machine learning system 1112 may train the one or more machine learning models to predict product-specific information and/or workpieces specific information related to the received sensor data. After one or more machine learning models have been trained, the machine learning system 1112 may be applied at run-time to predict or infer a prediction condition based on the real-time data received from enterprise 1120. As described herein, the predicted condition could trigger, prompt, or initiate various events such as a notification, a report, an order, or another type of action Database devices 1114 may include one or more computing devices configured to store data into one or more databases. For example, database devices may include one or more relational databases (e.g., SQL), graph databases (e.g., neo4j), document databases (e.g., MongoDB), column databases (e.g., Cassandra), and/or other database models. Database devices 1114 may act as data storage for components of machine learning platform 1110. An as example, database devices 1114 may be configured to receive and store sensor data from enterprise 1120 and provide the sensor data to machine learning system 1112 for training one or more machine learning models. In some examples, database devices 1114 may be configured to act as the primary data source for analytics platform 1118. In other examples, database devices 1114 may be configured to store one or more trained models (e.g., learned parameters).

Server devices 1116 may include one or more web servers, file servers, and/or computational servers. Server devices may facilitate communication between machine learning platform 1110 and enterprise 1120, outside vendors 1130, and $3^{rd}$ party users 1140. Communication may be facilitated by known web communication protocols, such as TCP/IP. In some embodiments, server devices 1116 may be utilized by machine learning system 1112 or analytics platform 1118 for computational tasks. For example, devices in server devices 1116 may be part of a MapReduce cluster that is used as part of a distributed training architecture for machine learning system 1112.

Analytics platform 1118 may include a web application configured to utilize information collected from machine learning system 1112 and database devices 1116. After processing the collected information, analytics platform 1118 could generate various predicted future conditions for enterprise 1120 as well as various prescriptive actions for enterprise 1120. As used herein, a predicted future condition refers to an estimate about a future event that could occur at enterprise 1120. Examples of future events may include a predicted failure of an abrasive product/workpiece, a prediction of potential damage to an abrasive product/workpiece, or a prediction that the quality of a workpiece does not meet a predetermined quality level, among other possibilities. Further, as used herein, a prescriptive action refers a recommendation of a best course of action given a current state and/or current situation of an abrasive product and/or given a current state and/or current situation of enterprise 1120. Examples of prescriptive actions may include a command to shut off an abrasive product if the abrasive product is displaying aberrant behavior, a command to adapt the speed rate of an abrasive wheel, a notification to change an abrasive article of an abrasive product, or a notification to dress a damaged abrasive product, among other possibilities.

In some embodiments, analytics platform 1118 includes a simulation environment programmed with digital versions (e.g., "digital twins") of physical abrasive products used by enterprise 1120. The simulation environment could use these digital versions to estimate productivity, costs, and/or injuries resulting from adding/reconfiguring/removing different digital abrasive products from the stimulation environment. In some embodiments, analytics platform 1118 is configured to graphically display metrics associated with one or more abrasive products and/or one or more workpieces in enterprise 1120. More details on analytics platform 1118 are provided below.

Notably, the configuration of machine learning platform 1110 is provided as an example. In some cases, machine learning platform 1110 may include one or more additional devices. For example, machine learning platform 1110 may include a firewall to allow access from authorized users, deny access from unauthorized users, provide intrusion detection, facilitate virus scanning, and/or provide other network security services. As another example, machine learning platform 1110 may include one or more load balancers to distribute incoming network traffic or requests across multiple computing devices within machine learning platform 1110 (e.g., such that no single devices is overwhelmed with task requests). In other examples, machine learning platform 1110 may include one or more routers, virtual machines, proxy servers, and/or other common network devices. Machine learning platform 1110 may also be connected to one more client devices (e.g., personal computers or mobile phones). In some examples, machine learning platform 1110 may offer virtual private network (VPN) services.

Additionally and/or alternatively, components of machine learning platform 1110 may be replicated across multiple computing devices to provide data duplication and increase capacity of services. These computing devices may be located at different physical locations to ensure high availability in case of failure at one location. As such, machine learning platform 1110 may be configured across different physical locations and hundreds of computing devices.

Enterprise 1120 may include, for example, one or more abrasive products 1122, wearable devices 1124, server devices 1126, and remote devices 1128. Enterprise 1120 may represent a single geographic location containing multiple abrasive machines or may represent multiple abrasive machines located across several geographic locations. Moreover, enterprise 1120 may represent a single enterprise of a plurality of enterprises that utilize products manufactured or maintained by the entity operating machine learning platform 1110. As such, machine learning platform 1110 may act as a remote customer support system for these products.

Abrasive products 1122 may include one or more devices or tools that perform grinding operations on a workpiece. As described above, abrasive products 1122 may be manufactured or maintained by the entity operating machine learning platform 1110. Abrasive products 1122 may contain one or more sensors that collect abrasion operational data associated with grinding operations or the involving the workpiece being grinded on. For example, the one or more sensors may transmit the collected abrasion operational data, via Bluetooth, TCP/IP or other networking protocols, to server devices 1126. In another example, the one or more sensors may transmit the collected abrasion operational data to machine learning platform 1110.

Wearable devices 1124 may include wearable computing devices with one or more sensors that continuously or periodically collect data from or associated with an environment of abrasive products 1122 and/or data from or associated with operators' abrasive products 1122. For example, the data collected by the wearable devices 1124 may be used to determine abrasive operational data. In some examples, the collected data may be sent to server devices 1126, for example, via Bluetooth, TCP/IP, or other networking protocols. In other examples, the collected data may be transmitted directly to machine learning platform 1110.

Server devices 1126 may include one or more computing devices located on enterprise 1120. Server devices may be configured to receive and aggregate sensor data from abrasive products 1122 and wearable devices 1124. Server devices 1126 may be operated by machine learning platform 1110 or by enterprise 1120. Upon receiving sensor data, server devices 1126 may apply data filters to the sensor data, such as removing outlier sensor data and/or ignoring sensor data from one or more wearable devices 1124 or abrasive products 1122. In some examples, server devices 1126 may be configured to convert sensor data into a different data format more suitable for machine learning platform 1110, for example into JavaScript Object Notation (JSON). As another example, server devices 1126 may allow a human operator to tag sensor data with labels, as further described herein. Server devices 1126 may receive product-specific information and/or workpiece-specific information from machine learning platform 1110 and distribute this information to remote devices 1128, abrasive products 1122, wearable devices 1124, or may store this data for later access by members of enterprise 1120.

In some embodiments, server devices 1126 may provide sensor data to machine learning platform 1110 by grouping data in batches. Batches may be transmitted periodically, for example, every 10 minutes or 30 minutes. In other examples, server devices 1126 may send sensor data machine learning platform 1110 in a real time, streaming format. In some embodiments, server devices 1126 may be configured to monitor the sensors disposed in abrasive products 1122 and wearable devices 1124. For example, server devices 1126 may send heartbeat messages to the sensors, which in turn may be configured to respond with a response heartbeat message. This may ensure that sensors are operable and have not stopped sending data to server devices 1126, for example, because of malfunction or loss of power.

Remote devices 1128 may include interfaces located on one or more computing devices in enterprise 1120. For example, remote devices 1128 may include on wearable devices (e.g., smart watches), mobile devices (e.g., mobile phones or tablets), and/or monitors (e.g., computer screens). Remote devices 1128 may receive data from server devices 1126 or machine learning platform 1110 and display output data on a graphical user interface (GUI) or emit an alarm, an alert, a notification, a report, an order, and/or another type of action.

Outside vendors 1130 may represent one or more computing systems managed by partners of the entity operating machine learning platform 1110. In example embodiments, machine learning platform 1110 may transmit to outside vendors 1130 new order requests, delivery requests, and/or other logistics requests based on predictions made by machine learning system 1112. These requests may be made automatically by machine learning platform 1110 on the behalf of enterprise 1120.

$3^{rd}$ party users 1140 may include one or more individuals or organizations that utilize the capabilities of analytics platform 1118. For example, $3^{rd}$ party users 1140 may access analytics platform 1118 via a web browser and may be able to access data provided to analytics platform 1118 by machine learning platform 1110. $3^{rd}$ party users 1140 may be granted access, for example, through a subscription based model. Analytics platform 1118 may provide multiple levels of access to $3^{rd}$ party users 1140, each based on the subscription purchased by $3^{rd}$ party users 1140. For example, each level of access may provide more sensitive or larger amounts of data.

Notably, the components of arrangement 1100 are used for the purpose of example. Other components and arrangements are possible.

VII. Example Machine Learning Systems

Figure 12:
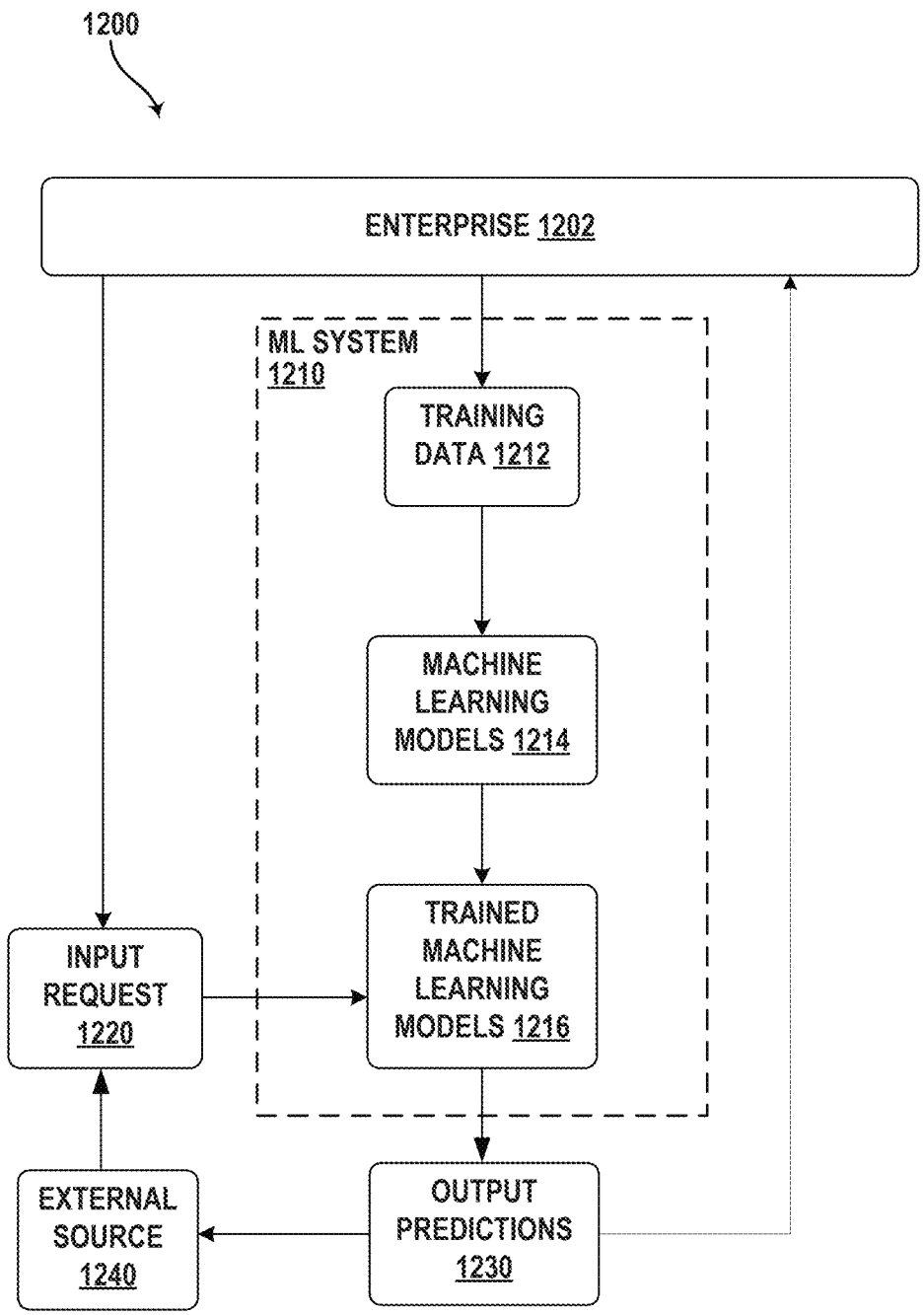
FIG. 12 depicts a scenario containing an enterprise, a machine learning system, an input request, and output predictions, according to an example embodiment.

FIG. 12 depicts scenario 1200 containing enterprise 1202, machine learning system 1210, input request 1220, and output predictions 1230, according to an example embodiment. Scenario 1200 may occur as part of arrangement 1100. As such, enterprise 1202 may be embodied by enterprise 1120, machine learning system 1210 may be embodied by machine learning system 1112, and training data 1212 may be embodied by database devices 1114.

Enterprise 1202 may represent, for example, organization that utilizes products manufactured or maintained by the operator of machine learning system 1210. As discussed above, enterprise 1202 may contain sensors that produce abrasion operational data associated with an abrasive operation involving one or more abrasive products or one or more workpieces. The data from these sensors are may be transmitted from enterprise 1202 to machine learning system 1210 in order to determine product specific information of the one or more abrasive products and workpiece-specific information based on the sensor data.

Machine learning system 1210 may utilize machine learning techniques to train one or more machine learning models with training data to detect patterns and provide output predictions about the training data. The resulting trained machine learning model may be referred to as trained machine learning models. For example, scenario 1200 illustrates machine learning models 1214 being trained on training data 1212 to become trained machine learning models 1216. During prediction time, trained machine learning models 1216 may receive input request 1220 and responsively provide output predictions 1230.

Training data 1212 may include one or more databases designed to receive and store sensor data from enterprise 1202 and provide the sensor data to train one or more machine learning models. For example, training data 1212 may include relational databases (e.g., SQL), graph databases (e.g., neo4j), document databases (e.g., MongoDB), column databases (e.g., Cassandra) and/or other database models.

Machine learning models 1214 may include, but are not limited to, algorithms such as: logistic or linear regression, support vector machines (SVM), Bayesian networks, artificial neural networks (ANNs), (including convolutional neural networks (CNNs) and recurrent neural networks (RNNs)), Naive Bayes classifiers, K nearest neighbors, auto-encoders, hidden Markov models (HMM), Markov decision process, decision trees, random forests, ensemble methods (including boosting and bagging) and/or heuristic machine learning models. Machine learning models that incorporate rule-based algorithms (e.g., association rule models, learning classifier models, etc.) or iterative algorithms (e.g., expectation-maximization algorithms) are also contemplated and possible within the scope of the present application.

Machine learning models 1214 may be trained may utilize online or offline learning. During training, machine learning models 1214 may utilize the training data 1212 to adjust weights and/or other parameters of one or more models. Machine learning models 1214 may use various regularization techniques during training, such as L1 regularization, L2 regularization, early termination of training and/or dropout methods, to reduce overfitting. Machine learning models 1214 may use various optimization methods during training, such as gradient based methods (batch gradient descent, stochastic gradient descent, Adam optimization), search based techniques (genetic algorithms, grid search, random search), and/or other techniques to learn open or more parameters and/or hyper parameters.

In some embodiments, machine learning models 1214 may use supervised learning to determine output predictions based on labeled training data 1212. These output predictions may be accepted or corrected based on correct results associated with labels on training data 1212. As an example, linear regression may be used to predict the idle time of an operator of an abrasive product given input RPM data of the abrasive product. This may include, for example, optimizing a square loss function based on a difference between the predicted idle time of an operator and the actual labeled idle time of an operator associated with the input RPM data.

In some embodiments, machine learning models 1214 may use unsupervised learning to learn patterns, structures, of features based on unlabeled training data 1212. As an example, clustering algorithms (e.g.: k-means clustering, hierarchical clustering) may be used to group sensor data with similar features into clusters, which may be used to for anomaly detection (e.g., sensors with features that do not fall into any cluster may be alerted to). In another examples, auto-encoders may be used learn new representations (typically with reduced dimensionality) of the sensor data. These new representations of the sensor data may then be used for classification tasks.

In some embodiments, machine learning models 1214 may use semi-supervised learning by having labels for part, but not all of training data 1212. As such, supervised learning may be used for a portion of training data 1212 having labels and unsupervised learning may be used for a portion of training data 1212 not having labels. In some embodiments, machine learning models 1214 may use reinforcement learning to receive a reward value in response to an action in an environment. For example, during reinforcement learning, machine learning models 1214 may take an action, such providing a text notification to a client device indicating end of life, and receive a reward value from enterprise 1202. In response to the reward, machine learning models 1214 may try to maximize the reward value by taking additional actions (providing another text notification) or exploring new potential actions (providing a different type of notification to the client device).

In some embodiments, machine learning models 1214 could be trained based on various user experiences and/or knowledge. For example, operational limits could be set or suggested based on experiences from research and development personnel and/or an application engineer. In such scenarios, the machine learning models 1214 could utilize organizational "know-how" and/or feedback about some or all aspects of the abrasive operation, such as, but not limited to, operator experiences, manager experiences, and/or customer feedback.

In some embodiments, the training of machine learning models 1214 may be accelerated using specialized processors, such as graphic processing units (GPUs), tensor processing units (TPUs), and/or digital signal processors (DSPs). In some embodiments, training machine learning models 1214 may include training a different machine learning model for different sets of sensor data. Sets of sensor data may be based on the unique identifier of the abrasive product from which sensor data is collected from. For example, a set of sensor data may include all sensor data gathered from abrasive products with a unique identifier starting with "X_12", which may represent abrasive products sharing similar characteristics. As another example, a set of sensor data may include all sensor data gathered from abrasive products that share the same amount and types of sensors, such as vibration sensors.

In some embodiments, machine learning models 1214 may be configured to be periodically retrained with new sensor data received from enterprise 1202. For example, sensor data from enterprise 1202 may associated with timestamps indicating the time the data was collected by the sensor. Thus, machine learning models 1214 may be configured to be retrained on a subset of new sensor data determined by the timestamps, such as all data collected in the last week, month, or year. In some examples, periodically retraining machine learning models 1214 may include removing old sensor data from the training data 1212 based on the timestamp of the old sensor data. For example, sensor data collect more than two, three, or four years may be removed from training data 1212.

After training machine learning models 1214 are trained on training data 1212 to become trained machine learning models 1216, trained machine learning models 1216 may reside and execute on machine learning system 1210 to provide predictions for requests from one or more computing devices. In some cases, trained machine learning models 1216 may reside and execute on one or more computing devices to make predictions for requests from the one or more computing devices.

In some embodiments, trained machine learning models 1216 may receive input requests 1220 from enterprise 1202, generate one or more output predictions 1230 about input request 1220, and provide the one or more output predictions to enterprise 1202. For example, input request 1220 may be a request from enterprise 1202 to predict the end of life of an abrasive device. Thus, input request 1220 may include RPM data for the abrasive device. In such an example, enterprise 1202 may be the provider of training data 1212. In other embodiments, trained machine learning models 1216 may receive input requests 1220 from external source 1240, generate one or more output predictions 1230 about input request 1220, and transmit the one or more output predictions to external source 1240. For example, input request 1220 may be a request from external source 1240 to predict the end of life of an abrasive device. Thus, input request 1220 may include RPM data for the abrasive device. In such an example, external source 1240 may not be the provider of training data 1212 and thus may rely on the training data from enterprise 1202 to make the prediction.

In some embodiments, output predictions 1230 may be labeled and be utilized during a subsequent training phase to further improve trained machine learning model 1216. For example, output predictions 1230 may be provided as one or more product-specific solutions for resolving issues with an abrasive product. These product-specific solutions may be provided to enterprise 1202, which in turn select of a product-specific solution from the one or more product-specific solutions. Upon the selection of the solution, enterprise 1202 may record the selected product-specific solution and may determine the label for the abrasive product as the selected solution. This may then be transmitted to training data 1212 for use in improving the trained machine learning models 1216.

VIII. Example Inputs

Figure 13:
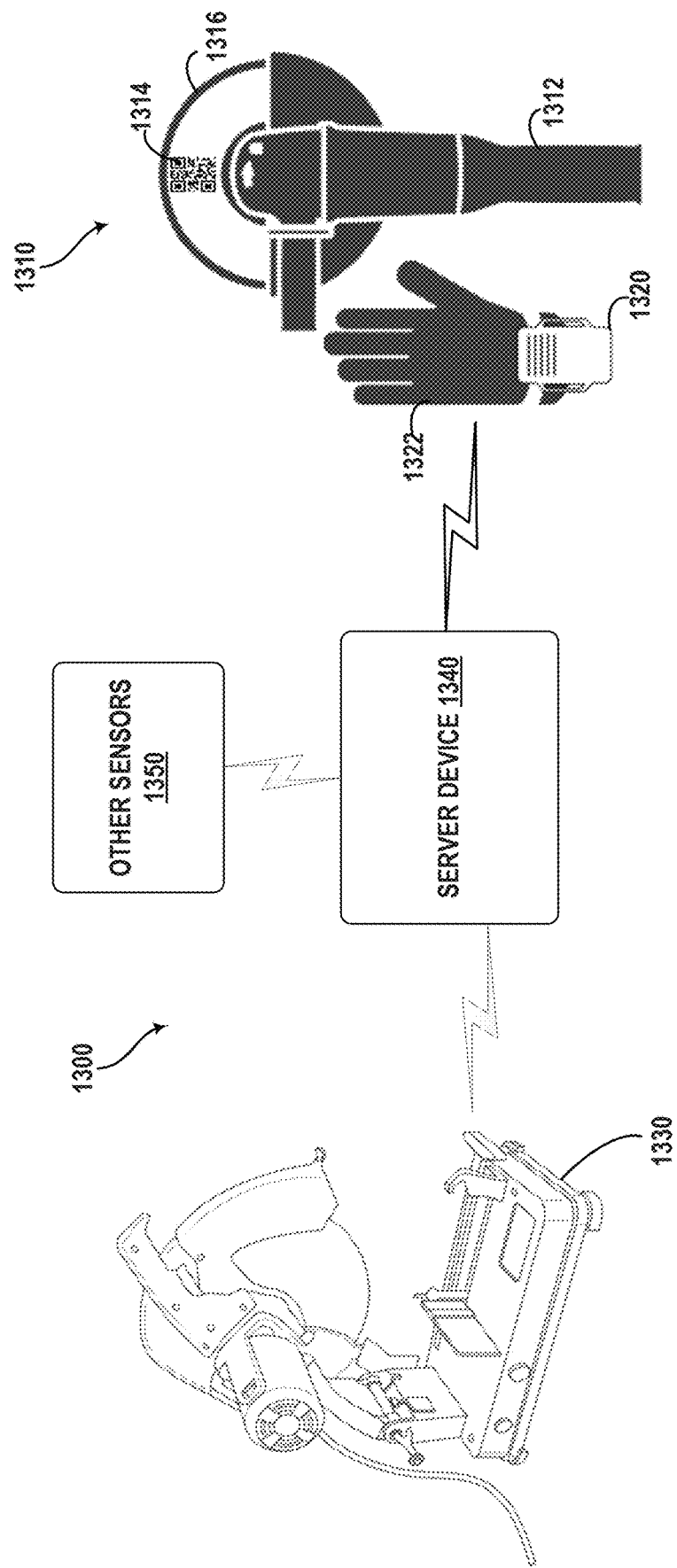
FIG. 13 illustrates a scenario representing input devices to a machine learning system, according to an example embodiment.

FIG. 13 illustrates scenario 1300 representing input devices to a machine learning system, according to an example embodiment. Scenario 1300 may occur in enterprise 1120 and include manual abrasive device 1310, wearable device 1320, automated abrasive device 1330, and a server device 1340 As such, manual abrasive device 1310 and automated abrasive device 1330 may be embodied by abrasive products 1122 and server device 1340 may be embodied by server devices 1126. As used herein, abrasive device may refer to a device associated with or embodied by an abrasive tool.

Manual abrasive device 1310 may be any tool that is configured to perform manual grinding operations on a work piece (not illustrated in FIG. 13). Such grinding operations could include grinding, polishing, buffing, honing, cutting, drilling, sharpening, filing, lapping, sanding, and/or other similar tasks. However, other types of manual mechanical operations that may include vibration and/or noise are contemplated. For example, hammering, chiseling, crimping, striking, or other manual operations are possible within the context of the current disclosure. Accordingly, the manual abrasive device 1310 may be a device that is configured to perform one or more of the abrasive operations. For example, the manual abrasive device 1310 may be a right angle grinding tool, a power drill, a hammer drill and/or percussion hammer, a saw, a plane, a screwdriver, a router, a sander, an angle grinder, a garden appliance and/or a multifunction tool, among other examples.

Automated abrasive device 1330 may be any tool that is configured to perform automated grinding operations on a workpiece (not illustrated in FIG. 13). Such grinding operations could include grinding, polishing, buffing, honing, cutting, drilling, sharpening, filing, lapping, sanding, and/or other similar tasks. For example, the automated abrasive device 1330 may include a cutting tool, a sanding tool, a buffing tool, and/or a polishing tool.

Whereas an operator generally operates manual abrasive device 1310, in the present disclosure, a controller operates automated abrasive device 1330. The controller could take the form of computing device 1000 and could be configured to perform various actions, such as turning on automated abrasive device 1330, turning off automated abrasive device 1330, setting a rotational speed for automated abrasive device 1330, applying a desired grinding or cutting force at a desired location and/or angle with respect to the workpiece, among other possibilities. In some implementations, the actions of the controller are configured based on output from machine learning system 1210. For example, machine learning system 1210 could make predictions based on abrasive operational data (e.g., vibration data, electrical current data, wheel speed data, etc.) received from a controller of automated abrasive device 1330. After making the predictions, machine learning system 1210 could reconfigure the controller in accordance with the predictions, for example, by setting a new maximum rotational speed at the controller. In some examples, the automated abrasive device 1330 could take the form of a computer numerical control (CNC) grinding machine, and the aforementioned controller could be a CNC controller. However, other types of automated abrasive devices are possible and contemplated.

Manual abrasive device 1310 and automated abrasive device 1330 may include one or more components that enable the tool to perform one or more of the abrasive operations. In particular, manual abrasive device 1310 and automated abrasive device 1330 may include an abrasive article for performing the one or more operations described. The abrasive article may include one or more materials that may be used to shape or finish a workpiece. The one or more materials may include an abrasive mineral such as calcite (calcium carbonate), emery (impure corundum), diamond, CBN, diamond dust (e.g., synthetic diamonds), novaculite, pumice, rouge, sand, corundum, garnet, sandstone, tripoli, powdered feldspar, staurolite, borazon, ceramic, ceramic aluminum oxide, ceramic iron oxide, corundum, glass powder, steel abrasive, silicon carbide (carborundum), zirconia alumina, boron carbide, and slags. Additionally and/or alternatively, the one or more materials may include a composite material that includes a coarse-particle aggregate that is pressed and bonded together using a bond. The composite material may include clay, a resin, a glass, a rubber, aluminum oxide, silicon carbide, tungsten carbide, garnet, and/or garnet ceramic.

Furthermore, the abrasive article may have one of many shapes. For instance, the article may take the form of a sheet, a block, a stick, a wheel, a ring, or a disc, among other examples. In the example shown in FIG. 13, the manual abrasive device 1310 may include a wheel shaped abrasive article 1316. Additionally, manual abrasive device 1310 and automated abrasive device 1330 may include a power source that may be configured to actuate the abrasive article to perform an operation. Within examples, the power source may be an electric motor, a petrol engine, or compressed air. The manual abrasive device 1310 and automated abrasive device 1330 may also include a housing that houses the power source. The housing may be formed from hard plastic, phenolic resin, or medium-hard rubber, among other examples.

In some embodiments, manual abrasive device 1310 and automated abrasive device 1330 may include an identifying feature, such as a scannable identifier (e.g., QR code, barcode, serial number, etc.) that may be engraved in or affixed. The identifying feature may be used to identify a type of the tool, a manufacturer of the tool, a model of the tool, and/or a unique identifier of the tool. Additionally and/or alternatively, the individual components of manual abrasive device 1310 and automated abrasive device 1330 may include an identifying feature. For example, an abrasive article may include an identifying feature that is engraved in and/or affixed to the abrasive article. The identifying feature may be used to identify a type of the abrasive article, a manufacturer of the abrasive article, a model of the abrasive article, and/or a unique identifier of the abrasive article.

Manual abrasive device 1310 and automated abrasive device 1330 may include one or more sensors that can collect data in real-time from an environment of the tool and/or from the tool itself (e.g., within a handle, a body of the tool, and/or coupled to an abrasive product). In some embodiments, the system may additionally include remote sensors that are disposed in an environment in which an operation is being performed. These sensors and the embedded sensor may be configured to transmit collected data to server device 1340. Sensors may be configured to transmit operational data of the tool and the unique identifier of the tool.

Wearable device 1320 may be in the form of a wrist-mountable device that is mounted onto a wrist of a user's hand 1322. The user's hand 1322 may be a dominant hand of the operator that is favored by the operator when performing tasks. Here, the operator may use hand 1322 (on which the wearable device 1320 is mounted) to grasp handle 1312 of manual abrasive device 1310. Wearable device 1320 may be configured obtain real-time data that may be used to determine abrasive operational data. To obtain real-time data, wearable device 1320 may include sensors that can collect data in real-time from an environment of an abrasive product and/or from the abrasive product itself. Wearable device 1320 may be configured to communicate with remote sensors on an abrasive product and/or with the one or more sensors associated with the abrasive product. Additionally, the wearable device may include a communication interface to transmit collected data to server device 1340, for example, in a real-time and/or asynchronous fashion. In some embodiments, wearable device 1320 could be operable to run web applications, which could include event-driven scripts operating in a Node.js (e.g., JavaScript everywhere) runtime environment, among other possibilities.

In some embodiment, sensors of the wearable device 1320 may be configured to read or scan an identifying feature of manual abrasive device 1310 or an abrasive article of manual abrasive device 1310. For example, sensors may include an image capture device (e.g., a camera) that may capture and analyze images of manual abrasive device 1310 in order to determine a type or may scan identifying feature 1314. Identifying the tool and/or the components thereof may allow wearable device 1320 to provide an operator with information associated with the tool and/or the components thereof. Additionally and/or alternatively, the identification may allow wearable device 1320 to associate data collected by sensors in the environment with manual abrasive device 1310 and/or the particular component being used to perform the desired operation.

In the scenario 1300, the sensors of manual abrasive device 1310, wearable device 1320, automated abrasive device 1330, and other sensors 1350 may continuously or periodically collect data from or associated with the operation of manual abrasive device 1310 and automated abrasive device 1330. For example, the collected abrasive operational data may include sound data, acceleration data, vibration data, gyroscope data and/or data extrapolated from the sound, acceleration, and/or vibration data (e.g., applied force data, RPM data, usage rate, etc.). In example embodiments, collected abrasive operational data may be correlated with a material, a material removal rate, an operating condition, an expended power, or a specific grinding energy.

Additionally, sensors of manual abrasive device 1310, wearable device 1320, automated abrasive device 1330, and other sensors 1350 may be positioned in various locations with respect to the abrasive device/tool and/or the workpiece operated on. For example, a vibration sensor, gyroscope, microphone, and/or any other sensor may be embedded within a tool or a handle of a tool. In other examples, sensors could be located nearby the tool and/or workpiece. In yet another example, sensors could be mounted on a work surface on which the workpiece may lay. In even further examples, sensors could be mounted at a wall or ceiling location. It will be understood that multiple sensors could be located at various locations nearby a tool and/or workpiece to provide "stereo" or multi-sensor combinations. Such multiple sensor combinations could provide information on which tool is being used and/or disambiguate particular sounds based on stereoscopic or multiscopic sensing.

In some embodiments, sensors may include an accelerometer that may be operable to measure and record acceleration information in three axes (x, y, and z). For example, wearable device 1320 may include an accelerometer configured to collect acceleration data related to the user's hand 1322 when operating manual abrasive device 1310. Accordingly, the accelerometer may measure the hand's acceleration as a result of the vibration. Because the hand's vibration is a result of the tool's vibration, the acceleration information collected by the accelerometer may be indicative of the vibration of the tool. In this scenario, the acceleration information may be used to determine an extent of vibration of the tool. The vibration data, which is an example of abrasive operational data, could be used to extrapolate other abrasive operational data. As an example, the vibration data may be used to determine operational information of the tool, such as an operational status and operational hours. For instance, the operational status could include "OFF", "IDLE", and "SANDING", among other possibilities. As another example, the vibration data may be used to determine grinding information of the performed abrasive operation, such as a working angle, a grip tightness, an applied pressure, an angular velocity (e.g., revolutions per minute, RPM), among other variables.

In some embodiments, sensors could include microphones configured to collect sound data from an abrasive operation. The collected sound data may be used to determine an RPM at which an abrasive product is operating by analyzing the amplitude of the sound data for correlation with known sound amplitudes for different RPM values of the abrasive product.

In some embodiments sensors could include an optical or magnetic sensor operable configured to detect visible/magnetic attachments to a grinding wheel of disc and provide information about an angular velocity (RPM) of a grinding wheel or disc.

In some embodiments, sensors may include spark-invariant sensors configured to detect rotation of sensing targets attached to a grinding wheel or disc and provide information about an angular velocity (RPM) of the grinding wheel or disc. In some embodiments sensors could include pressure sensors to determine air pressure applied to a grinding tool.

In example embodiments, determined RPM values may be used to extrapolate abrasive operational data. For example, RPM values may determine a grinding power of a tool by using a data (e.g., a table) indicative of a correlation between an RPM of a particular tool and the grinding power exerted by the tool. As another example, the RPM value may determine a force that is applied to the workpiece by using a data (e.g., a table) indicative of a correlation between an RPM of a particular tool and the grinding power exerted by the tool.

In some embodiments, sensors may collect information indicative of the workpiece. For example, sensors could include an image capture device (e.g., a camera) configured to capture an image of the workpiece. The image may be analyzed in order to determine a status of the workpiece, including a type of the workpiece, a material of the workpiece, dimensions of the workpiece, surface characteristics of the workpiece, and/or an arrangement of the workpiece in the environment (e.g., orientation, angle, position with respect to a reference point in the environment). In some embodiments, information about the workpiece could be determined based on other types of sensor information. For example, while grinding is in process, interactions between the grinding tool and various workpiece materials could provide different noise and vibration data. In example embodiments, a database of tagged noise and vibration data could specifically identify various workpiece materials. In such a scenario, subsequently captured noise and vibration data could be compared to entries in the tagged noise and vibration database so as to provide information about the material of a given workpiece.

In some embodiments, sensors may collect information indicative of the microscopic interactions (e.g., tribology) occurring in a grinding zone. (i.e., the region between a grinding wheel and work material). For example, sensors may include a vibration sensor configured to extrapolate the depth of penetration of an abrasive grain against a workpiece during each step of a grinding process. Each depth of penetration may then be linked to a specific microscopic interaction, such as cutting (e.g., material removal), plowing (e.g., material displacement), sliding (e.g, surface modifications). Notably, the surface generated at the end of the grinding process may be the cumulative effect of the different types of microscopic interactions.

Server device 1340 may include one or more computing devices configured to receive and aggregate sensor data from sensors of manual abrasive device 1310, wearable device 1320, automated abrasive device 1330, and other sensors 1350. Communication between these sensors and server device 1340 may be facilitated via a wireless fidelity (Wi-Fi) connection, a Bluetooth connection, a light fidelity (Li-Fi) connection, an infrared connection, a near field communication (NFC) connection, or some other wireless connection. In some embodiments, sensors could be configured to communicate with the server device 1340 using Message Queuing Telemetry Transport (MQTT) or another type of messaging protocol.

Upon receiving sensor data, server device 1340 may apply data filters to the sensor data or convert sensor data into a different data format. Server device 1340 may transmit sensor data to a machine learning platform, such as machine learning platform 1110, in order determine product-specific information and/or workpiece-specific information related manual abrasive device 1310, wearable device 1320, automated abrasive device 1330, and other sensors 1350.

In some embodiments, server device 1340 may be configured to allow a human operator to tag sensor data. In particular, tags may be utilized as labels or additional training features for training one or more machine learning models. For instance, tags may identify product specific information of the one or more abrasive products associated with the sensor data. This may include operational statuses related to vibration data. As an example, an operational status of "walking" may be assigned to vibration data with small peaks. In another example, an operational status of "idle" may be assigned to vibration data with a stable slope.

In some embodiments, tags may identify patterns of abrasion operation data immediately before an abrasive product related event. For example, an abrasive product related event may include a serious injury of an operator using an abrasive product. As such, tags may be associated with vibration sensor data from a wearable device of the operator before injury. For instance, a "critical" tag may be associated with the vibration data an hour prior to the injury and a "danger" tag may be associated with the vibration data minutes or less than a minute prior to the injury.

In some embodiments, server device 1340 may provide graphs of sensor data to aid a human operator with extrapolating patterns that are indicative of a particular condition or a performance indicator of abrasive product. As explained herein, a human operator may use one or more data analysis methods to extrapolate the patterns. As an example, a sensor graph may be used to extrapolate a correlation between a power signal supplied to a tool during an operation and vibration of the tool during the operation in order to assign tags to the vibration data. In particular, vibration data with amplitude greater than a threshold during a period of time/stage may be indicative of assigning the abrasive product a "powered on" tag for that period time/stage of time. Furthermore, vibration data with an amplitude greater than a second threshold for a period of time/stage may be indicative of assigning the abrasive product a "severe conditions" tag during that period of time/stage. In another example, operating the abrasive product under severe conditions, acceleration data may include higher peaks than when operating the abrasive product under normal conditions. Accordingly, peaks greater than a threshold in the vibration data may be indicative of a "severe condition" tag.

In some embodiments, the human operator may use methods such as machine learning (e.g., Bayesian classifiers, support vector machines, linear classifiers, k-nearest-neighbor classifiers, decision trees, random forests), Fast Fourier Transform (FFT), artificial intelligence (AI) methods (e.g., neural networks, fuzzy logic, cluster analysis, or pattern recognition), filtering, peak value, mean, standard deviation, skewness, and/or kurtosis to assist with tagging the sensor data. For example, the human operator may use a machine learning platform, such as machine learning platform 1110, to assist creating tags for sensor data. Notably, the created tags may then be used to train one more machine learning models on the same machine learning platform.

Other sensors 1350 may include other sensors disposed in the environment around manual abrasive device 1310, wearable device 1320, and automated abrasive device 1330. For example, other sensor may include temperature sensors to detect to the temperature of the environment around manual abrasive device 1310 and automated abrasive device 1330. In some examples, sensors in manual abrasive device 1310, wearable device 1320, and automated abrasive device 1330, and other sensors 1350 may communicate directly with a machine learning platform, such as machine learning platform 1110.

IX. Example Outputs

Figure 14:
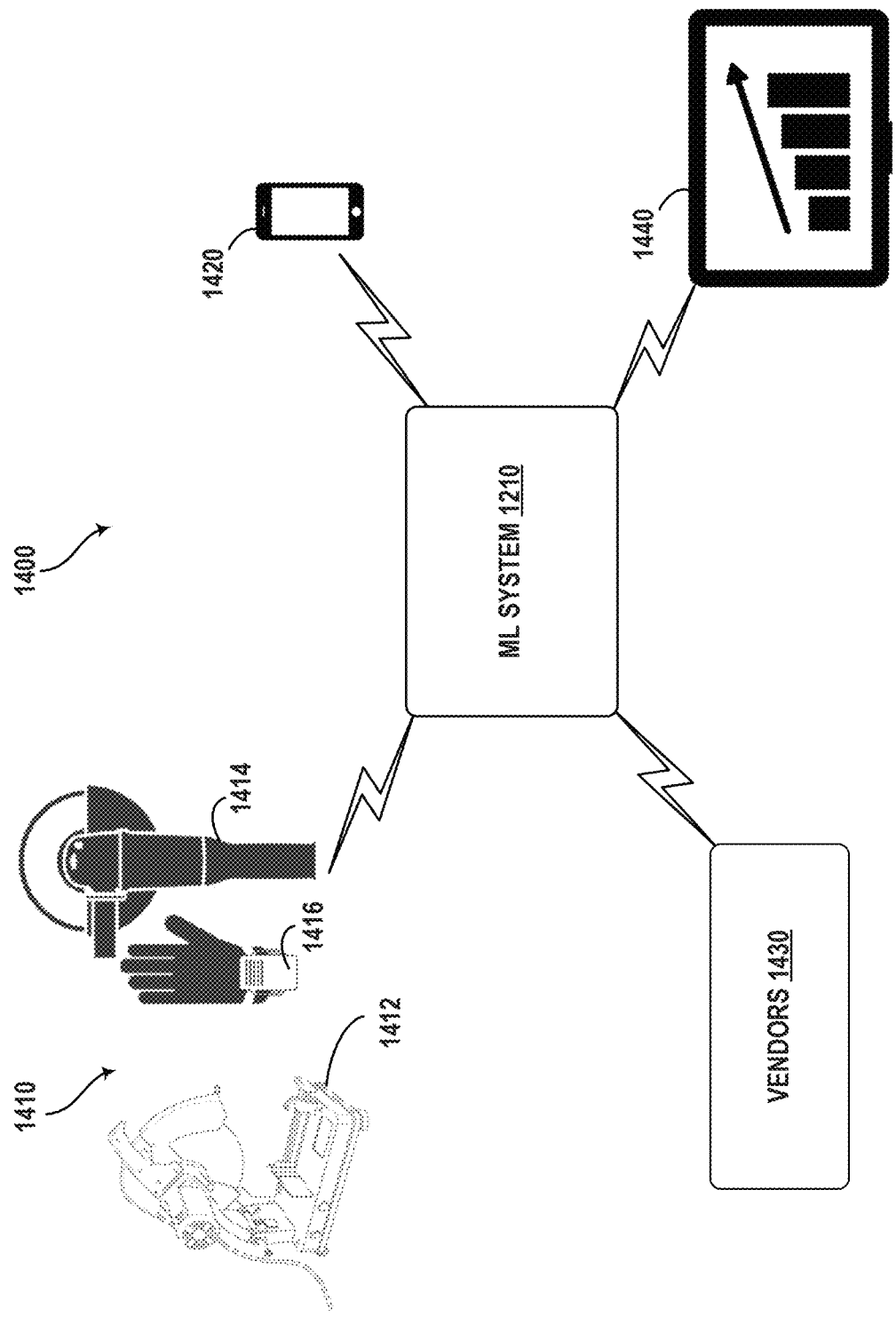
FIG. 14 depicts devices that receive predictions from a machine learning system, according to an example embodiment.

FIG. 14 depicts scenario 1400 representing devices that receive predictions from machine learning system 1210, according to an example embodiment. Scenario 1400 may include abrasive products 1410, remote devices 1420, vendors 1430, and analytics platform 1440. Notably, abrasive products 1410 may be embodied by abrasive products 1122, analytics platform 1440 may be embodied by analytics platform 1118, vendors 1430 may be embodied by outside vendors 1130, and remote devices 1420 may be embodied by remote devices 1128.

Abrasive products 1410 may include, for example, automated abrasive devices 1412, manual abrasive devices 1414, and wearable devices 1416 that are communicatively coupled to manual abrasive devices 1414, as described herein. As such, machine learning system 1210 may output predictive information relating to abrasive operational data of abrasive products 1410. Such abrasive operational data may be gathered by sensors disposed on or near abrasive products 1410. For example, abrasive operational data may include information about an angular velocity (RPM) of a grinding wheel, severity of the operation, and shocks experienced by the tool. In another example, the abrasive operational data may include grinding parameters of the manual abrasive devices 1414, including working angle, grip tightness, and applied pressure. As another example, noise sensors and spark-invariant sensors may provide electrical power information of automated abrasive devices 1412 and/or manual abrasive devices 1414. In a further example, the abrasive operational data may include gyroscope data indicative of the work piece on which the operation is being performed (e.g., based on sensor data, such as an image, indicative of the workpiece).

Based on this abrasive operational data, machine learning system 1210 may determine product-specific information of abrasive products 1410 and/or workpiece-specific information of the workpiece operated on by abrasive products 1410. Machine learning system 1210 may then provide abrasive products 1410 with one or more notifications alerting the product-specific information or workpiece-specific information. In response to receiving the indication, abrasive products 1410 may output a visual, haptic, and/or audio alert or may take an automated action. For example, abrasive products 1410 may include a graphical user interface (GUI) or an attached indicator light visual for notifications to be displayed. In another example, abrasive products 1410 may include an apparatus that converts electrical impulses into sound, such as an embedded speaker, for audio alerts to be heard. As a further example, abrasive products 1410 may include an embedded computing device that may automatically alter the abrasive operation of abrasive products 1410 in response to an indication from machine learning system 1210. In yet another example, wearable device 1416 may include a vibration mechanism such that alerts can be communicated as vibrations to the wearable device 1416.

In some embodiments, machine learning system 1210 may determine whether the operating speed of a particular abrasive wheel of abrasive products 1410 is within a safe, or productive operating range for the particular workpiece being operated on, the particular abrasive wheel, or a combination thereof. For example, machine learning system 1210 may provide a warning signal to abrasive products 1410 in the form of warning light. In another example, machine learning system 1210 may provide an automatic instruction to abrasive products 1410 to adjust an RPM, turn on, and/or turn off. For instance, this automatic instruction may be a signal to a fluid control valve, e.g., an air valve, to adjust the speed of the grinder or an indication to use a grinding dresser to dress the surface of the abrasive wheel.

In some embodiments, the machine learning system 1210 may determine that an abrasive article of abrasive products 1410 damaged or malfunctioning. For instance, the machine learning system 1210 may analyze acceleration and/or noise data to determine that the abrasive article is damaged and/or malfunctioning. This may involve detecting one or more patterns in the acceleration and/or noise data that may be indicative of a damaged or malfunctioning abrasive article. For instance, a first pattern of spikes or peaks may be indicative of a damaged abrasive product and a second pattern of spikes or peaks may be indicative of a malfunctioning abrasive product. After making a determination, machine learning system 1210 may provide abrasive products 1410 with an indication that the abrasive article is damaged or malfunctioning. Such an indication may be a visual, haptic, and/or audio alert. In some embodiments, machine learning system 1210 is configured to send an indication upon the acceleration and/or noise data exceeding predefined threshold (e.g., maximum desired tool vibration level, maximum desired tool noise level, etc.). In such embodiments, the indication could be instruction to shut of one or more abrasive products 1410. Additionally, the alert may provide the user with an option to order a replacement article or to request maintenance for the article via a GUI.

In some embodiments, machine learning system 1210 may determine, based on the gyroscope data, that a user is positioning manual abrasive device 1414 at an angle that is different from a recommended angle. Based on this abrasive operational data, machine learning system 1210 may determine that the user of manual abrasive device 1414 is incorrectly performing an operation. Machine learning system 1210 may then provide the manual abrasive device 1414 and/or wearable device 1416 with an indication that a user is performing the operation incorrectly. In response to receiving the indication, manual abrasive device 1414 and/or wearable device 1416 may output a visual, haptic, and/or audio alert that indicates to the user that the user is performing the operation incorrectly. Additionally and/or alternatively, the machine learning system 1210 may continuously provide the user with feedback indicative of correct performance of the operation by providing notifications related to the abrasive operations.

In some embodiments, machine learning system 1210 may determine an ergonomic status of the user operating manual abrasive device 1414. For instance, the determination may be based on an analysis of the data captured from manual abrasive device 1414. Machine learning system 1210 may determine that the user has been performing operations for a period of time greater than a recommended time and/or may determine that the user is operating manual abrasive device 1414 at a force, vibration, and/or RPM level higher/lower than desired. For instance, an operator and/or an abrasive product manufacturer could provide machine learning system 1210 with upper and lower limits for force, vibration, and/or RPM. The upper and lower limits could be determined via machine learning system 1210, analytics platform (e.g., analytics platform 1118) and/or could be based on an occupational safety standard, either enforced today or in the future. For example, the upper and lower limits may be based on standards set by the Occupational Safety and Health Administration (OSHA), the National Institute for Occupational Safety and Health (NIOSH), the European Agency for Safety and Health at Work (EU-OSHA), or the International Organization for Standardization (ISO). Accordingly, machine learning system 1210 could determine whether the force, vibration, and/or RPM data collected from the user operating manual abrasive device 1414 is within an "optimal zone", e.g., falls between the upper and lower limits. If the percentage of time that the user operates within the optimal zone is sufficiently low, machine learning system 1210 can provide manual abrasive device 1414 and/or wearable device 1416 with information to increase the percentage of time in the "optimal zone", in some embodiments, by outputting a visual, haptic, and/or audio alert that provides operational improvements, recommended angles of operation, and so on. In such a manner, systems and methods described herein could monitor operating conditions relevant to worker safety and/or compliance with international, federal (e.g., OSHA), state, and/or local rules and guidelines. In some embodiments, a safety margin (e.g., 1-10% of maximum limit value) could be included so as to ensure compliance and to avoid inadvertent violations due to, for example, sensor miscalibration or other minor sensor errors.

In some embodiments, optimal zones relating to different abrasive operations and/or tools could be operationally dependent. For example, the optimal zone for vibration data received from a manual abrasive device may be different than the optimal zone for vibration data received from a handheld abrasive device. As another example, the optimal zone for vibration data received from a lighter handheld abrasive device might be different than the optimal zone for vibration data received from a heavier handheld abrasive device.

Further, the optimal zones could be measurements that are calculated based on a maximum metric of an abrasive device. For example, if an abrasive device had a maximum RPM of MAX_PRM, than the optimal zone of that abrasive device could be calculated as anywhere between 0.6*MAX_RPM to 0.7*MAX_RPM.

Note that while optimal zones were discussed based on data collected from manual abrasive device 1414, optimal zones could similarly be developed for data collected from automated abrasive device 1412.

In some embodiments, machine learning system 1210 may determine an end of life estimate for abrasive products 1410. For example, the determination may be based on an analysis of historical RPM data or product life data of similar abrasive products that failed and/or were decommissioned. Machine learning system 1210 may then provide abrasive products 1410 or a supervisor of the operator of abrasive products 1410 with an indication that abrasive products 1410 are near the end of life. This indication may include an estimated amount of time that an operator can safely use abrasive products 1410. In some cases, machine learning system 1210 may also be configured to automatically order a replacement device for abrasive products 1410.

Remote devices 1420 may include, for example, mobile computing devices, database devices, tablet computing devices, and/or other computing devices that facilitate operations including aggregating received data, filtering received data, and/or displaying receiving data. Remote devices 1420 may also include capabilities to execute web applications. Machine learning system 1210 may output predictive information relating to the aggregate abrasive operational data of multiple abrasive devices in an enterprise to remote devices 1420. As such, this information may be displayed by remote devices 1420 for analysis by one or more supervisors. For example, the aggregate abrasive operational data may include length of time spent performing assigned tasks, idle time of abrasive device operators, and/or productive time of abrasive device operators. For instance, the sound data and/or the vibration data may be used to determine an abrasive device is in operation.

Machine learning system 1210 may be configured to collect the aggregate abrasive operational data and maintain categorize the collected data by abrasive operation performed, length of the abrasive operation, workpiece associated with the abrasive operation, the abrasive device used, the operator performing the abrasive operation, and the time the abrasive operation was performed, feedback on the abrasive operation (e.g., from a manger or customer), vibration, noise, productivity, product life, etc.

Based on the aggregate abrasive operational data collected from multiple abrasive devices in an enterprise, machine learning system 1210 may provide predictions for improved workplace/enterprise operations. For example, machine learning system 1210 may predict workflows and/or best practices for performing a particular type of task by utilizing a database of knowledge base articles that include information related to tasks, information related to best practices when performing tasks, and information describing how to use certain abrasive devices to complete a task. In another example, machine learning system 1210 may provide metrics associated with one or more abrasive devices in an enterprise. The metrics may include a usage rates, total operation times, downtime, number of malfunctions, number of repair requests, and so on. These metrics may be compared across abrasive devices used in a given task and across operators.

In example implementations, remote devices 1420 could be programmed to display the predictions of best practices, workflows, and metrics received from machine learning system 1210. These could include graphical visualizations (e.g., histograms, bar charts, plot trends across time), key performance indicators (KPIs) of the enterprise, and so on. In some embodiments, remote devices 1420 could be programmed to display virtual rewards that appear in response to positive action performed by an abrasive device operator, such as a positive safety actions (e.g., modifying a grinding angle, performing a recommended safety check, performing recommended maintenance, etc.) or a positive operational action (e.g., having the highest/fastest throughput, producing the most parts per minute, etc.), among other possibilities. In such embodiments, a central server device (e.g., server devices 1126 or machine learning platform 1110) could establish among remote devices 1420 virtual competitions in which the virtual rewards associated with each remote device 1420 are compared to one another, thus possibly encouraging each operator to increase their virtual rewards by performing further positive actions. Remote devices 1420 may also have access to analytics platform 1440, as discussed below.

Vendors 1430 may represent one or more computing systems managed by the operator of machine learning system 1210, partners of the operator of machine learning system 1210, and/or partners of the enterprise using machine learning system 1210. For example, vendors 1430 may include computing systems associated with manufacturers responsible for assembling components of one or more abrasive devices, logistics centers responsible for delivering components to/from the enterprise, research and development (R&D) centers responsible for improving abrasive device operations, OSHA inspectors responsible for abrasive device safety, abrasive device repair technicians responsible for repairing defective abrasive devices, and so on. To allow flexibility across potential vendors, machine learning system 1210 may provide the ability to add and/or remove vendors from communication. Adding a vendor may involve configuring machine learning system 1210 to process data in a format provided by a vendor and transmitting data in a format known to the vendor. Adding a vendor may also involve configuring machine learning system 1210 to resolve conflicting actions between vendors. For instance, machine learning system 1210 may resolve conflicting actions by defaulting to actions to a primary vendor.

Communication with vendors 1430 may enable machine learning system 1210 to automatically adjust supply chain/manufacturing operations in response to predicted outputs. As an example, machine learning system 1210 may collect temporal abrasive operational data over the lifetime of an operator or abrasive device to provide an estimate for abrasive product life, abrasive product condition, and/or operator conditions. Based on the predicted output from the temporal abrasive operational data, machine learning system 1210 may be configured to transmit commands directly to vendors 1430. Such commands may include an automatic order of new components for an abrasive product nearing a predicted end of life, an automatic request for an OSHA inspection to comply with regulatory laws based on a predicted safety hazard, and/or a cancelation of an order based on a predicted extension of an end of life.

In some examples, machine learning system 1210 may collect data associated with microscopic interactions between an abrasive device and workpiece during a grinding process. Each set of microscopic interactions may be tagged with a type of surface generated at the end of the grinding process. Accordingly, machine learning system 1210 may utilize this type of surface generated to predict how microscopic interactions can be manipulated individually or in some combination, based on machine tool capabilities, abrasive grains, bonds, the grain/bond interaction between the surface and the tool, or structure, work material properties, abrasive device features and specifications, as well as operational factors such as truing and dressing, cycle design, coolant application, to create a desired surface. Additionally, the power of abrasive device, grinding efficiency of the device tool, and cutting efficiency of the device may be collected and used to create a desired surface.

In example embodiments, machine learning system 1210 may utilize such relationships, provide predictions based on the relationships, and/or transmit the predictions to an abrasive manufacturing vendor to help produce improved abrasive products or grinding processes that achieve a specific set of microscopic interactions, construct new abrasive grains or abrasive tools that have different microscopic interactions with a workpiece, and/or create custom abrasive products and grinding processes to address a customer's requirements.

In some embodiments, machine learning system 1210 may provide enterprises the option to configure the types of automatic alerts sent to vendors 1430. For example, machine learning system 1210 may be configured to only order new components based on the type of abrasive article that components are needed for, the cost of components, the delivery time of the components, and so on.

Analytics platform 1440 may include a web application configured to receive, across multiple enterprises, abrasion operational data and predictions made by machine learning system 1210. By utilizing data across multiple enterprises, analytics platform 1440 may provide services to simulate the operation of abrasive products, estimate costs of purchasing new abrasive products, and/or perform other analytical operations. For example, enterprises without access to a specific abrasive product may utilize analytics platform 1440 to estimate the costs or productivity rates associated with the specific abrasive products. Analytics platform 1440 may be accessed by one or more users though a web browser.

In some embodiments, analytics platform 1440 may provide tiered services. Each tiered may provide different portions of information to a user. For instance a higher tier may give a user access to all services on the analytics platform 1440 while a lower tier may only give a user access to a portion of services on analytic platform 1440. Tiers may be assigned to users based on a fee or subscription basis or another paid for service mechanism.

In some embodiments, analytics platform 1440 may be configured to anonymize received abrasion operational data and predictions from machine learning system 1210. For example, de-identification methods such as k-anonymization may be utilized disassociate abrasion operational data from an enterprise by ensuring that data from at least k enterprises are undistinguishable. As another example, analytics platform 1440 may be configured to take restrictions from each enterprise, the restrictions indicating the types of abrasion operational data that may be shared and the types of abrasion operational data that may not be shared.

In various embodiments, analytics platform 1440 includes a simulation environment programmed with digital versions (e.g., "digital twins") of physical abrasive products used by an enterprise. The simulation environment could use these digital versions to estimate productivity, costs, and/or injuries resulting from adding/reconfiguring/removing different digital abrasive products from the stimulation environment. The simulation environment may be modeled, for instance, by modeling software such as ProModel™.

In some examples, the simulation environment could use a digital version of a physical abrasive product to generate synthetic sensor data. The synthetic sensor data could mirror actual sensor data generated from a physical abrasive product. However, unlike actual sensor data, the synthetic sensor data could have the advantage of being quick and easy to produce. The synthetic sensor data could be provided to an enterprise for cost estimates, throughput analysis, energy usage rates, and so on. Additionally, the synthetic sensor data could be provided to a machine learning system (e.g., machine learning system 1210) and used to train one or more machine learning models.

Further, the simulation environment could provide the ability to simulate the construction of a new abrasive product. For example, the simulation environment may provide the ability to model, via a computer aided design (CAD) program such as AutoCAD™, a completely new abrasive product or a new variation of an existing abrasive product. Machine learning system 1210 could then estimate abrasive operational data, such as RPM, and related predictions (e.g., cost, idle time) that could result from operations of the new abrasive product. This may aid the user in deciding whether to actually create and manufacture the new abrasive product.

X. Example Methods

Figure 15:
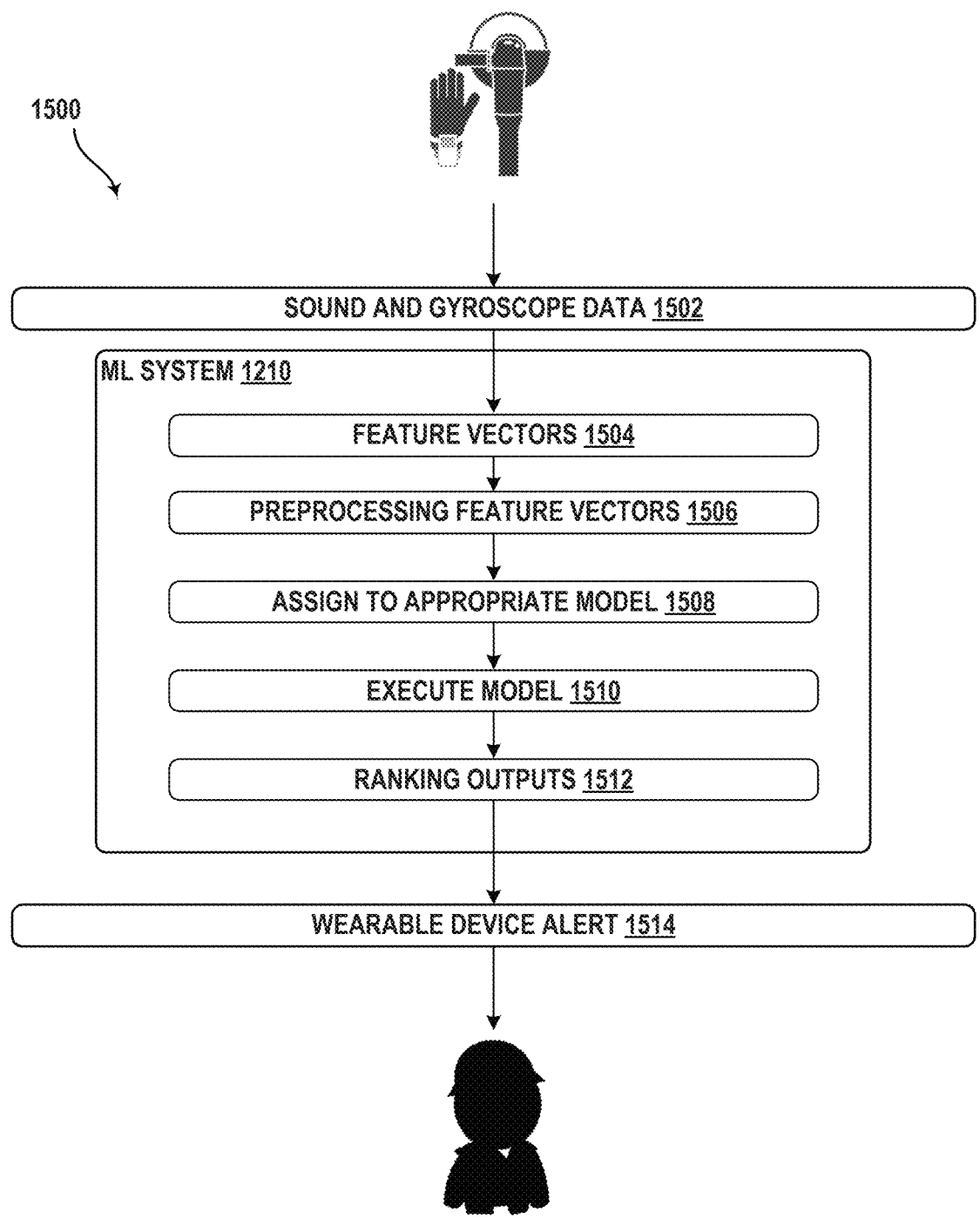
FIG. 15 is a flowchart of method, in accordance with example embodiments.

FIG. 15 is a flowchart of method 1500, in accordance with example embodiments. Method 1500 may start at block 1502, where a wearable device, such as wearable device 1320, may collect sensor data from an abrasive operation. For example, the abrasive operation may include an operator with a wearable device using a manual angle grinder to grind on a workpiece (e.g., a piece of sheet metal). During the grinding operation, the wearable device may determine, based on an embedded gyroscope sensor, angular velocity values of the wearable device with respect to the X, Y, and Z axis. These values may be used to estimate user's positioning of the manual angle grinder. Moreover, the wearable device may determine, based on communication with a sound sensor embedded in the angle grinder, the frequency, amplitude, and wavelength of sounds emitted from a rotating grinding wheel on the angle grinder. This data may be used to estimate the operational status of the angle grinder. Notably, sound data and gyroscope data are just examples of sensor data that may be collected at block 1502. In reality, any sensor data described with respect to FIG. 13 and FIG. 14 may be utilized.

At block 1504, machine learning system 1210 may receive the sensor data from one or more server devices configured aggregate sensor data from the wearable device, such as server device 1340, or directly from the one or more sensors on the wearable device. Machine learning system 1210 may then convert the received sensor data into feature vectors for input into one or more machine learning models. For example, machine learning system 1210 may be configured to create a feature vector (with an associated label) for sensor data collected at a given timestamp. In other words, machine learning system 1210 may create feature vector V_1 to describe sensor data collected at time T_1 and may create a feature vector V_2 to describe data collected at time T_2. Machine learning system 1210 may also convert categorical data collected from the sensors, such as product type, into one hot encodings. At block 1506, machine learning system 1210 may preprocess the feature vectors to enable more accurate predictions. For example, preprocessing may include normalization techniques (scaling to unit norm), discretization of continuous features (e.g., binning), and/or other known methodologies.

At block 1508, machine learning system 1210 may assign the feature vector to a trained machine learning model for execution. As noted above, machine learning system 1210 may contain a plurality of trained machine learning models, each trained to make predictions on a specific subset of abrasive products. For example, machine learning system 1210 may use a unique identifier, such as identifying feature 1314 (which may have been transmitted along with the sensor data by the wearable device) to recognize that the input feature vector corresponds to a manual angle grinder. With this, machine learning system 1210 may select a machine learning model that has been trained with sensor data from comparable manual angle grinders. Continuing from the above example, the selected machine learning model may be a feedforward Artificial Neural Network (ANN) model that predicts whether the operator of the identified abrasive product is performing an unsafe abrasive operation. However, any machine learning model as described with respect to FIG. 12 may be utilized.

At blocks 1510, machine learning system 1210 may execute the selected machine learning model with the input feature vector to predict one or more outputs. In accordance with the present example, the ANN model may use a softmax function to map the non-normalized output of the ANN to a probability distribution over predicted outputs. For example, predicted outputs may include operator conditions such as "OK", "APPROACHING CRITICAL", and "CRITICAL". At block 1512, the predicted probabilities may be ranked and the highest probability output or any probability output greater than a predefined threshold may be provided to the wearable device. Moreover, based on this predicted output, machine learning system 1210 may be configured to provide a recommendation to the wearable device to resolve any harmful conditions that are predicted. Other predicted outputs are possible.

At block 1514, the wearable device may receive a notification from machine learning system 1210 with one or more recommendations to provide to the operator. For example, the wearable device may include a graphical user interface for a visual notification to be displayed. This indication may be a flashing warning indicating that the operator is performing a dangerous operation using the abrasive device. In response this indication, the operator may change the position of the angle grinder. This change in positioning may result in another prediction by machine learning system 1210 to determine whether the changed position has resolved the hazard. Notably, other types of notifications and display mechanisms as described with respect to FIG. 15 are possible.

Figure 16:
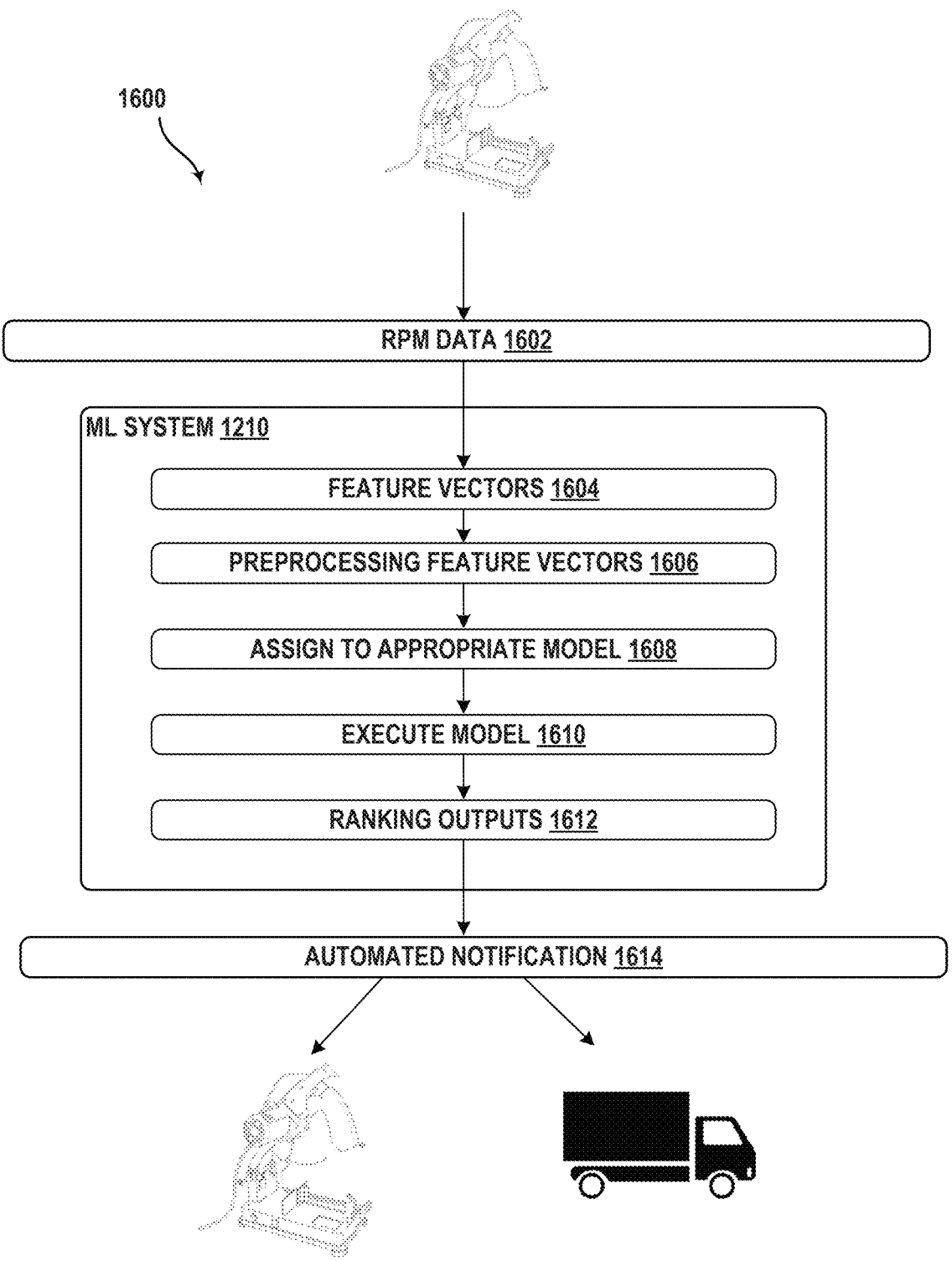
FIG. 16 is a flowchart of method, in accordance with example embodiments.

FIG. 16 is a flowchart of method 1600, in accordance with example embodiments. Method 1600 may start at block 1602, where an automated abrasive device, such as automated abrasive device 1330, may collect sensor data from an abrasive operation. For example, the abrasive operation may include the automated abrasive device operating on a workpiece (e.g., a piece of sheet metal). During the grinding operation, the automated abrasive device may determine, based on an embedded spark-invariant sensors, the RPM of a grinding wheel of the automated abrasive device. For example, the spark invariant sensor may be configured to detect rotation of sensing targets attached to a grinding wheel. Notably, RPM data is just an example of sensor data that may be collected at block 1602. In reality, any sensor data described with respect to FIG. 13 and FIG. 14 may be utilized.

At block 1604, machine learning system 1210 may receive the sensor data from one or more server devices configured aggregate sensor data from the automated abrasive device, such as server device 1340, or directly from the one or more sensors of the automated abrasive device. Machine learning system 1210 may then convert the received sensor data into feature vectors for input into one or more machine learning models. For example, machine learning system 1210 may be configured to create a feature vector (with an associated label) for sensor data collected at a given timestamp. In other words, machine learning system 1210 may create feature vector V_1 to describe sensor data collected at time T_1 and may create a feature vector V_2 to describe data collected at time T_2. Machine learning system 1210 may also convert categorical data collected from the sensors, such as product type, into one hot encodings. At block 1606, machine learning system 1210 may preprocess the feature vectors to enable more accurate predictions. For example, preprocessing may include normalization techniques (scaling to unit norm), discretization of continuous features (e.g., binning), and/or other known methodologies.

At block 1608, machine learning system 1210 may assign the feature vector to a trained machine learning model for execution. As noted above, machine learning system 1210 may contain a plurality of trained machine learning models, each trained to make predictions on a specific subset of abrasive products. For example, machine learning system 1210 may use a unique identifier to recognize that the input feature vector corresponds to the automated abrasive device. With this, machine learning system 1210 may select a machine learning model that has been trained with sensor data from comparable automated abrasive devices. Continuing from the above example, the selected machine learning model may be a support vector machine (SVM) that predicts whether the automated abrasive device is operating is malfunctioning or defective. However, any machine learning model as described with respect to FIG. 12 may be utilized.

At blocks 1610, machine learning system 1210 may execute the selected machine learning model with the input feature vector to predict one or more outputs. In accordance with the present example, the SVM model may be multiclass SVMs that utilizes a one vs. one training mechanism (e.g., each pair of classes/predicted outputs is assigned to one SVM of the multi-class SVM) to determine a score for each of predicted outputs. For example, predicted outputs may include device conditions such as "OK", "MALFUNCTIONING", "OVERHEATING", and "DANGER". At block 1612, the scores may be ranked and the predicted output with the highest score or any predicted output with a score greater than a predefined threshold may be provided to the automated abrasive device. Moreover, based on this predicted output, machine learning system 1210 may be configured to provide a control instruction to the automated abrasive device to resolve any harmful conditions. Other predicted outputs are possible.

At block 1614, the automated abrasive device may receive a notification from machine learning system 1210 with one or more control instructions. For example, the automated abrasive device may include an embedded computing device that may control the operations of the automated abrasive device. This embedded computing device may receive the notification and adjust a rotational speed, provide a notification, turn on tool, or turn off tool. Alternatively and/or additionally, machine learning system 1210, upon predicting that the automated abrasive device is malfunctioning, may be configured to place an automated request to order new parts to fix the automated abrasive device. Notably, other types of notifications and display mechanisms as described with respect to FIG. 16 are possible.

Figure 17:
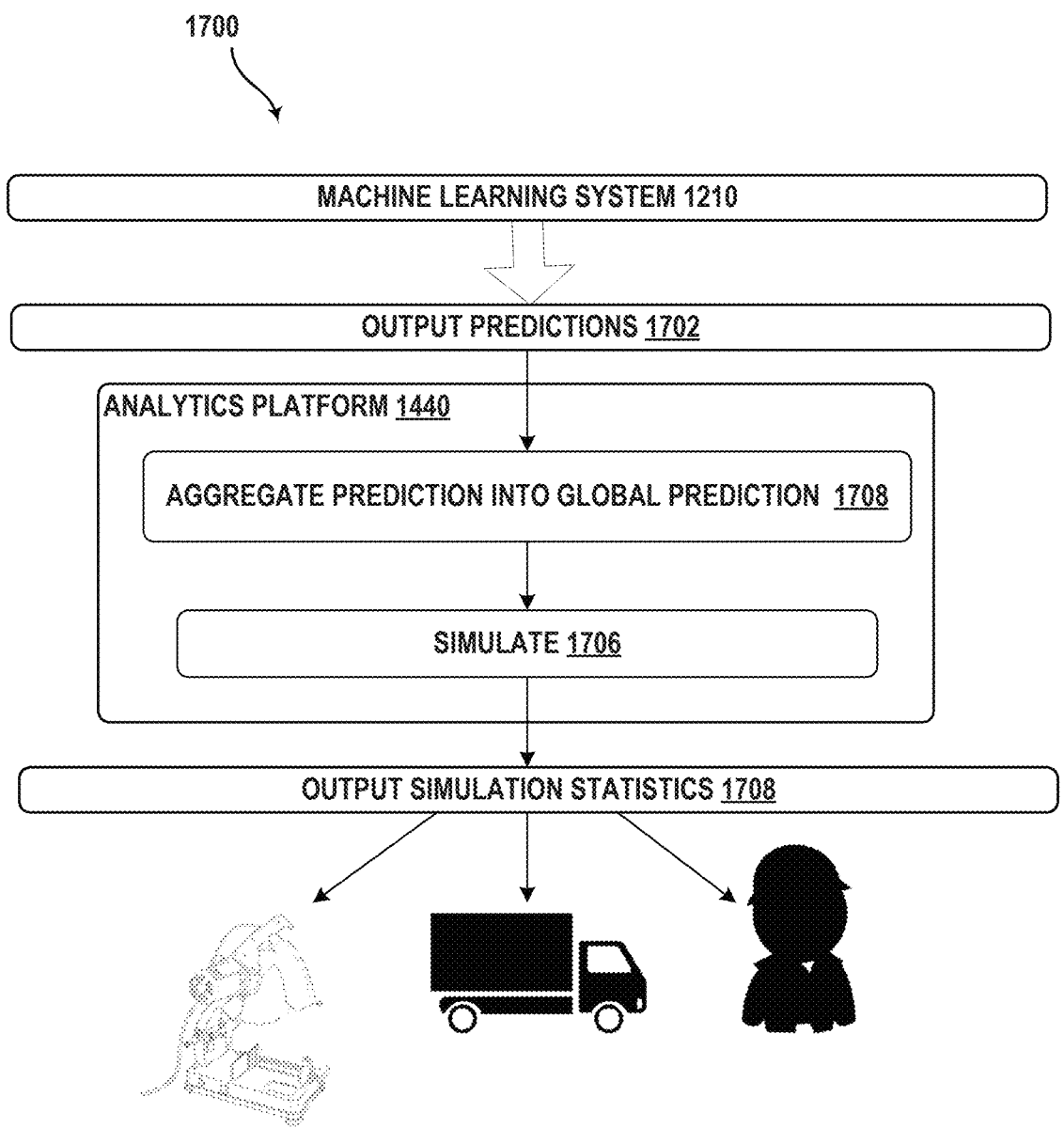
FIG. 17 is a flowchart of method, in accordance with example embodiments.

FIG. 17 is a flowchart of method 1700, in accordance with example embodiments. Method 1700 may start at block 1702, where machine learning system 1210 outputs one or more predictions corresponding to sensor data received from one or more enterprises. For example, predictions may include average estimated idle times of operators performing abrasive operations in an enterprise. Other predictions as described herein are possible.

At block 1704, the predictions from block 1702 may be aggregated together to calculate a global average prediction. For example, the average estimated idle time of operators performing abrasive operations may be aggregated across multiple enterprises. At block 1706, one or more global average predictions may be utilized as inputs into a simulation engine that mimics abrasive operations of an artificial enterprise over a predefined time period (e.g., 10 years, 20 years). As such, the simulation engine may rely on the one or more global average predictions as parameters to guide the simulation and produce synthetic abrasive operational data.

At block 1708, output statistics from the simulation determined from the synthetic abrasive operational data, such as number of injuries, total productive time, and/or total cost, are provided. These output statistics may aid a user of analytics platform 1440 with making decisions such as whether to order more abrasive devices, whether to hire more operators, or whether to create a new supply chain strategy. Other options are possible.

XI. Example Abrasive Wheels

During an assembly process, an abrasive product manufacturer may couple identification tags (or colloquially referred to as "tags") to abrasive wheels. Through these tags, information unique to each abrasive wheel can be ascertained. For example, tags may provide details regarding an abrasive wheel's manufacturing date, surface material, GPS position within an environment, size, and/or expiration date. Suitably, the abrasive product manufacturer and/or customers of the abrasive product manufacture may utilize tags to make informed decisions.

In some aspects, tags may be used to track movement of abrasive wheels within an enterprise environment. For example, the enterprise environment may be equipped with several tag readers (or colloquially referred to as "readers") within a given environment. These readers may communicate with tags to establish which abrasive wheels are entering a given region of the environment and which abrasive wheels are leaving such regions.

In some aspects, tags may improve the setup efficiency of abrasive devices. For example, upon attaching an abrasive wheel to an abrasive device, the abrasive device may automatically communicate with the abrasive wheel's tag to determine features (e.g., diameter, structure, material) of the abrasive wheel. Using this information, the abrasive device may determine the best operating parameters (e.g., RPM speed, applied pressure, feed rate, depth of cut, traverse rate, coolant factors, dressing factors, etc.) to correctly operate the abrasive wheel.

In some aspects, tags may increase the safety of abrasive devices. For example, upon attaching an abrasive wheel to an abrasive device, the abrasive device may automatically communicate with the abrasive wheel's tag to determine a level of deterioration of the abrasive wheel (e.g., the waning of the abrasive wheel's outer coating). If the deterioration is beyond a threshold level, the abrasive device may notify a supervisor or a device operator that the deteriorated abrasive wheel should be replaced with a new abrasive wheel.

In some aspects, tags may improve the logistical aspects of an enterprise. For example, an enterprise may use tags to dynamically maintain part inventory and determine whether and/or when new abrasive wheels should be ordered.

In some aspects, tags may be combined with software applications that can display tag information in a user friendly format. Moreover, the software applications may offer users the capability to perform actions, such as ordering new abrasive wheels, in response to obtaining the tag information.

As an example operation, an abrasive product manufacturer may wish to track the usage of an abrasive wheel within a customer's environment. To do so, the abrasive product manufacturer may couple a tag to the abrasive wheel and may provide the customer with a software application to communicate with the tag. Then, when using the abrasive wheel, the customer may update, via software application, the tag to reflect how many workpieces the abrasive wheel has operated on, how long the abrasive wheel was being used, and so on. Such usage information could be made available to the abrasive product manufacture by the customer. In such scenarios, if the abrasive wheel is transported back to the abrasive product manufacturer for repairs and/or refurbishment, the abrasive product manufacturer may be knowledgeable to the history of the abrasive wheel and, in turn, may determine an optimal repair strategy to address the abrasive wheel's usage history and particular use case.

Other features, functionality, and benefits of tags may exist and will be appreciated and understood from the discussion below.

Figure 18B:
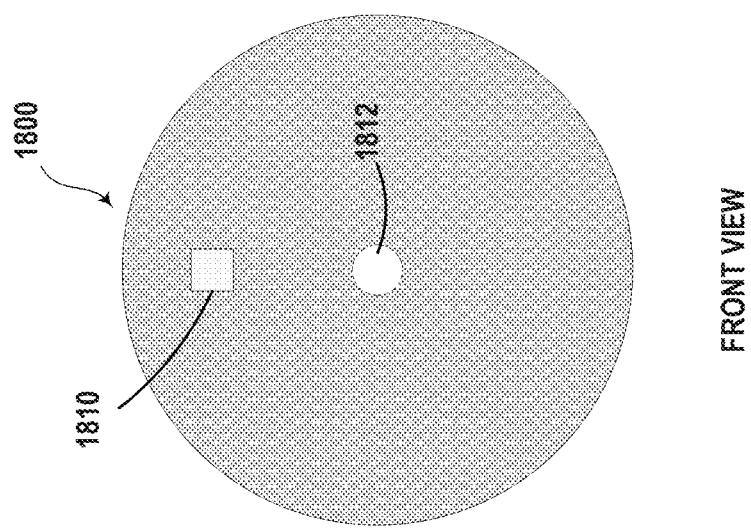
FIG. 18B illustrates an abrasive wheel, according to an example embodiment.
Figure 18A:
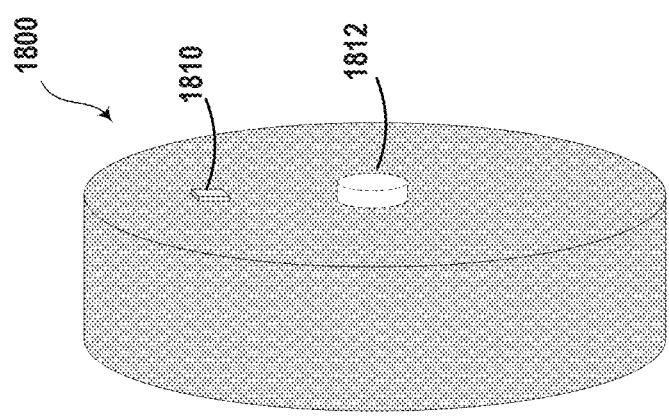
FIG. 18A illustrates an abrasive wheel, according to an example embodiment.

FIGS. 18A and 18B illustrate an abrasive wheel 1800, according to example embodiments. Abrasive wheel 1800 may take on all or some of the properties of the abrasive wheels or grinding wheels previously described herein. In examples, abrasive wheel 1800 contains tag 1810 and connection mechanism 1812. Abrasive wheel 1800 may serve as a grinding component of an abrasive device or abrasive product, such as manual abrasive device 1310 or automated abrasive device 1330, and may be physically connected to the abrasive device, perhaps via connection mechanism 1812. In some embodiments, tag 1810 could include a quick response (QR) code, bar code, a radio-frequency identification (RFID) tag (both active and passive), a near field communication (NFC) tag, a BLUETOOTH LOW ENERGY (BLE) device, or another type of tag. In examples, tag 1810 may contain information regarding abrasive wheel 1800 and/or may include a unique identifier, such as a universally unique identifier (UUID), which could be used as a pointer reference. The pointer reference could direct a computing device to information regarding abrasive wheel 1800 that is stored on a database device or elsewhere. While abrasive wheel 1800 is presently described, it will be understood that other types of abrasive products, such as bonded abrasives, coated abrasives, non-woven abrasives, thin wheels, cut-off wheels, reinforced abrasive articles, superabrasives, single-layered abrasive articles and multi-layered abrasive articles are all possible and contemplated herein. Any of these other types of abrasive products could also include an identifier and could be utilized as described below.

Figure 19:
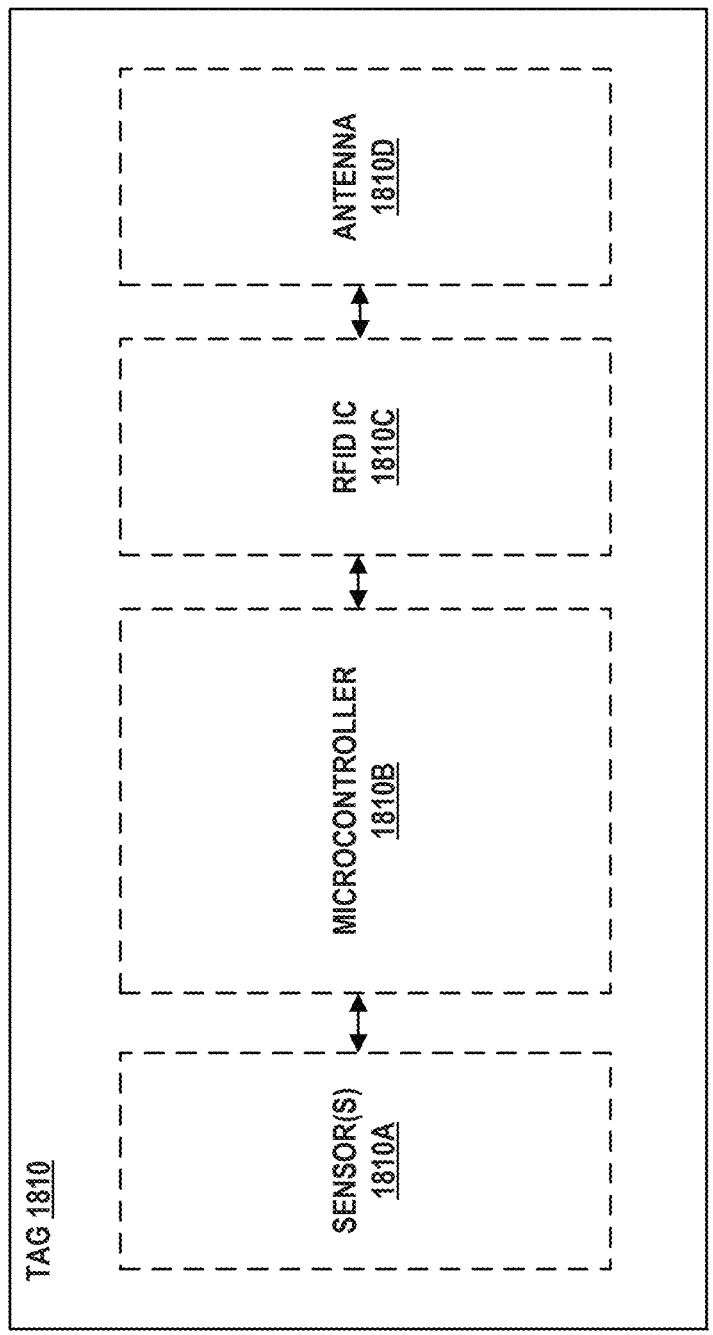
FIG. 19 illustrates components of a tag, according to example embodiments.

FIG. 19 illustrates components of tag 1810, according to example embodiments. In particular, tag 1810 is shown to include one or more sensors 1810A, microcontroller 1810B, RFID integrated circuit (IC) 1810C, and antenna 1810D. In some examples, tag 1810 can have more, fewer, and/or different types of components than indicated in FIG. 19.

Sensor(s) 1810A may take on all or some of the properties of the sensors previously described herein. In some embodiments, sensor(s) 1810A may be physically outside the confines of tag 1810, but may be communicatively coupled to components within tag 1810. In other embodiments, sensor(s) 1810A may be physically inside the confines of tag 1810, as depicted in FIG. 19.

In some embodiments, sensor(s) 1810A may include magnetometers configured to sense a surrounding magnetic field of a workpiece operated on by abrasive wheel 1800. The magnetic field may be converted into an analog or digital electronic signal and transmitted to microcontroller 1810B, which may be configured to convert the magnetic field data to equivalent orientation data.

In some embodiments, sensor(s) 1810A may include temperature and humidity sensors configured to provide information about the environmental temperature and humidity levels around abrasive wheel 1800. The readings may be converted into equivalent analog or digital electronic signals and transmitted to microcontroller 1810B.

In some embodiments, sensor(s) 1810A may include accelerometers configured to measure the vibration, orientation, surface acoustic levels, revolutions per min (RPM), and/or angular acceleration of abrasive wheel 1800. These measurements may be converted into analog or digital electronic signals and transmitted to microcontroller 1810B.

In some embodiments, sensor(s) 1810A may include a capacitive input interface capable of measuring variations in material density or potential damages related to abrasive wheel 1800 by way of fluctuations in capacitance between capacitive plates and/or wires. These measurements may be converted into digital electronic signals and transmitted to microcontroller 1810B.

Microcontroller 1810B may take on all or some of the properties of computing device 1000. In some embodiments, microcontroller 1810B may be physically outside the confines of tag 1810, but may be communicatively connected to the components within tag 1810. In examples, microcontroller 1810B may be configured to receive digital electronic signals from sensor(s) 1810A and write the receive signals as data into the memory of RFID IC 1810C. In some embodiments, microcontroller 1810B may be physically outside the confines of tag 1810, but may be communicatively coupled to components within tag 1810. In other embodiments, microcontroller 1810B may be physically inside the confines of tag 1810, as depicted in FIG. 19.

RFID IC 1810C may be an integrated circuit that stores and processes information as well as modulates/demodulates signals. RFID IC 1810C may take on all or some of the properties of computing device 1000. In examples, RFID IC 1810C may contain information regarding unique tag identifiers, unique tag serial numbers, passwords, or perhaps product-related information such as a stock number, lot or batch number, production date, or other specific information related to abrasive wheel 1800. Additionally, RFID IC 1810C may be able to store information provided by microcontroller 1810B, such as data collected from sensor(s) 1810A. The power to operate RFID IC 1810C may come from a battery unit attached to tag 1810 or may be obtained from the operations of antenna 1810D. In some embodiments, RFID IC 1810C may be physically outside the confines of tag 1810, but may be communicatively coupled to components within tag 1810. In other embodiments, RFID IC 1810C may be physically inside the confines of tag 1810, as depicted in FIG. 19.

Antenna 1810D may include an antenna structure and associated circuitry used by tag 1810 that is configured to receive and transmit signals. In examples, antenna 1810D may be communicatively coupled to RFID IC 1810C. In some embodiments, antenna 1810D may include an induced antenna coil that provides power to the components of tag 1810. Antenna 1810D can be made from a variety of materials and can be printed, etched, stamped, or vapor deposited onto tag 1810. In some embodiments, antenna 1810D may be physically outside the confines of tag 1810, but may be communicatively coupled to components within tag 1810. In other embodiments, antenna 1810D may be physically inside the confines of tag 1810, as depicted in FIG. 19.

Figure 20:
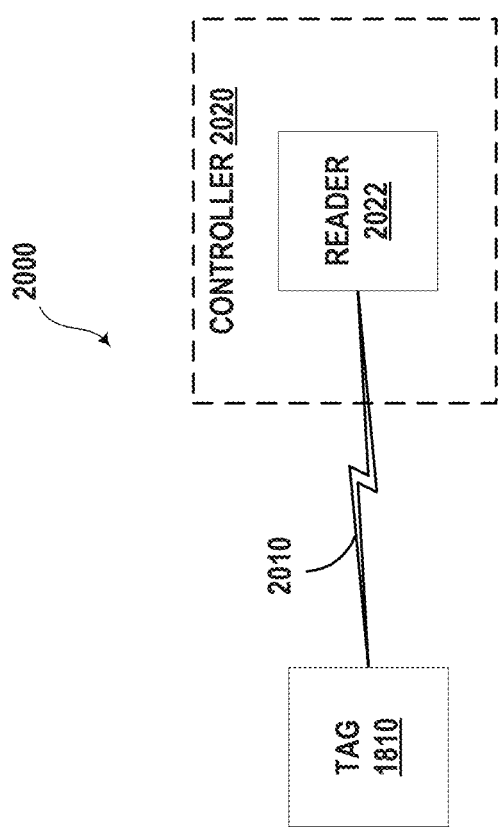
FIG. 20 illustrates a communication environment, according to an example embodiment.

FIG. 20 illustrates a communication environment 2000 between tag 1810 and reader 2022, according to example embodiments. Communications between tag 1810 and reader 2022 may be over communication medium 2010, which may include RFID, NFC, and/or BLE communications over ultra high (e.g., at or near 900 megahertz), high (e.g., at or near 14 megahertz), or low (e.g., at or near 130 kilohertz) frequencies, where the physical distance during communication between tag 1810 and reader 2022 may vary based on the frequency and type of communication medium 2010. The data received by reader 2022 may be information related to abrasive wheel 1800 and/or a unique identifier of abrasive wheel 1800.

In some examples, reader 2022 may take on the form of a portable, wireless reader system. In operations, reader 2022 may receive information from tag 1810 and immediately transmit the information to controller 2020 or a portable mobile device via wireless protocols, such as Bluetooth or Wi-Fi.

In some examples, reader 2022 may take on the form of a portable, wireless reader physically connected to a mobile device. In operations, reader 2022 may receive information from tag 1810 and immediately transmit the information to the mobile device via USB connections, micro USB connections, or similar physical connection mechanisms.

In some examples, reader 2022 may take on the form of a fixed reader system equipped with antennas that can communicate with tag 1810. In operations, reader 2022 may receive information from tag 1810 and subsequently transmit the information to a mobile device or controller 2020 via wireless protocols discussed above.

Figure 21:
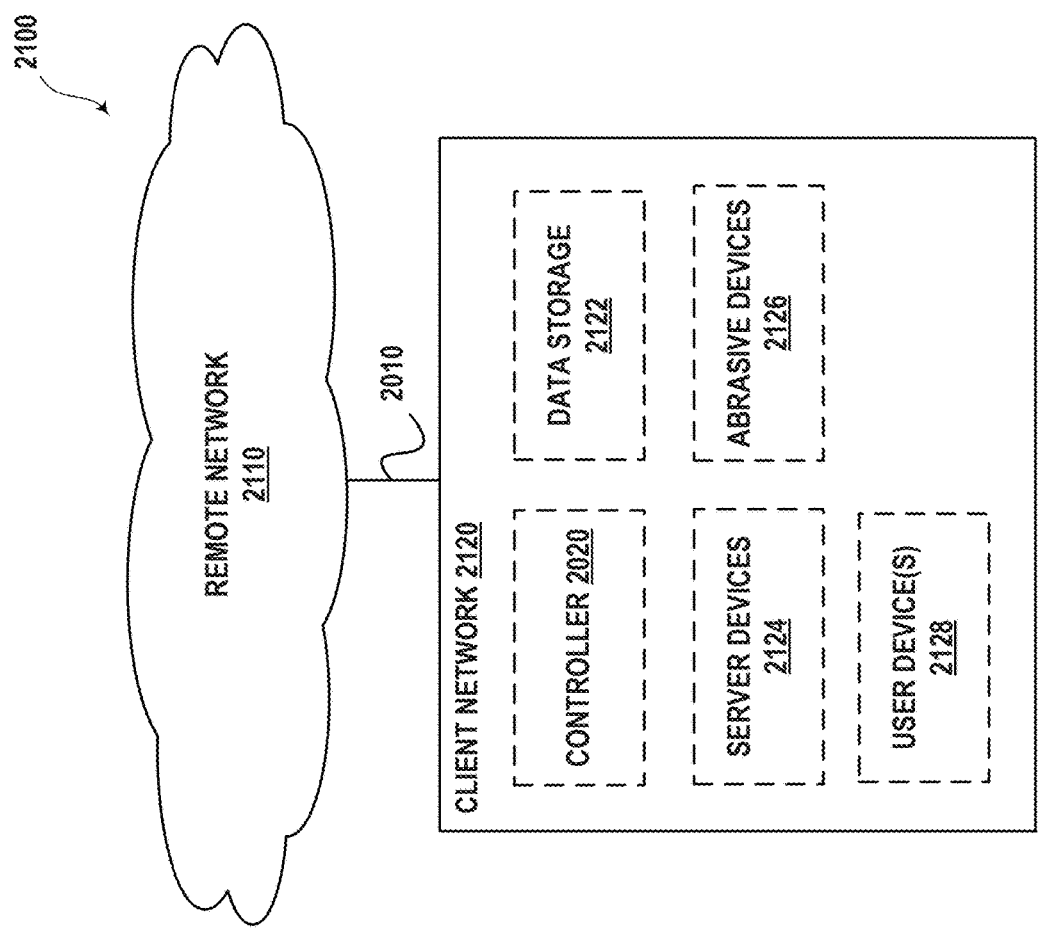
FIG. 21 illustrates a communication environment, according to an example embodiment.

FIG. 21 illustrates a communication environment 2100 between client network 2120 and remote network 2110, according to an example embodiment. Client network 2120 may take on all or some of the properties of enterprise 1120, as illustrated and described in reference to FIG. 11. Remote network 2110 may take on all or some of the properties of machine learning platform 1110, as illustrated and described in reference to FIG. 11. In examples, client network 2120 may be a computer network used by an entity to manage abrasive operations. Client network 2120 may include controller 2020, data storage 2122 (e.g., database devices, file systems), server devices 2124 (e.g., remotely hosted server devices, on premise server devices, virtual machines, etc.), abrasive devices 2126 (e.g., handheld grinding devices, automated grinding devices, including manual abrasive device 1310 or automated abrasive device 1330), and user device(s) 2128 (e.g., mobile devices and/or wearable device 1320 as illustrated and described in reference to FIG. 13). Client network 2120 may be communicatively coupled to remote network 2110, which may be configured to manage aspects of client network 2120.

It should be noted that any component on remote network 2110 and/or client network 2120 could be replicated across multiple computing devices and/or hosted by third-party networks (e.g., cloud networks) to provide data duplication and increase capacity of services. Replicated components may be located at various computing locations to ensure high availability in case of power failure at one computing location. In some cases, remote network 2110 and/or client network 2120 may consist of a few devices and a small number of components. In other deployments, remote network 2110 and/or client network 2120 may span across multiple physical locations and could include hundreds, thousands, or more devices and other components. In some cases, specific components on client network 2120 may be managed by remote network 2110. For example, one or more server devices 2124 or controller 2020 may be installed onto client network 2120 by remote network 2110 in order to support the various embodiments herein.

Figure 22:
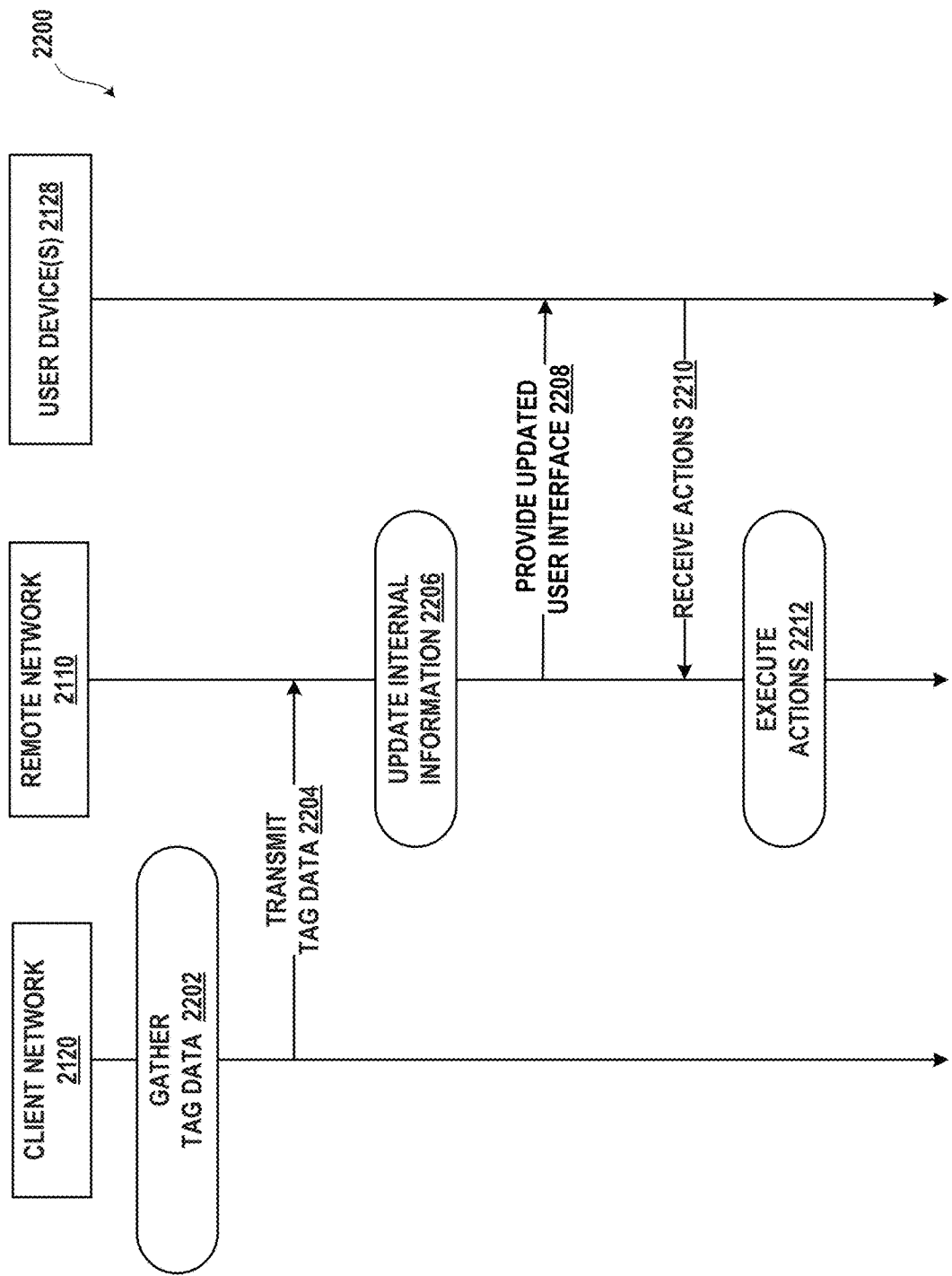
FIG. 22 illustrates a method, according to an example embodiment.

FIG. 22 illustrates method 2200, according to an example embodiment. In particular, method 2200 may represent a specific sequence or series of actions that, when performed, allows remote network 2110 to gather tag information from client network 2120 and provide updated status information to user device(s) 2128. By way of example, method 2200 may utilize remote network 2110, client network 2120, and user device(s) 2128 during operation. However, additional components, steps, or blocks, may be added to method 2200. For example, the steps described within respect to remote network 2110 may take place wholly or in part on a server device (e.g., server devices 2124) located on client network 2120 or third-party networks (e.g., AMAZON WEB SERVICES™) operated by client network 2120. Such a scenario may be referred to as a "locally hosted solution" and may allow the client network 2102 to execute the operations of method 2200 while maintaining high levels of security and flexibility by having all or some of the entities executing method 2200 within client network 2120.

Method 2200 may begin at step 2202, when client network 2120 gathers data from one or more tags, such as tag 1810. As described above, several means may be utilized to gather tag data from abrasive wheels. For example, a portable, wireless reader may be used to collect tag data and transmit the tag data to controller 2020. As another example, a fixed reader system may be used to collect tag data. In another example, a user of a mobile device may manually input tag data, perhaps after physically inspecting the properties of an abrasive wheel. Other possibilities may also exist. Moreover, step 2202 may exemplify a continuous procedure taking place on client network 2120, in which one or more readers, such as reader 2022, continuously operate to collect data from one or more tags within client network 2120.

At step 2204, client network 2120 may transmit tag data to remote network 2110. Step 2204 may be facilitated by several entities within client network 2102. For example, controller 2020 may communicate data to remote network 2110, user device(s) 2128 may communicate data to remote network 2110, and/or reader 2022 may communicate tag data to remote network 2110. In examples, transmission of data from client network 2120 to remote network 2110 may occur based on a predetermined frequency interval (e.g., every 1 ms, or 1 s) or based upon an event occurring on client network 2120 (e.g., any time new tag data is collected).

At step 2206, remote network 2110 may update internal information to reflect the received tag data from step 2204. Accordingly, step 2206 may include updating databases records, file entries, software parameters, and so on. Subsequently, at step 2208, remote network 2101 may provide an updated user interface to user device(s) 2128. The user interface may be represented by way of a web page or series of web pages hosted by remote network 2110 and provided to user device(s) 2128. For example, in some embodiments, the user interface presented to user device(s) 2128 may provide an overview of all abrasive wheels currently used within client network 2120 as a series of selectable items. In some such scenarios, the selectable items may be configured to allow a user to view the collected tag data for each respective abrasive wheel. Additionally, the user interface may provide key performance indicators (KPIs), such as overall inventory level, as well as user implementable actions.

At step 2210, upon users selecting or otherwise choosing at least one implementable action, the at least one action may be transmitted by user device(s) 2128 to remote network 2110. In response, at step 2212, the at least one action transmitted at step 2210 may be executed by remote network 2110.

In some cases, executing the at least one action can include one or more interactions with abrasive devices 2126 on the client network 2120. For instance, remote network 2110 can establish communication with abrasive devices 2126 on client network 2120 to send requests to halt the operations of certain abrasive devices, resume the operations of abrasive devices, and so on.

In some cases, executing the at least one action could include interacting with a third-party vendor, such as outside vendor 1130, to order replacement parts or repair/refurbish a malfunctioning or used abrasive wheel. In some cases, executing the at least one action can involve remote network 2110 placing a request to ship new abrasive wheels, for example, in the case of an inventory shortage determined by client network 2120.

In some cases, executing the at least one action can involve providing alerts in the form of a text message, email alert, another other type of communication to other user device(s) 2128 on client network 2120. For example, an administrator from client network 2120 could transmit a message to all users of a certain product line to halt operations due to a potential production problem.

Notably, the actions discussed above with respect to 2212 are not intended to be limiting. In practice, other actions may also be possible.

Figure 23:
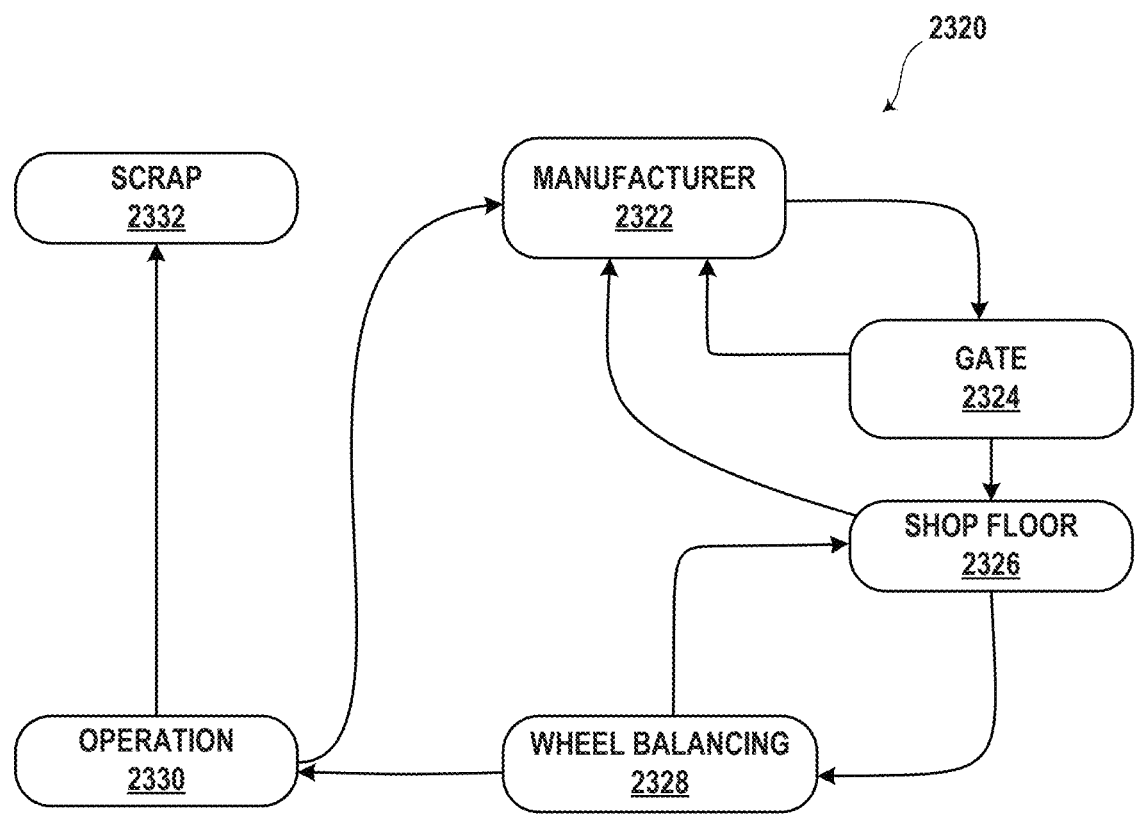
FIG. 23 illustrates a state diagram, according to an example embodiment.

FIG. 23 illustrates state diagram 2320, according to an example embodiment. In particular, state diagram 2320 conceptually demonstrates how abrasive wheel 1800 may move between various operative states during the course of its lifespan. As used herein, operative state may refer to a current location or function being performed by or on abrasive wheel 1800. Some operative states may be visited zero times or more than one time. Also, some operative states may have more than one possible next state, thus representing a decision to be made based information within on tag 1810. Note that upon entering a new state within state diagram 2320, tag 1810 may be "tagged" to reflect this new state of abrasive wheel 1800.

Abrasive wheel 1800 may start in manufacturer state 2322, which may represent a physical environment associated with remote network 2110. Here, abrasive wheel 1800 may be constructed and coupled with tag 1810.

From manufacturer state 2322, abrasive wheel 1800 may move to gate state 2324, which may represent the arrival of abrasive wheel 1800 to a physical environment associated with client network 2120. At gate state 2324, one or more readers, such as reader 2222, may be utilized to communicate and obtain information from tag 1810 regarding the unique identifier of abrasive wheel 1800 and/or the order number associated with abrasive wheel 1800. If the unique identifier and order number match the records of client network 2120 (e.g., client network 2120 has records that they actually purchased abrasive wheel 1800 from remote network 2310), abrasive wheel 1800 may continue to shop floor state 2326. In some examples, abrasive wheel 1800 may be untagged from gate state 2324 and returned to manufacturer state 2322.

Shop floor state 2326 may represent the arrival of abrasive wheel 1800 to a grinding environment associated with client network 2120. Once in shop floor state 2326, one or more readers, such as reader 2222, may be utilized to communication and obtain information from tag 1810 regarding the dimensions and appropriate operating speeds of abrasive wheel 1800. If the dimensions and appropriate operating speeds match records of client network 2120 (e.g., client network 2120 determines that the dimension and appropriate operating speeds of abrasive wheel 1800 match the acceptable parameters of at least one abrasive device operating within the grinding environment associated with client network 2120), abrasive wheel 1800 may continue to wheel balancing state 2328. Otherwise, abrasive wheel 1800 may be untagged from shop floor state 2326 and return to manufacturer state 2322.

At wheel balancing state 2328, abrasive wheel 1800 may be inspected for imbalance issues that could potentially harm abrasive device operators/damage workpieces. If the imbalance issues exceed a predefined tolerance level, abrasive wheel 1800 may be untagged from wheel balancing state 2328 and sent back to shop floor state 2326 for repairs. Otherwise, abrasive wheel 1800 may continue to operation state 2330.

At operation state 2330, abrasive wheel 1800 may be attached to an abrasive device, for example a manual abrasive device 1310 or an automated abrasive device 1330, to perform abrasive operations. During operation state 2330, tag 1810 may be updated to reflect how many workpieces the abrasive wheel 1800 has operated on, how long the abrasive wheel 1800 is being used, and so on. After abrasive wheel 1800 starts to show deterioration, one or more readers may be utilized to communicate with and obtain information from tag 1810 regarding the expiration date and manufacturing date of abrasive wheel 1800. In some embodiments, if abrasive wheel 1800 is near its end of life, abrasive wheel 1800 may be untagged from operation state 2330 may enter a scrap state 2332, which may signify an end of life state for abrasive wheel 1800. In other examples, abrasive wheel 1800 may be untagged from operation state 2330 and enter manufacturer state 2322 for repairs.

XII. Example Mobile Devices

Figure 24A:
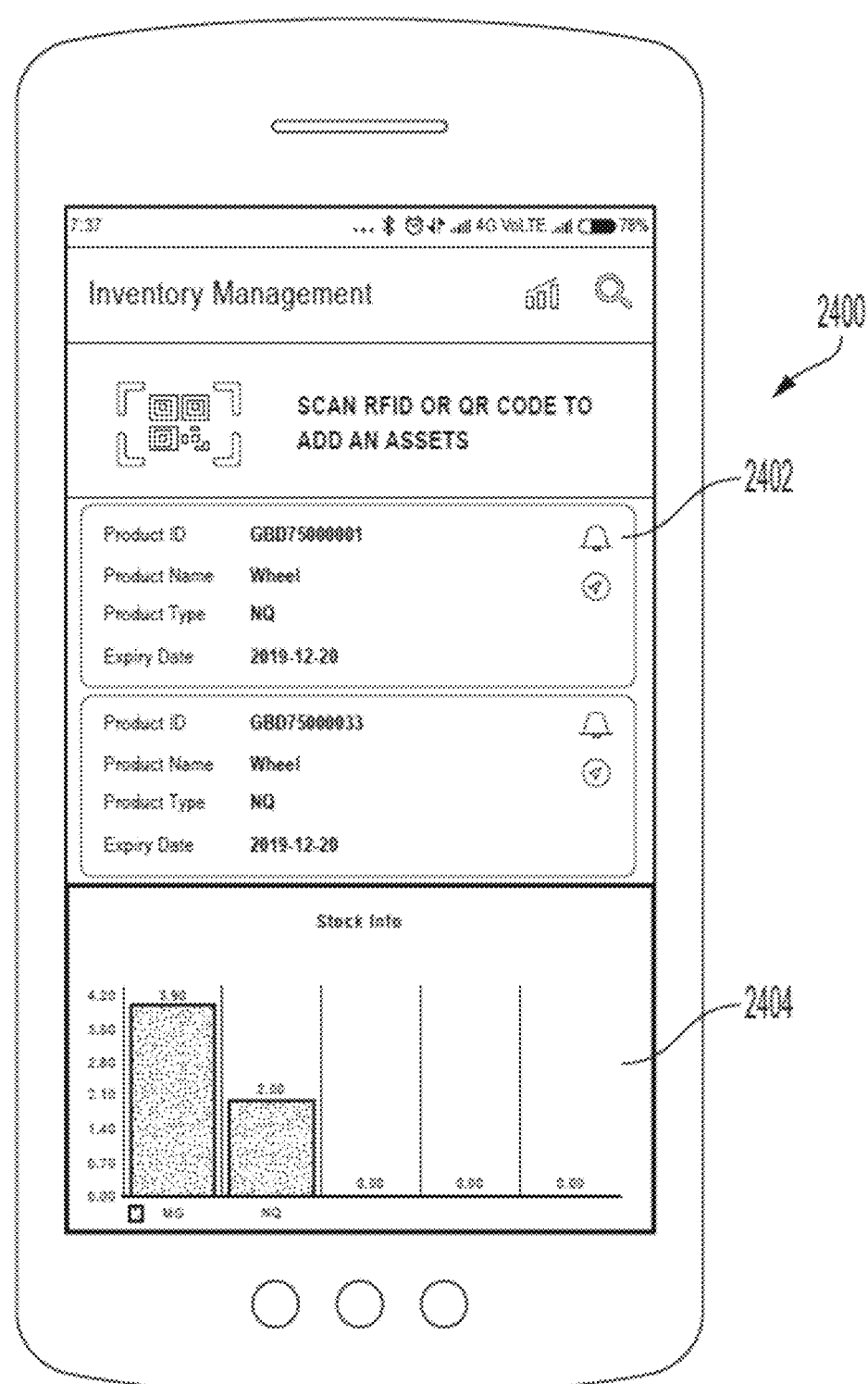
FIGS. 24A-24C illustrate views of a mobile device, according to an example embodiment.

FIG. 24A illustrates a view of mobile device 2400, according to example embodiments. In examples, mobile device 2400 can be configured with authentication mechanisms, which may include a passcode, two-factor authentication, fingerprint identification, facial recognition, or verification of other biometric information. Such authentication mechanisms may provide varying levels or types of user access. For examples, the levels of user access may include levels of access for users from client network 2120, administrators from client network 2120, and/or non-administrators from client network 2120. Based on the present user's level of access, the mobile device 2400 may display a different arrangement of information, provide access to different types of information, and/or offer varying functionality.

Information on mobile device 2400 may include maintenance information, information related to the state of client network 2120 (e.g., the number of abrasive wheels available, the service-life of abrasive wheels, etc.), and so on. As noted above, mobile device 2400 may also contain selectable options to perform actions. As examples, the actions could include reviewing product information 2402 and/or reviewing current stock information 2404. It will be understood that mobile device 2400 could include a smartphone, tablet, laptop computer, or another type of computing device. Yet further, mobile device 2400 could include, for example, a head-mountable display (HMD), a heads-up display (HUD), or another type of portable computing device with or without a user interface.

Such embodiments may provide an easier way for customers to reorder abrasive products. In such scenarios, upon receiving information of an impending end-of-useful life of a given abrasive product, the mobile device 2400 could provide a notification of such information to a user. Additionally, or alternatively, the mobile device 2400 could be configured to display a product catalog and/or products that may functionally replace the abrasive product that is reaching the end of its useful life. Accordingly, in such examples, a user could interact with the mobile device 2400 to request a given abrasive article, a quantity, shipping type, desired delivery date, etc. The mobile device 240 could forward the request to the client network 2120 and/or the remote network 2110. Such a system and method could reduce manual ordering efforts and/or paper work, which may be more environmentally-friendly. Reorder requests made via mobile device 2400 could be authorized by a user with appropriate permissions (e.g., administrator, manager, and/or sales personnel).

Figure 24B:
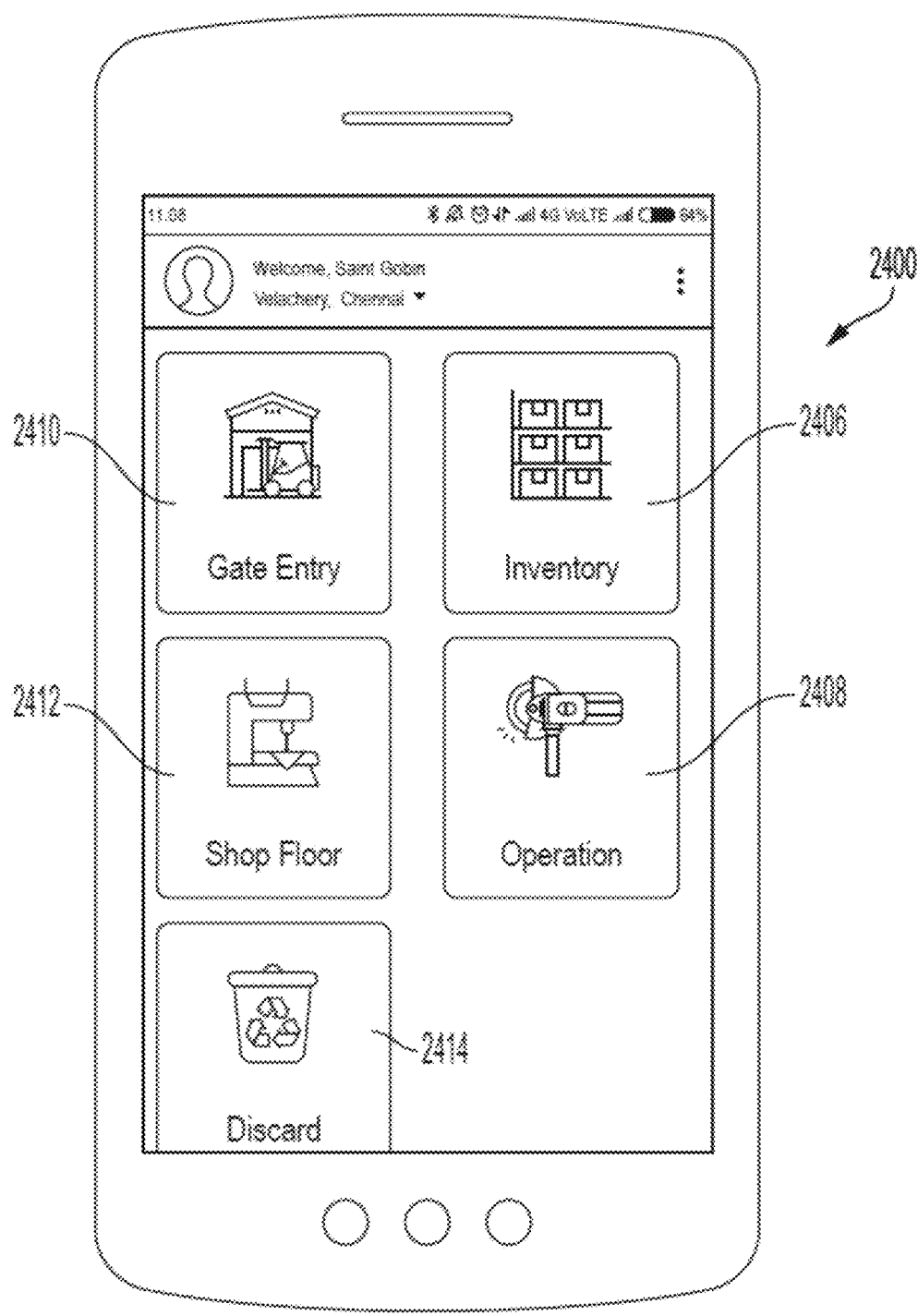

FIG. 24B illustrates a second view of mobile device 2400, according to example embodiments. In particular, FIG. 24B illustrates how mobile device 2400 may include multiple navigation menus to assist users in performing various functions. For example, inventory menu 2406 may provide an interface that displays information regarding all abrasive wheels that have been purchased by a particular user. Operation menu 2408 may provide an interface that displays data about the operations of abrasive wheels, perhaps displaying data collected by sensor(s) 1810A. Gate entry 2410 may provide an interface enables users interact with tags coupled to abrasive wheels, perhaps by enabling a reader embedded onto mobile device 2400 or communicatively connected to mobile device 2400. Shop floor menu 2412 may provide an interface that displays information regarding which abrasive wheels are currently within in a shop floor state or operation state, as previously discussed in connection with state diagram 2320. Discard menu 2414 may provide an interface that allows users to untag an abrasive wheel, perhaps in connection with scrap state 2332 in state diagram 2320. Notably, other navigation menus are also possible.

Figure 24C:
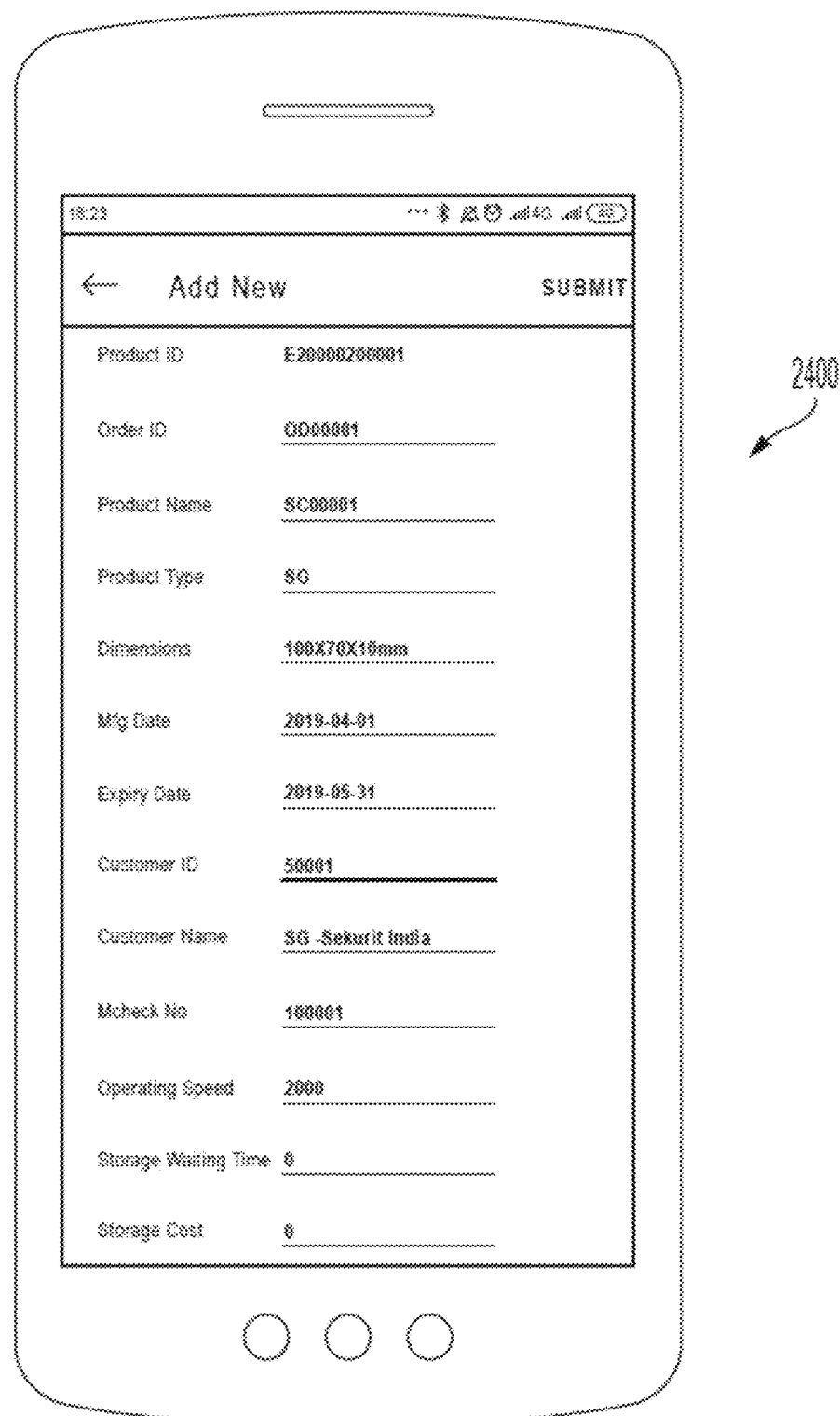

FIG. 24C illustrates a third view of mobile device 2400, according to example embodiments. In particular, FIG. 24C illustrates several, non-limiting examples of information items that may ascertained with respect to a particular abrasive wheel. For example, FIG. 24C illustrates that information regarding an abrasive wheel's product ID, order ID, product name, product type, dimensions, manufacturing date, expiration date, customer ID, customer name, operating speed, inventory time, inventory storage costs, storage wait time, and storage costs can be ascertained. Notably, other information items (e.g., GPS location of the abrasive wheel) are also possible.

XIII. Example Web Applications and Data Models

As described above, a web application may be configured to display information about remote sensors, wearable devices, abrasive devices, abrasive device operators, and so on. This may be accomplished by way of a web page or series of web pages hosted by a cloud computing device and provided to users upon request. The layout and compilation of information in these web pages may enable efficient review of pertinent information about the remote sensors, wearable devices, abrasive devices, abrasive device operators, and so on. Additionally, the web pages may organize and arrange the information using graphics with intuitive visuals and easy to understand metrics.

As an additional feature, the web application may allow users to make associations between abrasive devices, wearable devices, abrasive device operators, and plants (e.g., an environment in which abrasive operations are being performed). For example, a user may associate plant P1 with abrasive device AT1 to indicate that abrasive device AT1 is operating within plant P1. The user may then associate abrasive device AT1 with wearable device WD2 to indicate that the data collected by wearable device WD2 is with respect to the operations of abrasive device AT1. Finally, the user may associate wearable device WD1 with operator O1 to indicate that operator O1 is wearing wearable device WD1. In this way, abrasive devices, wearable devices, abrasive device operators, and plants become distinct logical entities on the web application which can be mixed in matched with each other.

Having distinct logical entities may have numerous benefits. For example, suppose that wearable device WD1 was permanently associated with operator O1. If operator O1 suddenly became unavailable, then no data could be collected from wearable device WD1 during the unavailability. On the other hand, suppose that wearable device WD1 was a distinct logical entity from operator O1. If operator O1 became unavailable, then wearable device WD1 could quickly be associated with operator O3 and data could still be collected for wearable device WD1. Advantageously, data can be collected from wearable device WD1 regardless of operator O1 or operator O3. Other advantages are also possible.

Figure 25:
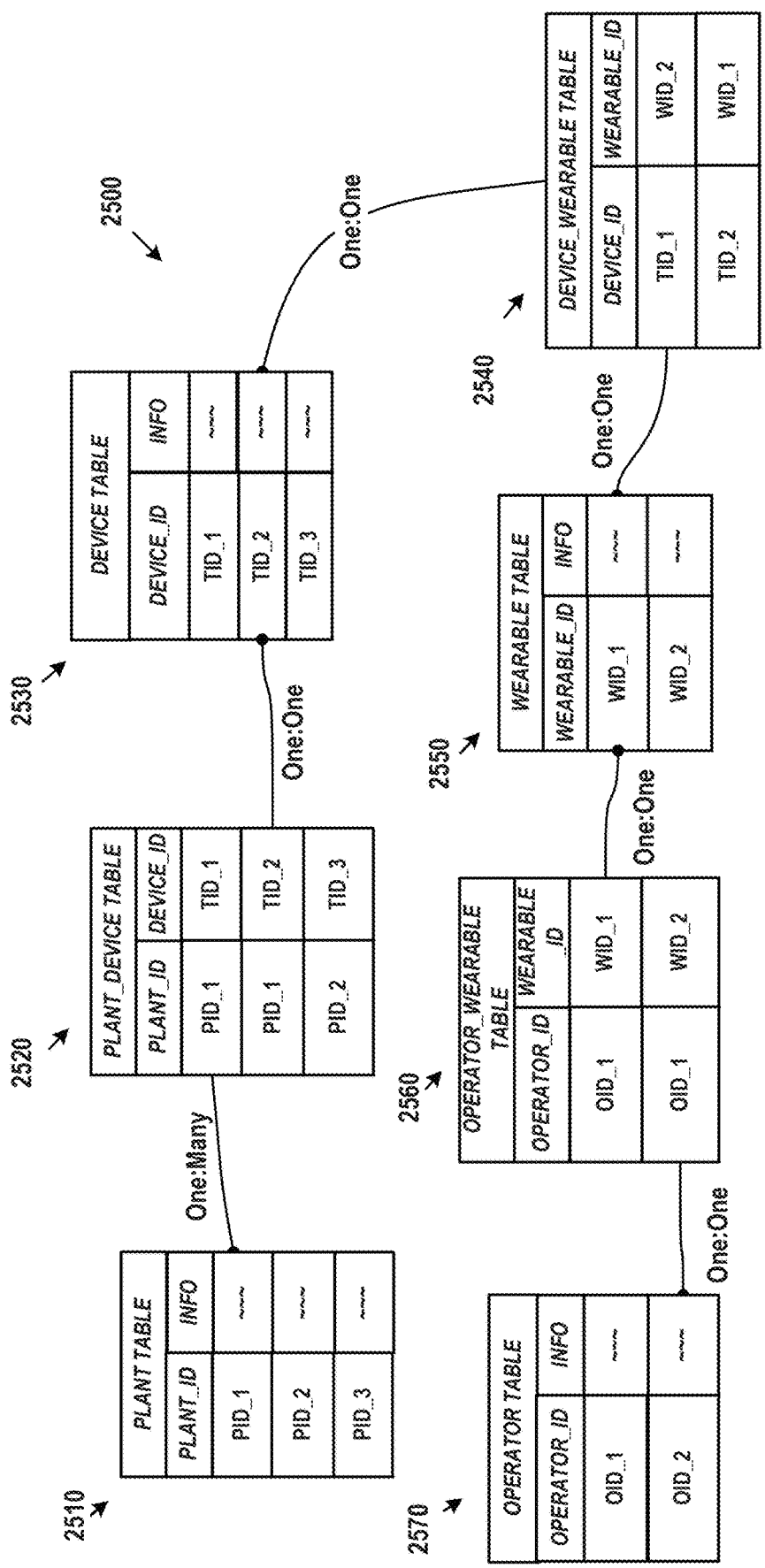
FIG. 25 illustrates a model, according to an example embodiment.

FIG. 25 illustrates model 2500, in accordance with example embodiments. Model 2500 may include four base tables—plant table 2510, device table 2530, wearable table 2550, and operator table 2550—and three linking tables—plant device table 2520, device wearable table 2540, and operator wearable table 2560. As a unit, these tables provide the necessary information to capture the relationships between plants, abrasive devices, wearable devices, and operators. In some examples, model 2500 can have more, fewer, and/or different types of tables than indicated in FIG. 25. Moreover, the tables in model 2500 may be abridged for the purposes of clarity. But in practice, these tables may contain more, fewer, and/or different entries.

Plant table 2510 can include entries for plants. In particular, each entry in plant table 2510 may have a unique identifier for a plant and associated information for the plant. In some examples, a user may input, for example through a web page or series of web pages provided by a cloud computing device, the information to populate plant table 2510.

Plant device table 2520 can include entries that map a given plant from plant table 2510 to an abrasive device from device table 2530 that operates in the given plant. In particular, the web application described above may provide means for dynamically populating the entries in plant devices table 2520. For example, the web application may provide a series of dropdown menus to allow users to make associations between plants and abrasive devices that operate within those plants.

Device table 2530 can include entries for abrasive devices, such as manual abrasive device 1310. In particular, each entry in device table 2530 may have a unique identifier for an abrasive device and associated information for the abrasive device. In some examples, a user may input, for example through a web page or series of web pages provided by a cloud computing device, the information to populate device table 2530. In other examples, the information in device table 2530 can be populated from the remote sensors and/or wearable devices as described above.

Device wearable table 2540 can include entries that map an abrasive device from device table 2530 to a wearable from wearable table 2550 that collects data associated with that abrasive device. In particular, the web application described above may provide means for dynamically populating the entries in device wearable table 2540. For example, the web application may provide a series of dropdown menus to allow users to make associations between abrasive devices and wearable devices. In some cases, entries in device wearable table 2540 can be automatically populated through the readers as described above. For example, an abrasive device may include an RFID tag, such as identifying feature 1314, and a wearable device may include an RFID reader that can read the RFID tag of the abrasive device to associate the wearable device with the abrasive device.

Wearable table 2550 can include entries for wearable devices, such as wearable device 1320. In particular, each entry in wearable table 2550 may have a unique identifier for a wearable device and associated information for the wearable device. In some examples, a user may input, for example through a web page or series of web pages provided by a cloud computing device, the information to populate wearable table 2550. In other examples, the information in wearable table 2550 can be populated from the remote sensors as described above.

Operator wearable table 2560 can include entries that map a wearable device from wearable table 2550 to an operator from operator table 2570 that wears the wearable device. In particular, the web application described above may provide means for dynamically populating the entries in operator wearable table 2560. For example, the web application may provide a series of dropdown menus to allow users to make associations between wearable devices and operators. In some cases, entries in operator wearable table 2560 can be automatically populated through the readers as described above. For example, a wearable device may include an RFID tag and an operator may have an RFID reader that can read the RFID tag of the wearable device to associate the wearable device with the operator.

Operator table 2570 can include entries for operators that wear wearable devices. In particular, each entry in operator table 2570 may have a unique identifier for an operator and associated information for the operator. In some examples, a user may input, for example through a web page or series of web pages provided by a cloud computing device, the information to populate operator table 2570.

Taken together, the tables of model 2500 provide information to establish (i) which operators are associated with which wearable devices, (ii) which wearable deices are associated with which abrasive devices, and (iii) which abrasive devices are associated with which plants. In some cases, a web application can use this information to provide metrics related to plants, wearable devices, abrasive devices, and operators.

Figure 26:
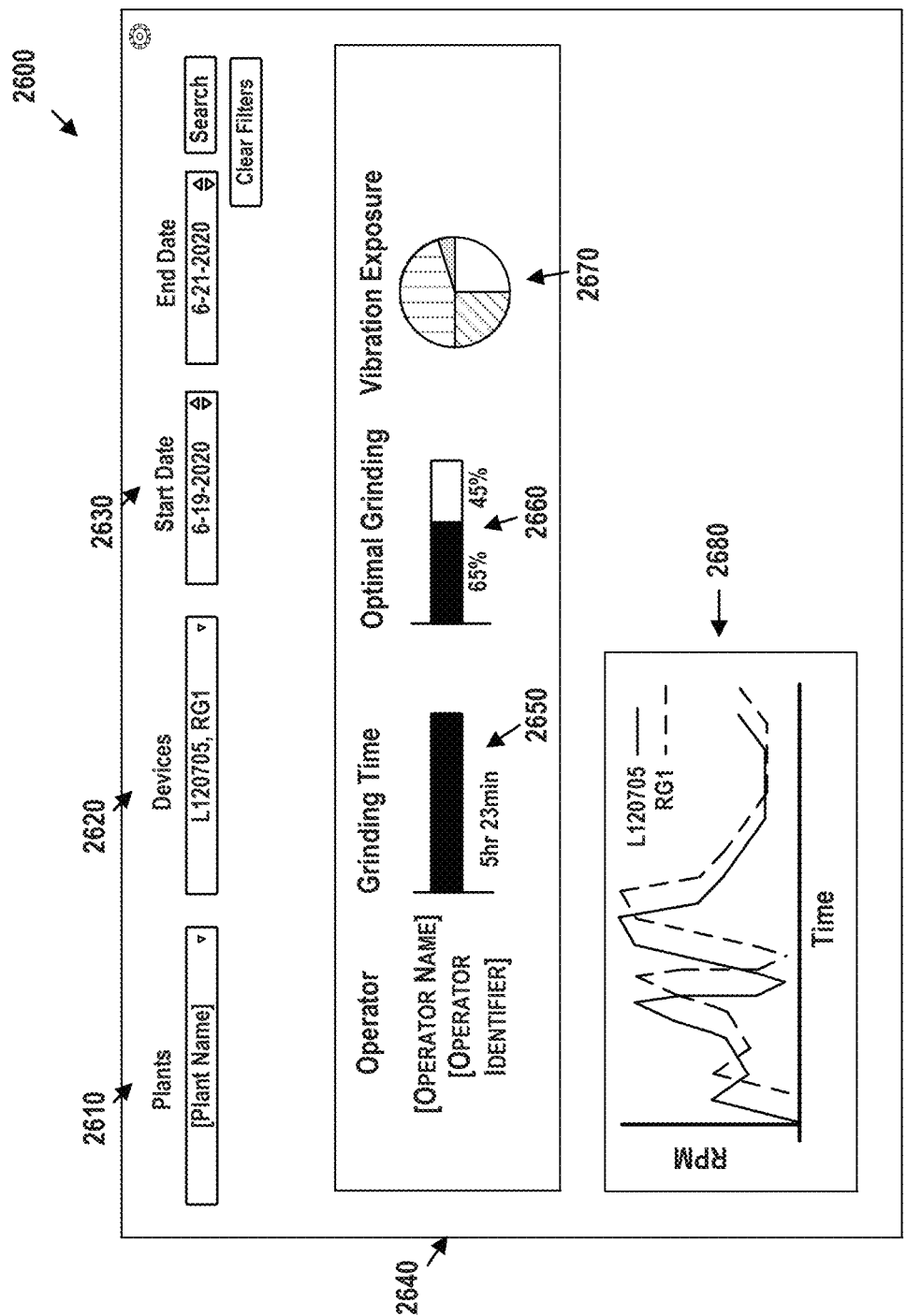
FIG. 26 illustrates a view of a web application, according to an example embodiment.

FIG. 26 illustrates web page 2600, in accordance with example embodiments. Web page 2600 may be provided to a user by the web application described above. In particular, web page 2600 provides metrics related to plants, wearable devices, abrasive devices, and operators.

As shown in FIG. 26, plant dropdown 2610 allows a user to indicate a plant from a plurality of plants for which they want to receive metrics on. Devices dropdown 2620 allows a user to select one or more devices for which they want to receive metrics on. The devices available in devices dropdown 2620 may be based on the user's selection on plant dropdown 2610 and on the entries in plant device table 2520. Date range 2630 allows a user to select the date range for which they want to receive metrics on. After making selections for plant dropdown 2610, devices dropdown 2620, and date range 2630, the user can continue by pressing "Search". This action may display one or more entries corresponding to the information in the plant dropdown 2610, devices dropdown 2620, and the date range 2630 (e.g., entry 2640).

Entry 2640 includes metrics related a particular operator using a device selected from device dropdown 2620, within a plant selected from plant dropdown 2610, and during the time range selected from date range 2630. The particular operator may be determined based on entries in operator wearable table 2560, wearable table 2550, and device wearable table 2540. Entry 2640 shows grind time metric 2650, optimal grinding metric 2660, and vibration exposure metric 2670 for the particular operator.

Grind time metric 2650 displays a bar graph of total grinding time of the particular operator during the date range 2630. In particular, grind time metric 2650 may be determined using the embodiments with respect to graph 2900 and graph 3000, as further described below.

Optimal grinding metric 2660 displays a bar graph of time spent by the particular operator while grinding within the optimal grinding parameters. In particular, optimal grinding metric 2660 may be determined using the embodiments described with respect to graph 2900 and graph 3000. While optimal grinding metric 2660 is illustrated as a bar graph, it will be understood that an amount of time or percentage or ratio of such time while grinding within optimal grinding parameters could be represented and/or displayed in a variety of different forms. For example, the optimal grinding metric 2660 could be represented as a pie chart, a radar chart, a line graph, or another type of information representation or infographic.

Vibration exposure metric 2670 displays a pie chart of vibration exposure time for the particular operator in three categories. In particular, vibration exposure metric 2670 may be determined using the embodiments described with respect to graph 2900 and graph 3000. While the vibration exposure metric 2670 is illustrated as a pie chart, it will be understood that an amount of time under respective vibration exposure conditions could be represented and/or displayed in a variety of different forms. For example, the vibration exposure metric 2670 could be represented as a bar graph, a radar chart, a line graph, or another type of information representation or infographic.

RPM graph 2680 is a plot indicating RPM levels of the devices specified in devices dropdown 2620. The x-axis of RPM graph 2680 corresponds to time values, while the y-axis of RPM graph 2680 corresponds to RPM values.

It will be understood that web page 2600 is presented for the purpose of example. In other embodiments, web page 2600 may provide other types of metrics and alternative methods of displaying such metrics.

Figure 27:
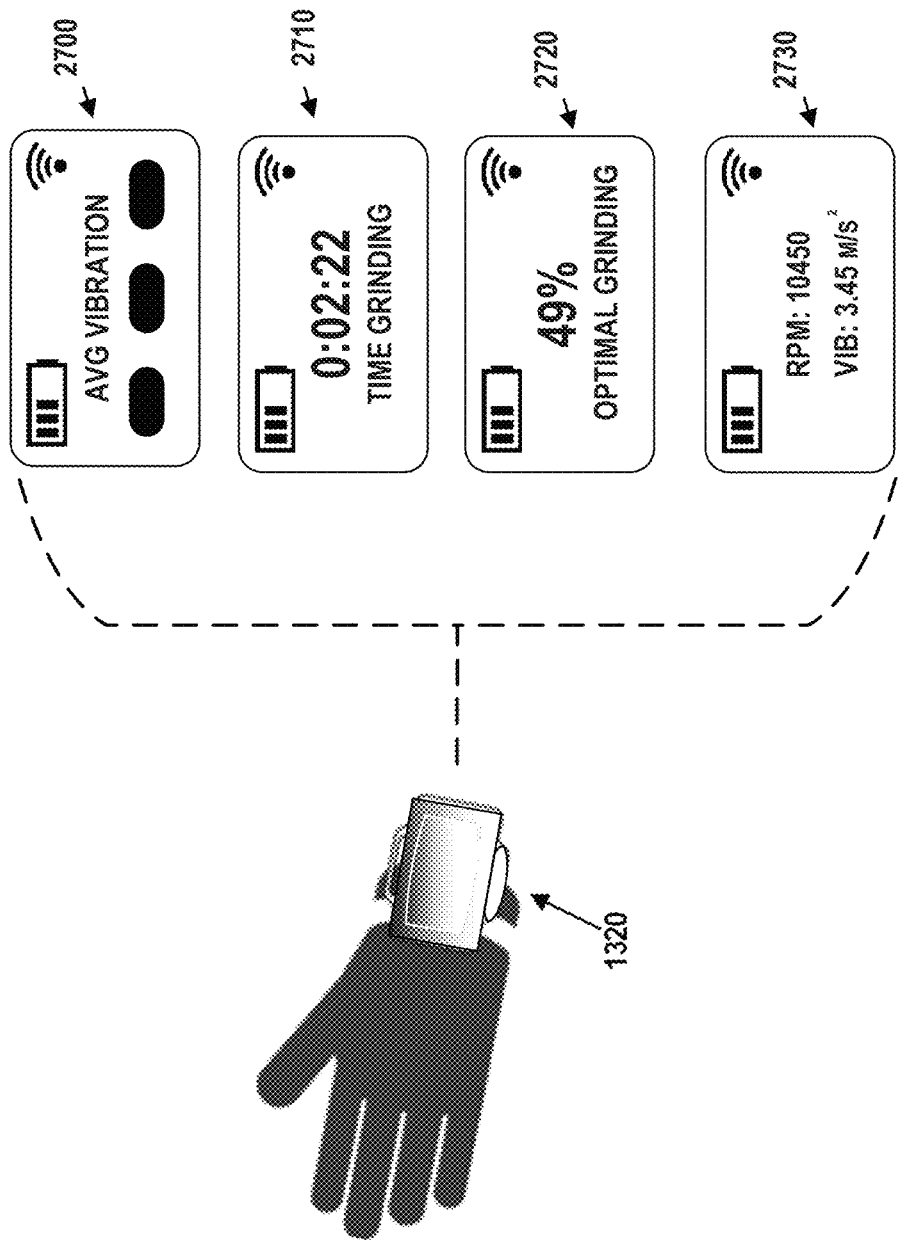
FIG. 27 illustrates several displays of a wearable device, according to an example embodiment.

FIG. 27 illustrates displays 2700, 2710, 2720, and 2730 of wearable device 1320, according to example embodiments. In particular, the displays shown in FIG. 27 illustrate different views that may appear on a user interface component of wearable device 1320. However, note that the displays shown in FIG. 27 are not limiting; other displays are contemplated and possible within the scope of the present disclosure.

Display 2700 provides visual cues about the average vibration of wearable device 1320, the battery life (shown at the top left), the current time (shown at the top middle), and whether a WiFi signal is present on wearable device 1320 (shown at the top right).

Figure 29:
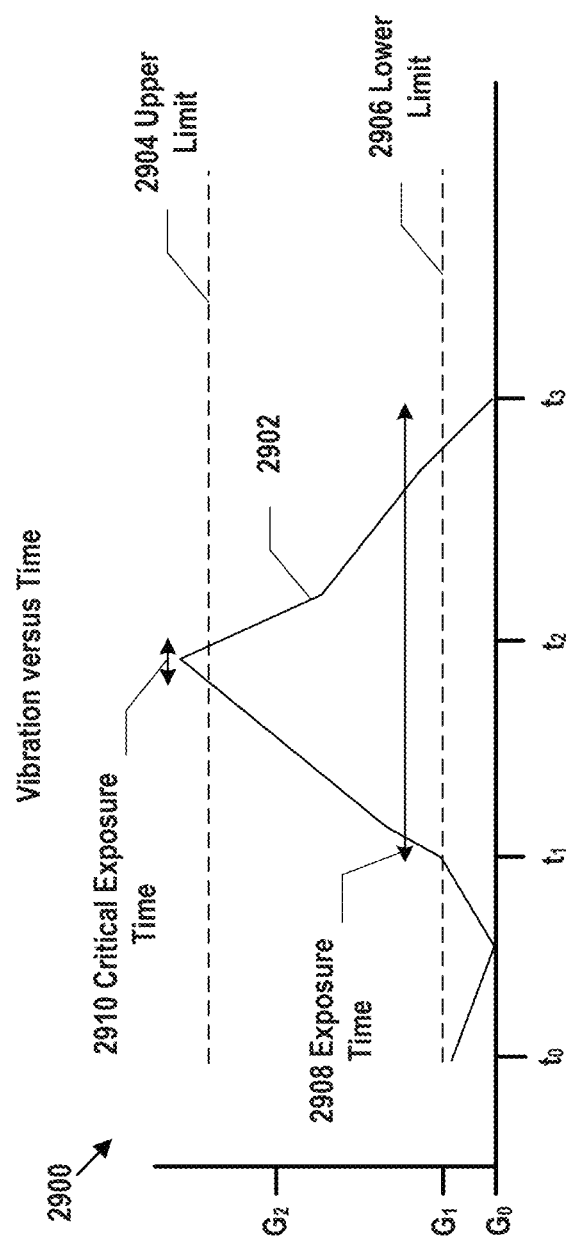
FIG. 29 illustrates a graph, according to an example embodiment.
Figure 30:
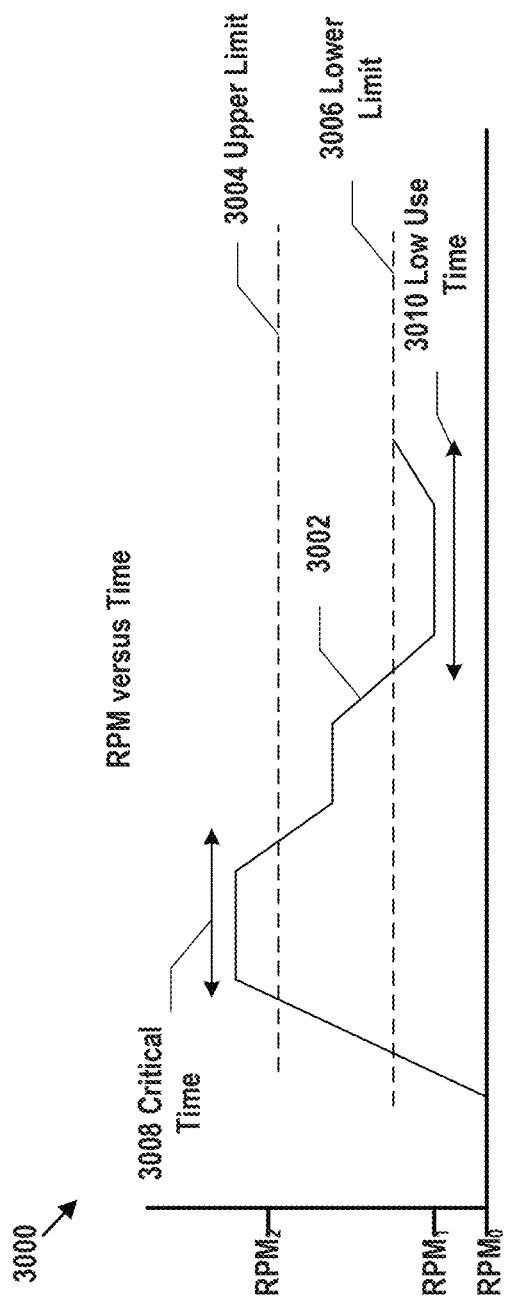
FIG. 30 illustrates a graph, according to an example embodiment.

Display 2710 also depicts the battery life, current time, and WiFi signal of wearable device 1320, but additionally shows a time of grinding metric, which may be calculated, for example, using the graph 2900 and graph 3000 discussed in FIGS. 29 and 30.

Display 2720 also depicts the battery life, current time, and WiFi signal of wearable device 1320, but additionally shows an optimal grinding time metric, which may be calculated, for example, using the using the graph 2900 and graph 3000 discussed in FIGS. 29 and 30.

Display 2730 also depicts the battery life, current time, and WiFi signal of wearable device 1320, but additionally shows an instantaneous view of current RPM and vibration as the operator is performing abrasive operations.

XIV. Example Analytics Dashboards

In line with the discussion above, analytics platform 1118 may be configured to display metrics associated with one or more abrasive products and/or one or more workpieces in enterprise 1120. For example, analytics platform 1118 could display technically oriented metrics (e.g., the surface quality of a workpiece, abrasive device/tools that are near end of life, etc.), financially oriented metrics (e.g., estimated costs per abrasive tool, estimated shop floor efficiency, estimated throughput levels, etc.), and/or other types of metrics.

Analytics platform 1118 may display such metrics by way of a GUI containing one or more panes. As described herein, the term "pane" may refer to a GUI component that contains one or more locations in which to display information, and/or one or more user-selectable items such as buttons or tabs. In some embodiments, a pane may be equivalent to, or contained within, a page or a GUI window, though such a window may contain multiple panes. Buttons and/or tabs may be graphical control elements that display additional information within the pane.

Example panes are illustrated below in FIGS. 28A, 28B, and 28C. These example panes organize and arrange information using graphics with intuitive visuals and easy to understand diagrams. As a result, a user of analytics platform 1118 can quickly and efficiently review pertinent information about abrasive operations occurring at enterprise 1120. Notably, the examples of panes below are merely for purposes of illustration and not intended to be limiting. Other panes including alternative arrangements of information may exist.

Figure 28A:
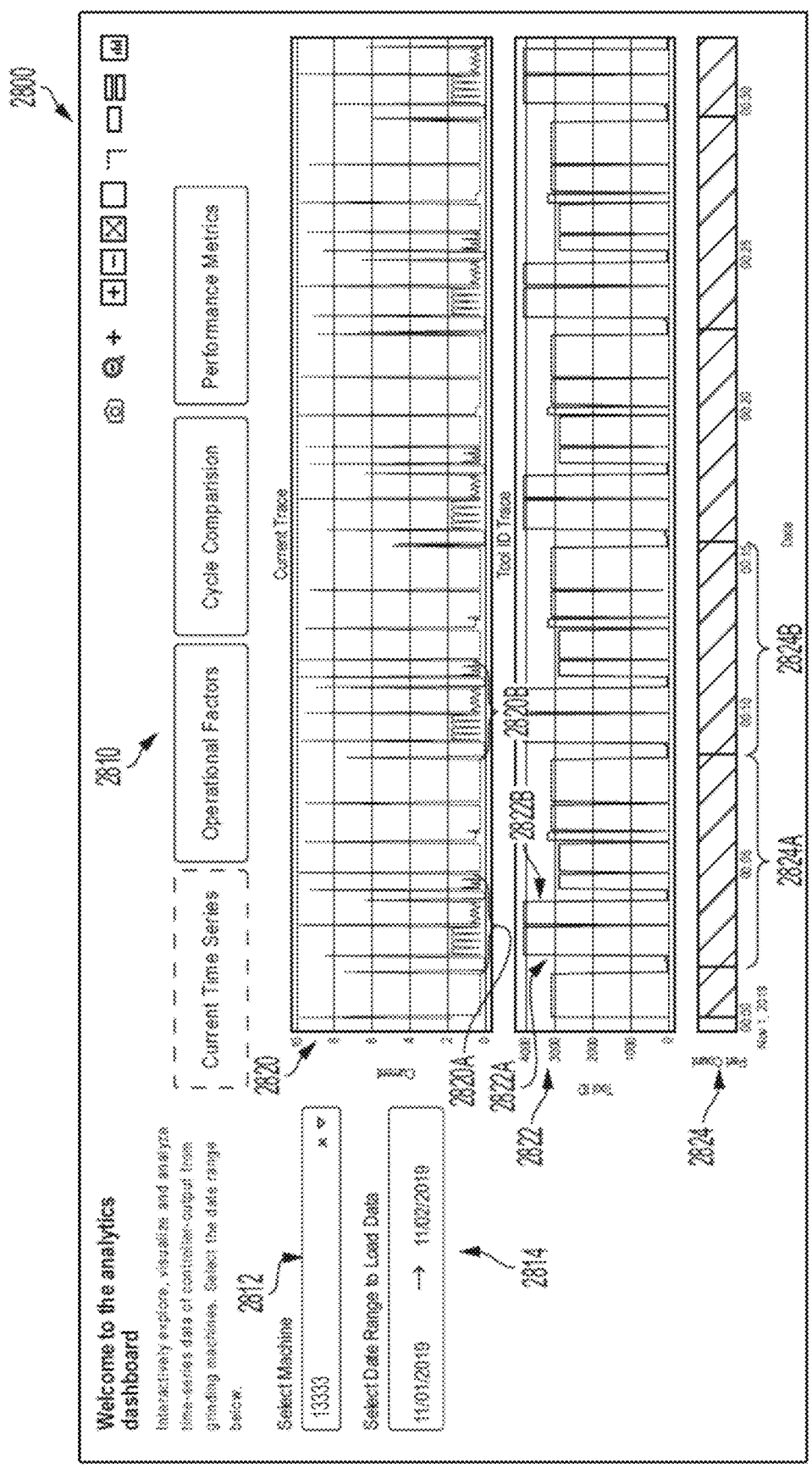
FIGS. 28A-28C illustrate panes of an analytics platform, according to an example embodiment.

FIG. 28A depicts current time series pane 2810, in accordance with example embodiments. Current time series pane 2810 includes machine dropdown 2812, date range 2814, current trace graph 2820, tool ID graph 2822, and part count graph 2824. Current time series pane 2810 also includes navigation bar 2810, which includes tabs for "Current Time Series", "Operational Factors", "Cycle Comparisons", and "Performance Metrics". Notably, the tab for "Current Time Series" is shown in a dashed line to indicate that this tab's information is currently displayed.

Machine dropdown 2812 allows a user to select one or more abrasive devices for which they want to receive metrics on. The devices available in machine dropdown 2812 may include all devices operating in (or that have operated in) enterprise 1120. In the example shown in FIG. 28A, the abrasive device "13333" has been selected.

Date range 2814 allows a user to select the date range for which they want to receive metrics on. In the example shown in FIG. 28A, the date range is from "11/01/2019" to "11/02/2019".

After selections for machine dropdown 2812 and date range 2814 have been made, current time series pane 2810 may responsively display metrics related to the selection in trace graph 2820, tool ID graph 2822, and part count graph 2824.

Trace graph 2820 is a plot depicting the current experienced by abrasive device "13333" over time. The x-axis of trace graph 2820 corresponds to time values, while the y-axis corresponds to current values (in amperes). As shown, the current for abrasive device "13333" varies over time. At some periods of time, the current is high. These could correspond to periods of time that abrasive device "13333" is performing an abrasive operation. At other periods of time, the current is low. These could correspond to periods of time that abrasive device "13333" is not performing an abrasive operation. Further, trace graph 2820 shows many repeating patterns. For example, pattern 2820A is similar to pattern 2820B. These repeating patterns could correspond to periods of time that abrasive device "13333" is performing similar abrasive operations.

In line with the discussion above, in some embodiments, analytics platform 1118 may be configured to allow an operator to tag various traces in trace graph 2820. For example, an operational status of "grinding" may be assigned to traces in trace graph 2820 with large peaks. As another example, an operational status of "idle" may be assigned to traces in trace graph 2820 with a stable slope. The tags may be utilized as labels or additional training features for training one or more machine learning models, as previously described herein.

Tool ID graph 2822 is a plot depicting the abrasive tool (e.g., abrasive wheel) used by abrasive device "13333" over time. The x-axis of tool ID graph 2822 corresponds to time values, while the y-axis corresponds to abrasive tool ID values. As shown, the abrasive tool used by abrasive device "13333" varies over time. For example, during the time period corresponding to pattern 2820A, abrasive device "13333" uses both abrasive tool 2822A and abrasive tool 2822B.

Part count graph 2824 is a plot depicting the workpiece being operated on by abrasive device "13333" over time. The x-axis of part count graph 2824 corresponds to time values, while the y-axis corresponds to workpiece ID values. As shown, the workpiece being operated on by abrasive device "13333" varies over time. For example, during the time period corresponding to pattern 2820A, abrasive device "13333" was operating on workpiece 2824A, whereas during the time period corresponding to pattern 2820B, abrasive device "13333" was operating on workpiece 2824B.

In example embodiments, trace graph 2820, tool ID graph 2822, and part count graph 2824 could be utilized to understand the effects of modifications an abrasive operation. For example, pattern 2820A may correspond to a time period before a modification to an abrasive operation and pattern 2820B may correspond to a time period after the modification. If pattern 2820A and pattern 2820B exhibit similar traces in trace graph 2820, then it may be determined that the modification did not have any substantial effect on the abrasive operation. On the other hand, if pattern 2820A and pattern 2820B exhibit difference traces in trace graph 2820, then it may be determined that the modification did have a substantial effect. Example modifications to an abrasive operation may include changing operators, changing operating speeds, and so on.

In some embodiments, an operator of an abrasive device can utilize trace graph 2820, tool ID graph 2822, and part count graph 2824 to make real time adjustments to an abrasive operation. For example, if it determined that every time abrasive device "13333" is using abrasive tool 2822A, the current value for abrasive device "13333" on trace graph 2820 increases, that may indicate that abrasive tool 2822A is dulling (e.g., requires more energy to operate at a same speed). Accordingly, an operator may perform a dressing processes on abrasive tool 2822A to get it sharpened and back into operational condition. As another example, if the current value for abrasive device "13333" on trace graph 2820 exceeds a preset upper limit, then the operator may shut down abrasive device "13333". Other examples are also possible.

In some embodiments, trace graph 2820, tool ID graph 2822, and part count graph 2824 could be utilized to understand the economic metrics related an abrasive operation. For example, if it is determined that time it takes to grind workpiece 2824A with abrasive tool 2822A is less than the time it takes to grind workpiece 2824A with abrasive tool 2822B, then it could be economically advantageous to order more of abrasive tool 2822A rather than abrasive tool 2822B, as using abrasive tool 2822A would reduce overall grind cycle time. Other examples of economic metrics are also possible.

Figure 28B:
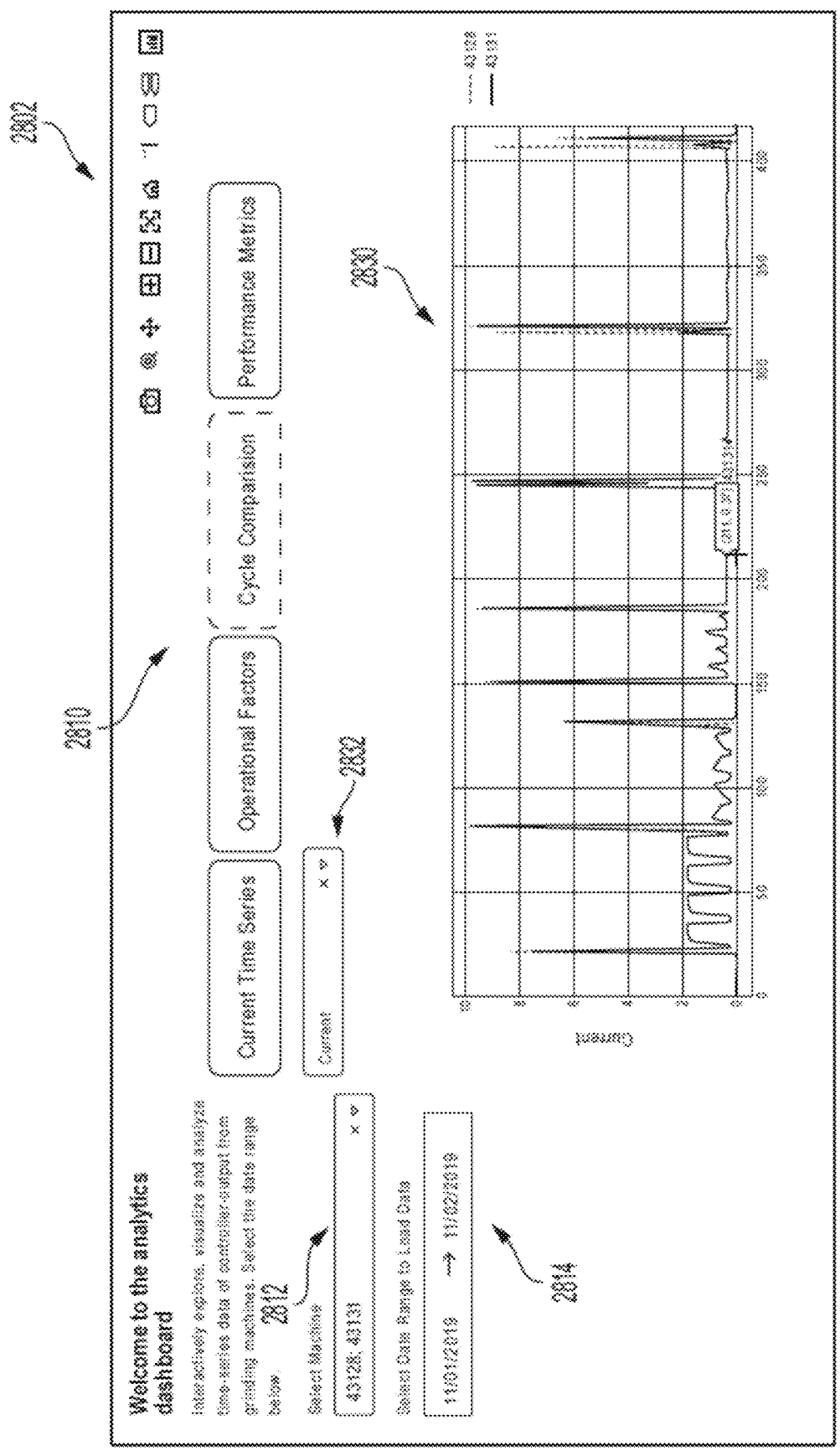

FIG. 28B depicts cycle comparisons pane 2802, in accordance with example embodiments. Like current time series pane 2800, cycle comparisons pane 2802 includes machine dropdown 2812 and date range 2814. However, unlike current time series pane 2800, cycle comparisons pane 2802 includes cycle comparison graph 2830 and metric dropdown 2832. Cycle comparisons pane 2802 also contains navigation bar 2810, which includes tabs for "Current Time Series", "Operational Factors", "Cycle Comparisons", and "Performance Metrics". Notably, the tab for "Cycle Comparisons" is shown in a dashed line to indicate that this tab's information is currently displayed.

Cycle comparison graph 2830 includes a data plot displaying current usage for various abrasive devices over some period of time. The x-axis of cycle comparison graph 2830 corresponds to time values, while the y-axis corresponds to current values (in amperes). As shown in FIG. 28B, cycle comparison graph 2830 simultaneously plots the current usage for two abrasive devices: abrasive device "43128" (the orange colored plot) and abrasive device "43131" (the blue colored plot). Cycle comparison graph 2830 may be beneficial as it allows a user to concurrently view metrics associated with several abrasive devices on one data plot, thus enabling a visual comparison between the performances of those abrasive devices.

If a user decides to select an additional abrasive device from machine dropdown 2812, an additional plot of that additional abrasive device would be added to cycle comparison graph 2830. In theory, cycle comparison graph 2830 could include data plots for tens, if not hundreds of abrasive devices.

Metric dropdown 2832 may be a dropdown menu that allows a user to select an alternative metric to display on cycle comparison graph 2830. Example metrics could include current, vibration, feed rate, or RPM, among other possibilities. In example embodiments, cycle comparison graph 2830 may automatically update itself in response to a selection at metric dropdown 2832. For example instead of displaying current values in the y-axis of cycle comparison graph 2830, to the value selected via metric dropdown 2832 may be displayed on the y-axis.

Figure 28C:
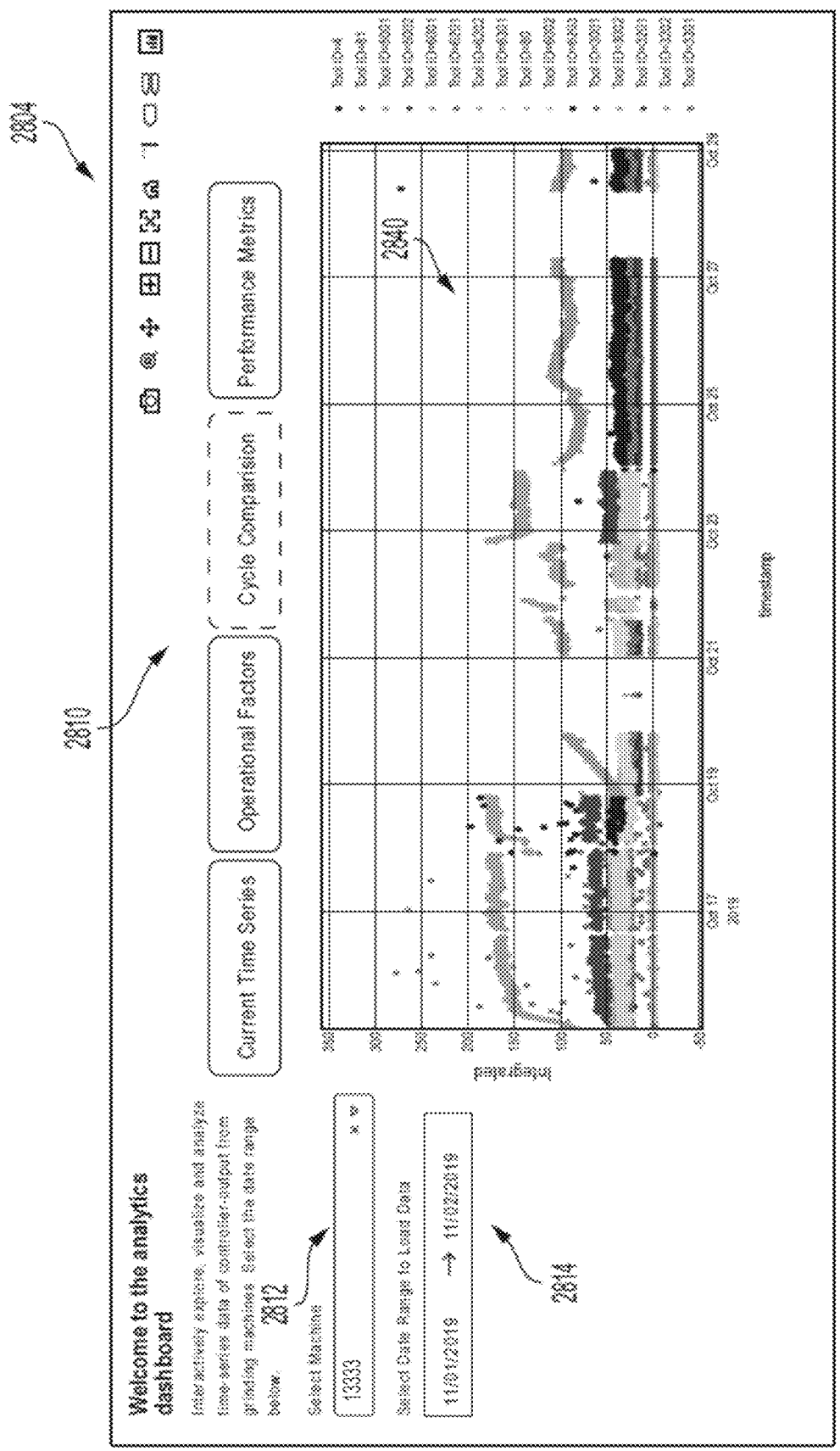

FIG. 28C depicts performance metrics pane 2804, in accordance with example embodiments. Like current time series pane 2800, performance metrics pane 2804 includes machine dropdown 2812 and date range 2814. However, unlike current time series pane 2800, performance metrics pane 2804 includes performance metrics graph 2840. Further, performance metrics pane 2804 contains navigation bar 2810, which includes tabs for "Current Time Series", "Operational Factors", "Cycle Comparisons", and "Performance Metrics". Notably, the tab for "Performance Metrics"

is shown in a dashed line to indicate that this tab's information is currently displayed.

Performance metrics graph 2840 may include various plots that track the integrated current of several abrasive tools over time. The x-axis of performance metrics graph 2840 corresponds to time values, while the y-axis corresponds to current values (in amperes). Similar to cycle comparison graph 2830, performance metrics graph 2840 may be beneficial as it allows a user to concurrently view metrics associated with several abrasive tools on one data plot, thus enabling a visual comparison between the performances of those abrasive tools.

XV. Example Systems and Methods for Calculation

As previously discussed, an abrasive product/tool can include sensors that detect an angular velocity (RPM) of a grinding wheel or disc. Wearable device 1320 can communicate with these sensors to receive RPM information and determine a grinding power and/or applied grinding force of the abrasive product/tool. Additionally and/or alternatively, wearable device 1320 may use sound data to determine the RPM of a grinding wheel or disc. In particular, wearable device 1320 may analyze an amplitude of the sound data and then use a correlation table to map the sound amplitude to an estimated RPM value. The mapping between the sound amplitude and the estimated RPM value may vary depending on the type of abrasive product/tool.

In either of the above scenarios, wearable device 1320 relies on communication with sensors or the type of abrasive product/tool (e.g., for the mapping) to determine RPM information. Yet it may be advantageous to decouple the reliance of wearable device 1320 from the abrasive product/tool. Doing so, for example, may allow wearable device 1320 to determine RPM for any grinding wheel or disc, independent of the how the abrasive product/tool is being held by the user of wearable device 1320, regardless of the type of abrasive product/tool being held, and regardless if any communication sensors are present on the abrasive product/tool.

To independently determine RPM, a vibration signal may be used. In particular, the vibration signal may be determined from an accelerometer of wearable device 1320. As noted above, the accelerometer collects acceleration data related to vibration of the user's hand. Because the hand's vibration results from the abrasive product/tool's vibration, the acceleration data indicates the vibration of the abrasive product/tool. The acceleration data may then be used to calculate a gRMS value over time, resulting in a vibration signal. Notably, the calculation of gRMS could be performed on wearable device 1320, on a remote device such as the aforementioned cloud computing devices, or partially on wearable device 1320 and partially on a remote device.

FIG. 29 illustrates graph 2900, according to an example embodiment. As illustrates in FIG. 29, graph 2900 includes signal 2902, which represents the vibration of wearable device 1320 over time. Namely, signal 2902 results from the vibration experienced by a user when wearing wearable device 1320 and using an abrasive product/tool. The x-axis of graph 2900 corresponds to time values, while the y-axis corresponds to vibration values (in gRMS).

An important point to recognize is that since the RPM of a grinding wheel or disc contributes to the signal 2902, a Fourier transformation (e.g., Fast Fourier transformation (FFT), short-time Fourier transform (STFT), etc.) can be performed on signal 2902 to determine the RPM value. For example, software embedded on wearable device 1320 can perform a Fourier transformation on signal 2902 from the time period between t0 and t3 to determine the RPM of the grinding wheel or disc from t0 to t3.

In some embodiments, the RPM of the grinding wheel of disc may vary over time. For example, a user can push a grinding wheel or disc harder into a workpiece (the friction of the workpiece thereby slowing the rotational speed), the power levels of the abrasive device/tool can change, and so on. To account for this, signal 2902 may be divided/sampled into shorter segments and then software embedded on wearable device 1320 can compute the Fourier transformations on each shorter segment. For example, a Fourier transformation on signal 2902 can be performed from the time period between t0 and t1, from a time period between t1 and t2, and so on. The RPM for each time segment may be plotted to determine a graph of RPM over time (as shown in FIG. 30).

In some embodiments, signal 2902 may be composed of multiple underlying frequencies and/or may have confounding/alias frequencies. To determine the exact frequency that corresponds to the RPM of the grinding wheel or disc, a frequency with the highest amplitude or a frequency with an amplitude within a predetermined range may be used. Alternatively, in scenarios in which signal 2902 is divided into shorter segments, the RPM for a given time segment may be determined based on a frequency with an amplitude that shows little deviation from a previous time segment. Other methods are also possible.

In some embodiments, signal 2902 represents the vibration of wearable device 1320 with respect to a given axis (e.g., the accelerometer may be operable to measure and record vibration data in three axes (x, y, and z)). In these situations, a vibration signal may be determined for each axis and an aggregate/composite vibration signal for the grinding wheel or disc may be determined by weighting/combining the individual vibration signals for each axis. In some examples, the weighting/combining may be based on an occupational safety standard, such as the ISO 5349 standard discussed herein. To illustrate, applying the ISO 5349 standard may involve combining the vibration signal from each axis by way of a root mean squared calculation, where each axis is weighted differently in the composite vibration signal. However, other occupational safety standards and their corresponding algorithms for determining the aggregate/composite vibration signals are also contemplated herein. Wearable device 1320 could be configured to carry out those algorithms additionally and/or alternatively to the ISO 5349 standard.

As discussed above, limits may be placed on the signal 2902. More specifically, upper limit 2904 and lower limit 2906 may be used to represent upper and lower limits of vibration, with the region between upper limit 2904 and lower limit 2906 being an "optimal zone" of vibration for the abrasive product/tool. In some embodiments, upper limit 2904 and lower limit 2906 may be determined by the manufacturer of wearable device 1320 or the manufacturer of the abrasive product/tool. In other embodiments, upper limit 2904 and lower limit 2906 may be based on an occupational safety standard, either enforced today or in the future. For example, upper limit 2904 and lower limit 2906 may be based on standards set by the Occupational Safety and Health Administration (OSHA), the National Institute for Occupational Safety and Health (NIOSH), the European Agency for Safety and Health at Work (EU-OSHA), or the International Organization for Standardization (ISO). In some cases, upper limit 2904 and lower limit 2906 may be based on the ISO 5349 exposure risks.

In some embodiments, upper limit 2904 and lower limit 2906 can be determined based on values installed into the firmware of wearable device 1320 upon manufacturing or user defined values that are dynamically loaded into the firmware of wearable device 1320. In examples, user defined values can be communicated to wearable device 1320 via a user interface component of wearable device 1320, can be communicated to wearable device 1320 via a web application, such as the web applications described below, or communicated to wearable device 1320 from a cloud computing device, such as the cloud computing devices described above. Other possibilities also exist.

Since keeping the vibration of the abrasive product/tool within the optimal zone can be valuable to the user, wearable device 1320 may determine deviations from the optimal zone. For example, wearable device 1320 may determine exposure time 2908, which corresponds to a length of time which vibrations are in the optimal zone. Exposure time 2908 can be compared to a total time of operation (e.g., t3–t0) to determine the percentage of time within the optimal zone. If the percentage of time within the optimal zone is sufficiently low, wearable device 1320 can provide information to increase the percentage of time, perhaps by outputting a visual, haptic, and/or audio alert that provides operational improvements, recommended angles of operation, and so on.

As another example, wearable device 1320 can determine critical exposure time 2910, which represents a period of vibration above upper limit 2904. Since operations in excess of critical exposure time 2910 could be detrimental to users, wearable device 1320 can provide information to decrease critical exposure time 2910, perhaps by outputting a visual, haptic, and/or audio alert as similarly described above.

FIG. 30 illustrates graph 3000, according to an example embodiment. As illustrated in FIG. 30, graph 3000 includes signal 3002, which may represent the RPM of a grinding wheel or disc over time. Namely, signal 3002 may result from a Fourier transformation performed on signal 2902 from graph 2900. The x-axis of graph 3000 corresponds to a time value, while the y-axis corresponds to a RPM value (in gRMS).

Similarly to graph 2900, graph 3000 contains upper limit 3004 and lower limit 3006, respectively representing the upper and lower limits of RPM, The region between upper limit 3004 and lower limit 3006 is an "optimal zone" of RPM for the grinding wheel or disc. In some embodiments, upper limit 3004 and lower limit 3006 may be determined by the manufacturer of wearable device 1320 or the manufacturer of the abrasive product/tool. In other embodiments, upper limit 3004 and lower limit 3006 may be based on occupational safety standards, either enforced today or in the future.

In some embodiments, upper limit 3004 and lower limit 3006 can be determined based on values installed into the firmware of wearable device 1320 upon manufacturing or user defined values that are dynamically loaded into the firmware of wearable device 1320. In examples, user defined values can be communicated to wearable device 1320 via a user interface component of wearable device 1320, can be communicated to wearable device 1320 via a web application, such as the web applications described below, or communicated to wearable device 1320 from a cloud computing device, such as the cloud computing devices described above. Other possibilities also exist.

Much like graph 2900, keeping the RPM within the optimal zone of graph 3000 can be valuable to the user. Thus, wearable device 1320 may operate to determine deviations of RPM from the optimal zone. For example, wearable device 1320 may determine critical time 3008, which corresponds to a length of time for which RPM was above upper limit 3004. Likewise, wearable device 1320 may operate to determine low use time 3010, which corresponds to a length of time for which RPM was below lower limit 3006. In either case, wearable device 1320 can provide information to decrease critical time 3008 and low use time 3010, perhaps by outputting a visual, haptic, and/or audio alert that provides operational improvements, recommended angles of operation, and so on.

In some embodiments, data from graph 2900 and/or graph 3000 may be transmitted by wearable device 1320 to a cloud computing device for storage and additional computation. For example, the cloud computing device can execute the machine learning algorithms discussed above to discover patterns (e.g., grinding time, optimal RPM time, overload time, optimum vibration time, etc.) with regard to signal 2902 and/or signal 3002. Discovered patterns can then be transmitted to a web application that provides information to the user. Additionally and/or alternatively, the web application may include of plots of the vibration of wearable device 1320 over time (e.g., graph 2900) and/or may include of plots of the RPM of wearable device 1320 over time (e.g., graph 3000) The web application may be auto-scalable—capable of being viewed on a tablet device, desktop computing device, mobile device, and so on. Further, the web application may be configured to establish dedicated accounts for various users and may have security measures in place to isolate each user's data and ensure privacy. In some embodiments, the cloud computing device or web application can be used to update the firmware of wearable device 1320, for example, by transmitting software updates to communication interface 106 of wearable device 1320.

Notably, while the embodiments above are discussed with regard to vibration and RPM data, other types of data are also contemplated in the disclosure herein.

In one example, temperature sensors/relative humidity sensors may be used to provide data about environment temperatures and humidity levels around wearable device 1320. In turn, the data collected by the temperature sensors/relative humidity sensors may be used to measure thermal exposure times for an abrasive product/tool being operated on by the user of the wearable device 1320. For instance, the temperature sensors/relative humidity sensors may calculate that an abrasive product/tool operated in a 55° F. environment for 2 hours and then operated in a 105° F. environment for 6 hours. The calculated thermal exposure times could then be used to determine the remaining product life/productivity for the abrasive product/tool. For instance, if the abrasive product/tool frequently operated in a high temperature environment, then the projected product life of the abrasive product/tool may shorter than if the abrasive product/tool frequently operated in a moderate temperature environment.

In another example, magnetometers may be used to provide data about surrounding magnetic fields/orientations of wearable device 1320 or workpieces operated on by the user of wearable device 1320.

In yet another example, capacitance sensors may be used to provide data about material density or potential damages related to wearable device 1320 or abrasive tools.

In a further example, current measurements may be obtained from abrasive tools and converted into power data. The power data be used to provide grinding cycle data for the abrasive tools and, in some cases, may be compared with the aforementioned vibration and RPM data to gain further insights on an abrasive operation. Moreover, the data described above data, along with data from other sensors such as inertial sensors, pressure sensors, and/or force sensors may be graphed, transformed, displayed on a dashboard, such as displays 2700, 2710, 2720, and 2730 described above, and associated with upper and lower threshold limits as similarly described with respect to graph 2900 and graph 3000.

XVI. Enumerated Example Embodiments

Embodiments of the present disclosure may relate to one of the enumerated example embodiments (EEEs) listed below.

EEE 1 is a computer-implemented method, comprising:
receiving, at a computing device, sensor data from one or more sensors, wherein the one or more sensors are disposed in proximity to an abrasive product or a workpiece associated with the abrasive product, wherein the one or more sensors are configured to collect abrasion operational data associated with an abrasive operation involving the abrasive product or the workpiece;
training, by way of the computing device and based on the sensor data, a machine learning system to determine product specific information of the abrasive product or workpiece specific information of the workpiece; and
providing, by way of the computing device, the trained machine learning system.

EEE 2 is the computer-implemented method of EEE 1, further comprising tagging at least a portion of the sensor data to provide tagged sensor data, wherein the tagged sensor data comprises one or more tags, each tag identifying different product specific information for the abrasive product.

EEE 3 is the computer-implemented method of EEE 2, wherein the one or more tags identify a pattern of the abrasion operation data from a duration of time prior to an abrasive product related event.

EEE 4 is the computer-implemented method of EEE 3, wherein the pattern of the abrasion operation data comprises one or more stages, each stage associated with one or more sensor threshold values, wherein the one or more tags are associated with a stage based on the one or more sensor threshold values.

EEE 5 is the computer-implemented method of EEE 1, wherein training the machine learning system comprises training one or more machine learning models, wherein each model is trained with sensor data from abrasive products having unique identifiers from a shared identifier set.

EEE 6 is the computer-implemented method of EEE 1, wherein the sensor data from one or more sensors is aggregated by a local computing device to provide aggregated sensor data, and wherein receiving the sensor data comprises receiving the aggregated sensor data from the local computing device.

EEE 7 is the computer-implemented method of EEE 1, wherein the one or more sensors are disposed in a wearable device, wherein the sensor data from one or more sensors is aggregated by the wearable device to provide aggregated sensor data, and wherein receiving the sensor data comprises receiving the aggregated sensor data from the wearable device.

EEE 8 is the computer-implemented method of EEE 7, wherein the sensor data comprises information indicative of a rotation per minute (RPM) value of the abrasive product.

EEE 9 is a computer-implemented method, comprising:
receiving, at a computing device, sensor data from one or more sensors, wherein the one or more sensors are disposed in proximity to an abrasive product or a workpiece associated with the abrasive product, wherein the one or more sensors are configured to collect abrasion operational data associated with an abrasive operation involving the abrasive product or the workpiece, and wherein the computing device has access to a trained machine learning system configured to receive input sensor data and output product specific information of the abrasive product or workpiece specific information of the workpiece;
determining, by applying the trained machine learning system on the sensor data, product specific information of the abrasive product or workpiece specific information of the workpiece; and
providing, to one or more client devices, the product specific information or the workpiece specific information.

EEE 10 is the computer-implemented method of EEE 9, wherein the one or more sensors are disposed in a wearable device, wherein the sensor data from one or more sensors is aggregated by the wearable device to provide aggregated sensor data, and wherein receiving the sensor data comprises receiving the aggregated sensor data from the wearable device.

EEE 11 is the computer-implemented method of EEE 10, wherein the sensor data comprises information indicative of a rotation per minute (RPM) value of the abrasive product.

EEE 12 is the computer-implemented method of EEE 9, wherein the one or more client devices comprises at least one of: a wearable device, a mobile device, a dashboard device, a web server, an analytics processing engine, or a third party server.

EEE 13 is the computer-implemented method of EEE 9, wherein providing the product specific information comprises providing information associated with a new abrasive product or an updated abrasive product, wherein the information includes, at least in part, instructions for constructing the new abrasive product or the updated abrasive product.

EEE 14 is the computer-implemented method of EEE 9, wherein providing the product specific information or the workpiece specific information comprises providing, to the one or more client devices, a notification.

EEE 15 is the computer-implemented method of EEE 9, wherein providing the product specific information or the workpiece specific information comprises providing, to the one or more client devices, one or more product specific solutions for resolving issues with the abrasive product.

EEE 16 is the computer-implemented method of EEE 15, wherein the one or more client devices are configured to:
display, on a graphical user interface, the one or more product specific solutions,
receive, via the graphical user interface, a selection of one of the one or more product specific solutions;
determine training data for the trained machine learning system based on the selected product specific solution; and
transmit, to the computing device, the training data.

EEE 17 is the computer-implemented method of EEE 9, wherein the abrasive product is a handheld abrasive product operated by a user.

EEE 18 is the computer-implemented method of EEE 17, wherein the abrasive operational data comprises at least one of: vibration data associated with the handheld abrasive product or acceleration data associated with the handheld abrasive product.

EEE 19 is the computer-implemented method of EEE 17, wherein providing the product specific information or the workpiece specific information comprises providing a notification to a graphical interface of a wearable device worn by the user.

EEE 20 is the computer-implemented method of EEE 17, wherein the product specific information comprises at least one of: time spent performing tasks assigned to the user, idle time of the user, or productive time of the user.

EEE 21 is the computer-implemented method of EEE 17, wherein the product specific information comprises at least one of: a working angle of the user with respect to the handheld abrasive product, a working angle of the handheld abrasive product with respect to the workpiece, a grip tightness of the user on the handheld abrasive product, or an applied pressure of the user on the handheld abrasive product.

EEE 22 is the computer-implemented method of EEE 17, wherein the product specific information comprises an end of life estimate of the handheld abrasive product, wherein the end of life estimate comprises an estimated amount of time the user can safely use the handheld abrasive product.

EEE 23 is the computer-implemented method of EEE 9, wherein the abrasive product is an automated abrasive product operated by a controller.

EEE 24 is the computer-implemented method of EEE 23, wherein the one or more sensors comprises a spark-invariant sensor configured to collect operational speeds of the automated abrasive product.

EEE 25 is the computer-implemented method of EEE 23, wherein providing the product specific information comprises providing a determination that one or more abrasive articles of the automated abrasive product are damaged or malfunctioning.

EEE 26 is the computer-implemented method of EEE 25, wherein upon providing the determination, the computing device is further configured to:
 identify, by a product database, one or more replacement abrasive articles for the automated abrasive product; and
 responsive to identifying the one or more replacement abrasive articles, place a request for the one or more replacement articles or a refurbishment treatment.

EEE 27 is the computer-implemented method of EEE 23, wherein providing the product specific information comprises transmitting at least one control instruction to the controller of the automated abrasive product, wherein the at least one control instruction comprises at least one of: adjust a rotational speed of the automated abrasive product, provide a notification to the automated abrasive product, turn on the automated abrasive product, or turn off the automated abrasive product.

EEE 28 is the computer-implemented method of EEE 9, further comprising:
 providing, via a graphical user interface, a search interface, wherein the search interface comprises a plurality of user-selectable criteria, wherein the user-selectable criteria comprise at least one of: a location menu, a device menu, a date range, or a workpiece menu;
 receiving, via the graphical user interface, user-selected search criteria from the user-selectable criteria;
 determining, based on the user-selected search criteria, one or more metrics; an
 displaying, via the graphical user interface, the one or more metrics.

EEE 29 is the computer-implemented method EEE 28, wherein the one or more metrics comprise at least one of: a grinding time metric, an optimal grinding metric, a vibration metric, a depth of cut, a current trace, a tool identifier, or a part count.

EEE 30 is the computer-implemented method of EEE 29, further comprising receiving, via the graphical user interface, a desired metric selected from a metric menu, wherein displaying the one or more metrics is based on the desired metric.

EEE 31 is the computer-implemented method of EEE 9, further comprising: providing, via a graphical user interface, a cycle comparison interface, wherein the cycle comparison interface is configured to display at least a portion of the sensor data in an overlapping arrangement of a plurality of periodic time series.

EEE 32 is the computer-implemented method of EEE 9, further comprising: comparing a plurality of periodic time series of at least a portion of the sensor data, wherein determining the product specific information of the abrasive product or workpiece specific information of the workpiece, is based, at least in part, on the comparison.

EEE 33 is the computer-implemented method of EEE 9, wherein determining the product specific information of the abrasive product or workpiece specific information of the workpiece comprises determining one or more of: a predicted future condition of the abrasive product or a predicted future condition of the workpiece.

EEE 34 is the computer-implemented method of EEE 33, wherein providing the product specific information or the workpiece specific information comprises providing at least one of the predicted future condition of the abrasive product or the predicted future condition of the workpiece.

EEE 35 is the computer-implemented method of EEE 9, wherein determining the product specific information of the abrasive product or workpiece specific information of the workpiece comprises determining a prescriptive action.

EEE 36 is the computer-implemented method of EEE 35, wherein providing the product specific information or the workpiece specific information comprises providing the prescriptive action, wherein the prescriptive action comprises at least one of: adjusting an operational parameter of an abrasive machine, performing a maintenance operation, redressing the abrasive product, or replacing the abrasive product.

EEE 37 is a computing system, comprising:
 one or more processors; and
 data storage, wherein the data storage has stored computer-executable instructions that, when executed by the one or more processors, cause the computing system to carry out operations, the operations including:
 receiving sensor data from one or more sensors, wherein the one or more sensors are disposed in proximity to an abrasive product or a workpiece associated with the abrasive product, wherein the one or more sensors are configured to collect abrasion operational data associated with an abrasive operation involving the abrasive product or the workpiece;
 training, based on the sensor data, a machine learning system to determine product specific information of the abrasive product or workpiece specific information of the workpiece; and
 providing the trained machine learning system.

EEE 38 is the computing system of EEE 37, wherein the operations further including: tagging at least a portion of the sensor data to provide tagged sensor data, wherein the tagged sensor data comprises one or more tags, each tag identifying different product specific information for the abrasive product.

EEE 39 is the computing system of EEE 38, wherein the one or more tags identify a pattern of the abrasion operation data from a duration of time prior to an abrasive product related event.

EEE 40 is the computing system of EEE 39, wherein the pattern of the abrasion operation data comprises one or more stages, each stage associated with one or more sensor threshold values, wherein the one or more tags are associated with a stage based on the one or more sensor threshold values.

EEE 41 is the computing system of EEE 37, wherein training the machine learning system comprises training one or more machine learning models, wherein each model is trained with sensor data from abrasive products having unique identifiers from a shared identifier set.

EEE 42 is the computing system of EEE 37, wherein the sensor data is aggregated by a local computing device to provide aggregated sensor data, and wherein receiving the sensor data comprises receiving the aggregated sensor data from the local computing device.

EEE 43 is the computing system of EEE 37, wherein the one or more sensors are disposed in a wearable device, wherein the sensor data from one or more sensors is aggregated by the wearable device to provide aggregated sensor data, and wherein receiving the sensor data comprises receiving the aggregated sensor data from the wearable device.

EEE 44 is the computing system of EEE 37, wherein the sensor data comprises information indicative of a rotation per minute (RPM) value of the abrasive product.

EEE 45 is the computing system, comprising:
a trained machine learning system configured to receive input sensor data and output, based on the input sensor data, product specific information or workpiece specific information; and
a computing device configured to:
receive sensor data from one or more sensors, wherein the one or more sensors are disposed in proximity to an abrasive product or a workpiece associated with the abrasive product, wherein the one or more sensors are configured to collect abrasion operational data associated with an abrasion operation involving the abrasive product or the workpiece;
determine, by applying the trained machine learning system on the sensor data, product specific information of the abrasive product or workpiece specific information of the workpiece; and
provide, to one or more client devices, the product specific information or the workpiece specific information.

EEE 46 is the computing system of EEE 45, wherein the one or more client devices comprises at least one of: a wearable device, a mobile device, a dashboard device, a web server, an analytics processing engine, or a third party server.

EEE 47 is the computing system of EEE 45, wherein providing the product specific information comprises providing information associated with a new abrasive product or an updated abrasive product, wherein the information includes, at least in part, instructions for constructing the new abrasive product or the updated abrasive product.

EEE 48 is the computing system of EEE 45, wherein providing the product specific information or the workpiece specific information comprises providing, to the one or more client devices, a notification.

EEE 49 is the computing system of EEE 45, wherein providing the product specific information or the workpiece specific information comprises providing, to the one or more client devices, one or more product specific solutions for resolving issues with the abrasive product.

EEE 50 is the computing system of EEE 49, wherein the one or more client devices are configured to:
display, on a graphical user interface, the one or more product specific solutions,
receive, via the graphical user interface, a selection of one of the one or more product specific solutions;
determine training data for the trained machine learning system based on the selected product specific solution; and
transmit, to the computing device, the training data.

EEE 51 is the computing system of EEE 45, wherein the abrasive product is a handheld abrasive product operated by a user.

EEE 52 is the computing system of EEE 51, wherein the abrasive operational data comprises at least one of: vibration data associated with the handheld abrasive product or acceleration data associated with the handheld abrasive product.

EEE 53 is the computing system of EEE 51, wherein providing the product specific information or the workpiece specific information comprises providing a notification to a graphical interface of a wearable device worn by the user.

EEE 54 is the computing system of EEE 51, wherein the product specific information comprises at least one of: time spent performing tasks assigned to the user, idle time of the user, or productive time of the user.

EEE 55 is the computing system of EEE 51, wherein the product specific information comprises at least one of: a working angle of the user with respect to the handheld abrasive product, a working angle of the handheld abrasive product with respect to the workpiece, a grip tightness of the user on the handheld abrasive product, or an applied pressure of the user on the handheld abrasive product.

EEE 56 is the computing system of EEE 51, wherein the product specific information comprises an end of life estimate of the handheld abrasive product, wherein the end of life estimate comprises an estimated amount of time the user can safely use the handheld abrasive product.

EEE 57 is the computing system of EEE 45, wherein the abrasive product is an automated abrasive product operated by a controller.

EEE 58 is the computing system of EEE 57, wherein the one or more sensors comprises a spark-invariant sensor configured to collect operational speeds of the automated abrasive product.

EEE 59 is the computing system of EEE 57, wherein providing the product specific information comprises providing a determination that one or more abrasive articles of the automated abrasive product are damaged or malfunctioning.

EEE 60 is the computing system of EEE 59, wherein upon providing the determination, the computing device is further configured to:
identify, by a product database, one or more replacement abrasive articles for the automated abrasive product; and
responsive to identifying the one or more replacement abrasive articles, place a request for the one or more replacement articles.

EEE 61 is the computing system of EEE 57, wherein providing the product specific information comprises transmitting at least one control instruction to the controller of the automated abrasive product, wherein the at least one control instruction comprises at least one of: adjust a rotational speed of the automated abrasive product, provide a notification to the automated abrasive product, turn on the automated abrasive product, or turn off the automated abrasive product.

EEE 62 is the computing system of EEE 45, wherein the one or more sensors are disposed in a wearable device, wherein the sensor data from one or more sensors is aggregated by the wearable device to provide aggregated sensor data, and wherein receiving the sensor data comprises receiving the aggregated sensor data from the wearable device.

EEE 63 is the computing system of EEE 59, wherein the sensor data comprises information indicative of a rotation per minute (RPM) value of the abrasive product.

EEE 64 is the computing system of EEE 45, further comprising:
  a display configured to provide a graphical user interface with a search interface, wherein the search interface comprises a plurality of user-selectable criteria, wherein the user-selectable criteria comprise at least one of: a location menu, a device menu, a date range, or a workpiece menu, wherein the graphical user interface is configured to:
  receive user-selected search criteria from the user-selectable criteria
  determine, based on the user-selected search criteria, one or more metrics; an
  display, via the graphical user interface, the one or more metrics.

EEE 65 is the computing system m of EEE 64, wherein the one or more metrics comprise at least one of: a grinding time metric, an optimal grinding metric, a vibration metric, a depth of cut, a current trace, a tool identifier, or a part count.

EEE 66 is the computing system of EEE 65, wherein the graphical user interface is further configured to receive a desired metric selected from a metric menu, wherein displaying the one or more metrics is based on the desired metric.

EEE 67 is the computing system of EEE 64, wherein the display is further configured to provide, via the graphical user interface, a cycle comparison interface, wherein the cycle comparison interface is configured to display at least a portion of the sensor data in an overlapping arrangement of a plurality of periodic time series.

EEE 68 is the computing system of EEE 45, wherein the computing device is further configured to:
  compare a plurality of periodic time series of at least a portion of the sensor data, wherein determining the product specific information of the abrasive product or workpiece specific information of the workpiece, is based, at least in part, on the comparison.

EEE 69 is the computing system of EEE 45, wherein the product specific information or the workpiece specific information comprises information indicative of one or more operating parameters of a remote device.

EEE 70 is computing system, comprising:
  a trained machine learning system configured to receive input sensor data and output, based on the input sensor data, product specific information related to an abrasive product or workpiece specific information related to a workpiece associated with the abrasive product; and
  a computing device configured to:
    receive, from one or more sensors, sensor data, wherein the one or more sensors are disposed in proximity to a plurality of abrasive products, and wherein the one or more sensors are configured to collect abrasion operational data associated with abrasive operations involving the plurality of abrasive products;
    determine, by applying the trained machine learning system on the sensor data, product specific information of the plurality of abrasive products or workpiece specific information of a plurality of workpieces associated with the plurality of abrasive products; and
    provide, to one or more client devices, the product specific information or the workpiece specific information.

EEE 71 is the computing system of EEE 70, wherein the plurality of abrasive products are located across a plurality of enterprises.

EEE 72 is the computing system of EEE 71, wherein the computing device is configured to anonymize the sensor data so as to disassociate the sensor data from each of the plurality of enterprises.

EEE 73 is the computing system of EEE 70, wherein the sensor data comprises synthetic sensor data, wherein the synthetic sensor data is generated from digital twins of the plurality of abrasive products.

EEE 74 is a computing device, comprising:
  one or more processors; and
  data storage, wherein the data storage has stored thereon computer-executable instructions that, when executed by the one or more processors, cause the computing device to carry out functions comprising the computer-implemented method of any one of EEEs 1-36.

EEE 75 is the article of manufacture comprising one or more computer readable media having non-transitory computer-readable instructions stored that, when executed by one or more processors of a computing device, cause the computing device to carry out functions that comprise the computer-implemented method of any one of EEEs 1-36.

EEE 76 is a computing device, comprising:
  means for carrying out the computer-implemented method of any one of EEEs 1-36.

EEE 77 is a system, comprising:
  an abrasive product comprising a tag, wherein the abrasive product is associated with a universally unique identifier (UUID);
  a mobile device comprising a user interface and a tag reader, wherein the mobile device is configured to carry out operations, the operations comprising:
    interrogating, with the tag reader, the tag to determine the UUID;
    based on the UUID, performing at least one of:
      displaying, via the user interface, stock information about similar abrasive products;
      displaying, via the user interface, product information or GPS information about similar abrasive products; or
      generating a reorder request for a similar abrasive product and transmitting the reorder request to a client network or a remote network.

EEE 78 is a method, comprising:
  interrogating, with a tag reader of a mobile device, a tag of an abrasive product to determine an associated universally unique identifier (UUID);

based on the UUID, performing at least one of:
  displaying, via a user interface of the mobile device, stock information about similar abrasive products;
  displaying, via the user interface, product information or GPS information about similar abrasive products; or
  generating a reorder request for a similar abrasive product and transmitting the reorder request to a client network or a remote network.

EEE 79 is a method, comprising:
obtaining, by a tag reader, tag information from a client network, wherein the tag information is associated with a tag of an abrasive product having a universally unique identifier (UUID);
transmitting the tag information, to a remote network;
updating at least one database with the tag information;
displaying the tag information with a user interface;
selecting at least one implementable action based on a user interaction with the user interface, wherein the at least one implementable action comprises at least one of:
  establishing communications with abrasive devices associated with the abrasive product;
  adjusting an operation of the abrasive devices associated with the abrasive product;
  notifying a vendor to order one or more replacement parts;
  notifying a vendor to repair or refurbish the abrasive product; or
  notifying a user of the abrasive product by way of a text message or email.

EEE 80 is a method, comprising:
interrogating, with a tag reader of a mobile device, a tag of an abrasive product to determine an associated universally unique identifier (UUID);
determining, based on the UUID, an operative state of the abrasive product from among a plurality of possible operative states, wherein the plurality of possible operative states comprises at least one of:
  a manufacturer state;
  a gate state;
  a shop floor state;
  a wheel balancing state;
  an operation state; and
  a scrap state; and
storing the operative state of the abrasive product in at least one of: a product database or a memory associated with the tag.

EEE 81 is a mobile device, comprising:
an authentication system configured to determine a level of access from among a plurality of possible levels of access based on a user identity; and
a user interface configured to provide abrasive product information based on the determined level of access, wherein the abrasive product information comprises at least one of:
  maintenance information;
  GPS information;
  a state of a client network;
  abrasive product details; or
  current stock information.

What is claimed is:

1. A computer-implemented method, comprising:
receiving, at a computing device, sensor data from one or more sensors, wherein the one or more sensors are disposed in proximity to an abrasive device, wherein the one or more sensors are configured to collect abrasive operational data associated with one or more abrasive operations involving the abrasive device; and
displaying at least a portion of the abrasive operational data,
wherein displaying at least a portion of the abrasive operational data comprises simultaneously displaying, via a user interface, a current trace related to a plurality of abrasive tools operated by the abrasive device, a tool ID associated with the plurality of abrasive tools operated by the abrasive device, and part count associated with one or more workpieces that are operated on by at least one of the plurality of abrasive tools for a same duration of time, wherein the tool ID is a unique identifier indicative of identifications of the plurality of abrasive tools, and the part count is an ID value indicative of identifications of a plurality of workpieces operated on by one or more abrasive tools of the plurality of abrasive tools.

2. The computer-implemented method of claim 1, wherein the current trace is indicative of values of current experienced by the abrasive device over time.

3. The computer-implemented method of claim 1, further comprising:
identifying a pattern in the real-time abrasive operational data over time;
making real time adjustments to an abrasive operation involving an abrasive tool of the plurality of abrasive tools based on the pattern; and
evaluating effect of the real time adjustments on the abrasive operation by comparing patterns before and after making the real time adjustments.

4. The computer-implemented method of claim 3, comprising identifying the pattern in the abrasive operational data related to the current trace, relating the pattern to the identification of the abrasive tool by using simultaneously displayed abrasive operational data.

5. The computer-implemented method of claim 4, further comprising:
assigning tags to portions of the abrasive operational data, wherein the tags are indicative of abrasive operation status of the abrasive device at different times, wherein the status is determined based on at least some of the changes in the abrasive operational data.

6. The computer-implemented method of claim 5, further comprising:
training one or more machine learning models with sensor data including the one or more tags;
applying trained machine learning models on the sensor data; and
providing product specific information of a plurality of abrasive tools.

7. The computer-implemented method of claim 4, further comprising identifying patterns in the abrasive operational data associated with the abrasive device based on at least some of the changes.

8. The computer-implemented method of claim 3, further comprising:
displaying at least a portion of the abrasive operational data comprises simultaneously displaying abrasive operational data associated with the plurality of workpieces; and
relating abrasive operational data associated with the plurality of workpieces to identifications of the plurality of abrasive tools based on at least some of the patterns identified in the abrasive operational data associated with the abrasive device.

9. The computer-implemented method of claim 8, further comprising:
comparing abrasive operational data associated with the plurality of workpieces; and
determining product specific information of at least one abrasive tool of the plurality of abrasive tools based, at least in part, on the comparison.

10. The computer-implemented method of claim 9, further comprising making real time adjustments to an abrasive operation involving the at least one abrasive tool of the plurality of abrasive tools based on the product specific information.

11. A computer-implemented method, comprising:
receiving, at a computing device, sensor data from one or more sensors, wherein the one or more sensors are disposed in proximity to a plurality of abrasive tools, wherein the one or more sensors are configured to collect abrasive operational data associated with the plurality of abrasive tools; and
displaying, via a graphical user interface, at least a portion of the abrasive operational data, wherein displaying at least a portion of the abrasive operational data comprises simultaneously displaying via the graphical user interface, a current trace related to the plurality of abrasive tools, a tool ID associated with the plurality of abrasive tools, and part count associated with one or more workpieces that are operated on by at least one of the plurality of abrasive tools for a same period of time, wherein the tool ID is a unique identifier indicative of identifications of the plurality of abrasive tools, and the part count is an ID value indicative of identifications of a plurality of workpieces operated on by one or more abrasive tools of the plurality of abrasive tools.

12. The computer-implemented method of claim 11, wherein displaying at least a portion of the abrasive operational data comprises displaying at least one metric associated with at least some of the plurality of abrasive tools.

13. The computer-implemented method of claim 12, wherein the at least one metric comprises at least one of a grinding time metric, an optimal grinding metric, a vibration metric, a depth of cut, a current trace, a tool identifier, an angular velocity, or a part count.

14. The computer-implemented method of claim 12, wherein the at least one metric is displayed in an overlapping arrangement of a plurality of periodic time series.

15. A computing system, comprising:
a computing device configured to receive sensor data from one or more sensors, wherein the one or more sensors are disposed in proximity to an abrasive device, wherein the one or more sensors are configured to collect abrasive operational data associated with an abrasive operation involving the abrasive device and one or more abrasive tools operated by the abrasive device over time; and
a display configured to provide at least a portion of the abrasive operational data, wherein providing at least a portion of the abrasive operational data comprises simultaneously displaying, via a graphical user interface, a current trace related to the plurality of abrasive tools operated by the abrasive device, a tool ID associated with the plurality of abrasive tools, and part count associated with a plurality of workpieces operated b at least one of the plurality of abrasive tools for a same duration of time, wherein the tool ID is a unique identifier indicative of identifications of the plurality of abrasive tools, and the part count is an ID value indicative of identifications of a plurality of workpieces operated on by one or more abrasive tools of the plurality of abrasive tools.

16. The computing system of claim 15, wherein the display is configured to provide the abrasive operational data associated with the plurality of abrasive tools and the abrasive operational data associated with the abrasive device in a relatable manner.

17. The computing system of claim 15, wherein the display is configured to provide abrasive operational data associated with the plurality of workpieces.

18. The computing system of claim 15, wherein the display is further configured to provide a cycle comparison interface, wherein the cycle comparison interface is configured to display at least a portion of the abrasive operational data associated with least some of the plurality of abrasive tools in an overlapping arrangement of a plurality of periodic time series.

* * * * *